(12) United States Patent
Kumar et al.

(10) Patent No.: US 10,452,678 B2
(45) Date of Patent: Oct. 22, 2019

(54) FILTER CHAINS FOR EXPLORING LARGE DATA SETS

(71) Applicant: Palantir Technologies Inc., Palo Alto, CA (US)

(72) Inventors: Adit Kumar, New York, NY (US); Lindsay Canfield, Santa Clara, CA (US); Karl Hanson, Palo Alto, CA (US); Kevin Simler, Palo Alto, CA (US); Beyang Liu, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 545 days.

(21) Appl. No.: 14/562,420

(22) Filed: Dec. 5, 2014

(65) Prior Publication Data

US 2015/0205848 A1    Jul. 23, 2015

Related U.S. Application Data

(63) Continuation of application No. 14/149,608, filed on Jan. 7, 2014, now Pat. No. 8,909,656.
(Continued)

(51) Int. Cl.
*G06F 17/30* (2006.01)
*G06F 16/26* (2019.01)
(Continued)

(52) U.S. Cl.
CPC ............ *G06F 16/26* (2019.01); *G06F 16/335* (2019.01); *G06F 16/35* (2019.01); *G06F 16/904* (2019.01)

(58) Field of Classification Search
None
See application file for complete search history.

(56) References Cited

U.S. PATENT DOCUMENTS

| | | |
|---|---|---|
| 5,109,399 A | 4/1992 | Thompson |
| 5,241,625 A | 8/1993 | Epard et al. |
| | (Continued) | |

FOREIGN PATENT DOCUMENTS

| | | |
|---|---|---|
| AU | 2014201558 | 6/2018 |
| CA | 2828264 | 4/2014 |
| | (Continued) | |

OTHER PUBLICATIONS

CMSC 341, "Introduction to Trees," Power Point Presentation, http://www.csee.umbc.edu/courses/undergraduate/341/fall07/Lectures/Tres/TreeIntro.pdf, Baltimore, Maryland, Aug. 3, 2007, pp. 29.
(Continued)

*Primary Examiner* — Alex Gofman
(74) *Attorney, Agent, or Firm* — Knobbe, Martens, Olson & Bear, LLP

(57) ABSTRACT

A multipath explorer may allow a user to quickly visualize an entire population of data hierarchically in a tree-like structure. For example, a user can select a first filter to be applied to a data set, and the multipath explorer can display data in the data set that satisfies the first filter requirements and data in the data set that does not satisfy the first filter requirements. A second filter can be applied to the data in the data set, and the multipath explorer can display data in the data set that satisfies the first and second filter requirements, data in the data set that satisfies the first filter requirements and not the second filter requirements, data in the data set that satisfies the second filter requirements and not the first filter requirements, and data in the data set that does not satisfy the first or second filter requirements.

17 Claims, 61 Drawing Sheets

Related U.S. Application Data

(60) Provisional application No. 61/794,653, filed on Mar. 15, 2013.

(51) Int. Cl.
*G06F 16/335* (2019.01)
*G06F 16/904* (2019.01)
*G06F 16/35* (2019.01)

(56) References Cited

U.S. PATENT DOCUMENTS

| | | |
|---|---|---|
| 5,329,108 A | 7/1994 | Lamoure |
| 5,412,769 A | 5/1995 | Maruoka et al. |
| 5,414,838 A | 5/1995 | Kolton et al. |
| 5,418,950 A | 5/1995 | Li et al. |
| 5,428,737 A | 6/1995 | Li et al. |
| 5,428,776 A | 6/1995 | Rothfield |
| 5,444,819 A | 8/1995 | Negishi |
| 5,454,104 A | 9/1995 | Steidlmayer et al. |
| 5,542,089 A | 7/1996 | Lindsay et al. |
| 5,568,390 A | 10/1996 | Hirota et al. |
| 5,608,899 A | 3/1997 | Li et al. |
| 5,613,105 A | 3/1997 | Xbikowski et al. |
| 5,632,009 A | 5/1997 | Rao et al. |
| 5,670,987 A | 9/1997 | Doi et al. |
| 5,701,456 A | 12/1997 | Jacopi et al. |
| 5,724,575 A | 3/1998 | Hoover et al. |
| 5,781,704 A | 7/1998 | Rossmo |
| 5,794,228 A | 8/1998 | French et al. |
| 5,794,229 A | 8/1998 | French et al. |
| 5,798,769 A | 8/1998 | Chiu et al. |
| 5,819,226 A | 10/1998 | Gopinathan et al. |
| 5,819,238 A | 10/1998 | Fernholz |
| 5,826,021 A | 10/1998 | Mastors et al. |
| 5,832,218 A | 11/1998 | Gibbs et al. |
| 5,845,300 A | 12/1998 | Comer |
| 5,845,530 A | 12/1998 | Brookmeyer et al. |
| 5,857,329 A | 1/1999 | Bingham |
| 5,872,973 A | 2/1999 | Mitchell et al. |
| 5,878,434 A | 3/1999 | Draper et al. |
| 5,892,900 A | 4/1999 | Ginter et al. |
| 5,897,636 A | 4/1999 | Kaeser |
| 5,902,349 A | 5/1999 | Endo et al. |
| 5,911,138 A | 6/1999 | Li et al. |
| 5,918,225 A | 6/1999 | White et al. |
| 5,966,706 A | 10/1999 | Biliris et al. |
| 5,999,911 A | 12/1999 | Berg et al. |
| 6,006,242 A | 12/1999 | Poole et al. |
| 6,012,042 A | 1/2000 | Black et al. |
| 6,057,757 A | 5/2000 | Arrowsmith et al. |
| 6,065,026 A | 5/2000 | Cornelia et al. |
| 6,072,942 A | 6/2000 | Stockwell et al. |
| 6,091,956 A | 7/2000 | Hollenberg |
| 6,094,643 A | 7/2000 | Anderson et al. |
| 6,104,401 A | 8/2000 | Parsons |
| 6,134,582 A | 10/2000 | Kennedy |
| 6,161,098 A | 12/2000 | Wallman |
| 6,189,005 B1 | 2/2001 | Chakrabarti et al. |
| 6,208,985 B1 | 3/2001 | Krehel |
| 6,219,053 B1 | 4/2001 | Tachibana et al. |
| 6,232,971 B1 | 5/2001 | Haynes |
| 6,236,994 B1 | 5/2001 | Swartz et al. |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,289,334 B1 | 9/2001 | Reiner et al. |
| 6,289,338 B1 | 9/2001 | Stoffel et al. |
| 6,311,181 B1 | 10/2001 | Lee et al. |
| 6,313,833 B1 | 11/2001 | Knight |
| 6,321,274 B1 | 11/2001 | Shakib et al. |
| 6,341,310 B1 | 1/2002 | Leshem et al. |
| 6,349,315 B1 | 2/2002 | Sonoyama et al. |
| 6,366,933 B1 | 4/2002 | Ball et al. |
| 6,369,835 B1 | 4/2002 | Lin |
| 6,370,538 B1 | 4/2002 | Lamping et al. |
| 6,430,305 B1 | 8/2002 | Decker |
| 6,456,997 B1 | 9/2002 | Shukla |
| 6,463,404 B1 | 10/2002 | Appleby |
| 6,496,774 B1 | 12/2002 | Davies |
| 6,496,817 B1 | 12/2002 | Whang et al. |
| 6,513,019 B2 | 1/2003 | Lewis |
| 6,519,627 B1 | 2/2003 | Dan et al. |
| 6,523,019 B1 | 2/2003 | Borthwick |
| 6,532,449 B1 | 3/2003 | Goertzel et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,608,559 B1 | 8/2003 | Lemelson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,643,613 B2 | 11/2003 | McGee et al. |
| 6,662,202 B1 | 12/2003 | Krusche et al. |
| 6,665,683 B1 | 12/2003 | Meltzer |
| 6,674,434 B1 | 1/2004 | Chojnacki et al. |
| 6,714,936 B1 | 3/2004 | Nevin, III |
| 6,745,382 B1 | 6/2004 | Zothner |
| 6,748,481 B1 | 6/2004 | Parry et al. |
| 6,775,675 B1 | 8/2004 | Nwabueze et al. |
| 6,801,201 B2 | 10/2004 | Escher |
| 6,820,135 B1 | 11/2004 | Dingman |
| 6,828,920 B2 | 12/2004 | Owen et al. |
| 6,839,745 B1 | 1/2005 | Dingari et al. |
| 6,851,108 B1 | 2/2005 | Syme et al. |
| 6,857,120 B1 | 2/2005 | Arnold et al. |
| 6,876,981 B1 | 4/2005 | Berckmans |
| 6,877,137 B1 | 4/2005 | Rivette et al. |
| 6,907,426 B2 | 6/2005 | Hellerstein et al. |
| 6,920,453 B2 | 7/2005 | Mannila et al. |
| 6,944,821 B1 | 9/2005 | Bates et al. |
| 6,976,024 B1 | 12/2005 | Chavez et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,028,223 B1 | 4/2006 | Kolawa et al. |
| 7,036,085 B2 | 4/2006 | Barros |
| 7,043,449 B1 | 5/2006 | Li et al. |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,085,890 B2 | 8/2006 | Kashyap |
| 7,086,028 B1 | 8/2006 | Davis et al. |
| 7,089,541 B2 | 8/2006 | Ungar |
| 7,111,231 B1 | 9/2006 | Huck et al. |
| 7,133,409 B1 | 11/2006 | Willardson |
| 7,139,800 B2 | 11/2006 | Bellotti et al. |
| 7,155,728 B1 | 12/2006 | Prabhu et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,181,423 B2 | 2/2007 | Blanchard et al. |
| 7,185,065 B1 | 2/2007 | Holtzman et al. |
| 7,213,030 B1 | 5/2007 | Jenkins |
| 7,216,133 B2 | 5/2007 | Wu et al. |
| 7,216,299 B2 | 5/2007 | Knight |
| 7,237,192 B1 | 6/2007 | Stephenson et al. |
| 7,240,330 B2 | 7/2007 | Fairweather |
| 7,246,090 B1 | 7/2007 | Thomas |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,356,504 B2 | 4/2008 | Müller |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,401,038 B2 | 7/2008 | Masuda |

(56) References Cited

U.S. PATENT DOCUMENTS

| | | |
|---|---|---|
| 7,403,921 B2 | 7/2008 | Tanpoco et al. |
| 7,403,922 B1 | 7/2008 | Lewis et al. |
| 7,403,942 B1 | 7/2008 | Bayliss |
| 7,406,592 B1 | 7/2008 | Polyudov |
| 7,409,357 B2 | 8/2008 | Schaf et al. |
| 7,426,654 B2 | 9/2008 | Adams et al. |
| 7,437,728 B2 | 10/2008 | Stackhouse et al. |
| 7,441,182 B2 | 10/2008 | Beilinson et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,469,238 B2 | 12/2008 | Satchwell |
| 7,487,139 B2 | 2/2009 | Fraleigh et al. |
| 7,502,786 B2 | 3/2009 | Liu et al. |
| 7,519,589 B2 | 4/2009 | Charnock et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,533,069 B2 | 5/2009 | Fairweather |
| 7,542,934 B2 | 6/2009 | Markel |
| 7,546,245 B2 | 6/2009 | Surpin |
| 7,546,353 B2 | 6/2009 | Hesselink et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,587,352 B2 | 9/2009 | Arnott |
| 7,590,582 B2 | 9/2009 | Dunne |
| 7,596,285 B2 | 9/2009 | Brown et al. |
| 7,603,229 B2 | 10/2009 | Goldberg et al. |
| 7,610,290 B2 | 10/2009 | Kruy et al. |
| 7,614,006 B2 | 11/2009 | Molander |
| 7,617,232 B2 | 11/2009 | Gabbert et al. |
| 7,620,582 B2 | 11/2009 | Masuda |
| 7,620,628 B2 | 11/2009 | Kapur et al. |
| 7,627,489 B2 | 12/2009 | Schaeffer et al. |
| 7,627,812 B2 | 12/2009 | Chamberlain et al. |
| 7,630,931 B1 | 12/2009 | Rachev et al. |
| 7,634,717 B2 | 12/2009 | Chamberlain et al. |
| 7,640,173 B2 | 12/2009 | Surpin et al. |
| 7,657,478 B2 | 2/2010 | De Diego |
| 7,685,042 B1 | 3/2010 | Monroe et al. |
| 7,685,083 B2 | 3/2010 | Fairweather |
| 7,716,067 B2 | 3/2010 | Surpin et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,227 B1 | 5/2010 | Hao et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,757,220 B2 | 7/2010 | Griffith et al. |
| 7,770,100 B2 | 8/2010 | Chamberlain et al. |
| 7,783,679 B2 | 8/2010 | Bley |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,835,966 B2 | 11/2010 | Satchwell |
| 7,848,995 B2 | 12/2010 | Dalal |
| 7,853,573 B2 | 12/2010 | Warner et al. |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,904,913 B2 | 3/2011 | Sim-Tang et al. |
| 7,908,521 B2 | 3/2011 | Sridharan et al. |
| 7,912,842 B1 | 3/2011 | Bayliss |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,979,424 B2 | 7/2011 | Dettinger et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,042,110 B1 | 10/2011 | Kawahara et al. |
| 8,046,283 B2 | 10/2011 | Burns |
| 8,054,756 B2 | 11/2011 | Chand et al. |
| 8,060,421 B1 | 11/2011 | Wang |
| 8,065,606 B1 | 11/2011 | Gralnick et al. |
| 8,073,857 B2 | 12/2011 | Sreekanth |
| 8,082,172 B2 | 12/2011 | Chao et al. |
| 8,103,543 B1 | 1/2012 | Zwicky |
| 8,103,962 B2 | 1/2012 | Embley et al. |
| 8,108,138 B2 | 1/2012 | Bruce et al. |
| 8,112,425 B2 | 2/2012 | Baum et al. |
| 8,117,022 B2 | 2/2012 | Linker |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,326,727 B2 | 12/2012 | Aymeloglu et al. |
| 8,352,174 B2 | 1/2013 | Milstein et al. |
| 8,352,881 B2 | 1/2013 | Champion et al. |
| 8,364,642 B1 | 1/2013 | Garrod |
| 8,368,695 B2 | 2/2013 | Howell et al. |
| 8,397,171 B2 | 3/2013 | Klassen et al. |
| 8,412,707 B1 | 4/2013 | Mianji |
| 8,417,409 B2 | 4/2013 | Bast et al. |
| 8,417,715 B1 | 4/2013 | Bruckhaus et al. |
| 8,429,194 B2 | 4/2013 | Aymeloglu et al. |
| 8,429,527 B1 | 4/2013 | Arbogast |
| 8,433,702 B1 | 4/2013 | Carrino et al. |
| 8,433,703 B1 | 4/2013 | Schneider et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,549 B2 | 7/2013 | Burr et al. |
| 8,489,331 B2 | 7/2013 | Kopf et al. |
| 8,489,641 B1 | 7/2013 | Seefeld et al. |
| 8,494,941 B2 | 7/2013 | Aymeloglu et al. |
| 8,498,984 B1 | 7/2013 | Hwang et al. |
| 8,499,287 B2 | 7/2013 | Shafi et al. |
| 8,510,743 B2 | 8/2013 | Hackborn et al. |
| 8,514,082 B2 | 8/2013 | Cova et al. |
| 8,515,207 B2 | 8/2013 | Chau |

(56) References Cited

U.S. PATENT DOCUMENTS

| | | |
|---|---|---|
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,719 B2 | 10/2013 | McGrew |
| 8,560,413 B1 | 10/2013 | Quarterman |
| 8,560,494 B1 | 10/2013 | Downing |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen et al. |
| 8,639,757 B1 | 1/2014 | Zang et al. |
| 8,645,332 B1 | 2/2014 | Cohen et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,763,078 B1 | 6/2014 | Castellucci et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,799 B1 | 8/2014 | Cervelli et al. |
| 8,799,867 B1 | 8/2014 | Peri-Glass et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,903,717 B2 | 12/2014 | Elliot |
| 8,909,597 B2 | 12/2014 | Aymeloglu et al. |
| 8,909,656 B2 | 12/2014 | Kumar et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,429 B1 | 12/2014 | Fisher et al. |
| 8,924,872 B1 | 12/2014 | Bogomolov et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,031,981 B1 | 5/2015 | Potter et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,092,482 B2 | 7/2015 | Harris et al. |
| 9,100,428 B1 | 8/2015 | Visbal |
| 9,105,000 B1 | 8/2015 | White et al. |
| 9,116,975 B2 | 8/2015 | Shankar et al. |
| 9,129,219 B1 | 9/2015 | Robertson et al. |
| 9,229,966 B2 | 1/2016 | Aymeloglu et al. |
| 9,280,532 B2 | 3/2016 | Cicerone |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,367,463 B2 | 6/2016 | Biswal et al. |
| 9,378,524 B2 | 6/2016 | Aymeloglu et al. |
| 9,449,074 B1 | 9/2016 | Fisher et al. |
| 9,852,205 B2 | 12/2017 | Tamayo |
| 9,880,987 B2 | 1/2018 | Burr et al. |
| 9,898,335 B1 | 2/2018 | Marinelli, III |
| 10,180,977 B2 | 1/2019 | Fisher et al. |
| 10,198,515 B1 | 2/2019 | White et al. |
| 2001/0011243 A1 | 8/2001 | Dembo et al. |
| 2001/0021936 A1 | 9/2001 | Bertram |
| 2001/0027424 A1 | 10/2001 | Torigoe |
| 2002/0007329 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0032677 A1 | 3/2002 | Morgenthaler et al. |
| 2002/0033848 A1 | 3/2002 | Sciammarella et al. |
| 2002/0035590 A1 | 3/2002 | Eibach et al. |
| 2002/0040336 A1 | 4/2002 | Blanchard et al. |
| 2002/0059126 A1 | 5/2002 | Ricciardi |
| 2002/0065708 A1 | 5/2002 | Senay et al. |
| 2002/0087570 A1 | 7/2002 | Jacquez et al. |
| 2002/0091707 A1 | 7/2002 | Keller |
| 2002/0095360 A1 | 7/2002 | Joao |
| 2002/0095658 A1 | 7/2002 | Shulman |
| 2002/0099870 A1 | 7/2002 | Miller et al. |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0138383 A1 | 9/2002 | Rhee |
| 2002/0147671 A1 | 10/2002 | Sloan et al. |
| 2002/0156812 A1 | 10/2002 | Krasnoiarov et al. |
| 2002/0174201 A1 | 11/2002 | Ramer et al. |
| 2002/0184111 A1 | 12/2002 | Swanson |
| 2002/0194119 A1 | 12/2002 | Wright et al. |
| 2003/0004770 A1 | 1/2003 | Miller et al. |
| 2003/0009392 A1 | 1/2003 | Perkowski |
| 2003/0009399 A1 | 1/2003 | Boerner |
| 2003/0023620 A1 | 1/2003 | Trotta |
| 2003/0028560 A1 | 2/2003 | Kudrolli et al. |
| 2003/0039948 A1 | 2/2003 | Donahue |
| 2003/0065605 A1 | 4/2003 | Gatto |
| 2003/0065606 A1 | 4/2003 | Satchwell |
| 2003/0065607 A1 | 4/2003 | Satchwell |
| 2003/0078827 A1 | 4/2003 | Hoffman |
| 2003/0093401 A1 | 5/2003 | Czahkowski et al. |
| 2003/0093755 A1 | 5/2003 | O'Carroll |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0126102 A1 | 7/2003 | Borthwick |
| 2003/0130996 A1 | 7/2003 | Bayerl et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0167423 A1 | 9/2003 | Murakami et al. |
| 2003/0172021 A1 | 9/2003 | Huang |
| 2003/0172053 A1 | 9/2003 | Fairweather |
| 2003/0177112 A1 | 9/2003 | Gardner |
| 2003/0182177 A1 | 9/2003 | Gallagher |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0200217 A1 | 10/2003 | Ackerman |
| 2003/0212670 A1 | 11/2003 | Yalamanchi et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0003009 A1 | 1/2004 | Wilmot |
| 2004/0006523 A1 | 1/2004 | Coker |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098731 A1 | 5/2004 | Demsey et al. |
| 2004/0103088 A1 | 5/2004 | Cragun et al. |
| 2004/0103124 A1 | 5/2004 | Kupkova |
| 2004/0111410 A1 | 6/2004 | Burgoon et al. |
| 2004/0111480 A1 | 6/2004 | Yue |
| 2004/0117387 A1 | 6/2004 | Civetta et al. |

(56) References Cited

U.S. PATENT DOCUMENTS

| | | |
|---|---|---|
| 2004/0126840 A1 | 7/2004 | Cheng et al. |
| 2004/0133500 A1 | 7/2004 | Thompson et al. |
| 2004/0139212 A1 | 7/2004 | Mukherjee et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153451 A1 | 8/2004 | Phillips et al. |
| 2004/0153837 A1 | 8/2004 | Preston et al. |
| 2004/0163039 A1 | 8/2004 | Gorman |
| 2004/0181554 A1 | 9/2004 | Heckerman et al. |
| 2004/0193599 A1 | 9/2004 | Liu et al. |
| 2004/0193600 A1 | 9/2004 | Kaasten et al. |
| 2004/0193608 A1 | 9/2004 | Gollapudi et al. |
| 2004/0205492 A1 | 10/2004 | Newsome |
| 2004/0205644 A1 | 10/2004 | Shaughnessy et al. |
| 2004/0210763 A1 | 10/2004 | Jonas |
| 2004/0221223 A1 | 11/2004 | Yu et al. |
| 2004/0236688 A1 | 11/2004 | Bozeman |
| 2004/0254658 A1 | 12/2004 | Sherriff et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0021877 A1 | 1/2005 | Varpela et al. |
| 2005/0027632 A1 | 2/2005 | Zeitoun et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0060712 A1 | 3/2005 | Miller et al. |
| 2005/0060713 A1 | 3/2005 | Miller et al. |
| 2005/0065811 A1 | 3/2005 | Chu et al. |
| 2005/0075962 A1 | 4/2005 | Dunne |
| 2005/0075966 A1 | 4/2005 | Duka |
| 2005/0080769 A1 | 4/2005 | Gemmell |
| 2005/0086207 A1 | 4/2005 | Heuer et al. |
| 2005/0090911 A1 | 4/2005 | Ingargiola et al. |
| 2005/0091186 A1 | 4/2005 | Elish |
| 2005/0097441 A1 | 5/2005 | Herbach et al. |
| 2005/0108001 A1 | 5/2005 | Aarskog |
| 2005/0120080 A1 | 6/2005 | Weinreb et al. |
| 2005/0125715 A1 | 6/2005 | Di Franco et al. |
| 2005/0131935 A1 | 6/2005 | O'Leary et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0171881 A1 | 8/2005 | Ghassemieh et al. |
| 2005/0180330 A1 | 8/2005 | Shapiro |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0226473 A1 | 10/2005 | Ramesh |
| 2005/0246327 A1 | 11/2005 | Yeung et al. |
| 2005/0251786 A1 | 11/2005 | Citron et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0020398 A1 | 1/2006 | Vernon et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047590 A1 | 3/2006 | Anderson et al. |
| 2006/0052984 A1 | 3/2006 | Nakadate et al. |
| 2006/0053097 A1 | 3/2006 | King et al. |
| 2006/0053170 A1 | 3/2006 | Hill et al. |
| 2006/0059072 A1 | 3/2006 | Boglaev |
| 2006/0059139 A1 | 3/2006 | Robinson |
| 2006/0059423 A1 | 3/2006 | Lehmann et al. |
| 2006/0064181 A1 | 3/2006 | Kato |
| 2006/0070046 A1 | 3/2006 | Balakrishnan et al. |
| 2006/0074730 A1 | 4/2006 | Shukla et al. |
| 2006/0074866 A1 | 4/2006 | Chamberlain et al. |
| 2006/0074881 A1 | 4/2006 | Vembu et al. |
| 2006/0074967 A1 | 4/2006 | Shaburov |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0116943 A1 | 6/2006 | Willain |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0155654 A1 | 7/2006 | Plessis et al. |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0224356 A1 | 10/2006 | Castelli et al. |
| 2006/0235786 A1 | 10/2006 | DiSalvo |
| 2006/0241856 A1 | 10/2006 | Cobleigh et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0259524 A1 | 11/2006 | Horton |
| 2006/0265311 A1 | 11/2006 | Dean et al. |
| 2006/0265397 A1 | 11/2006 | Bryan et al. |
| 2006/0265417 A1 | 11/2006 | Amato et al. |
| 2006/0271277 A1 | 11/2006 | Hu et al. |
| 2006/0271838 A1 | 11/2006 | Carro |
| 2006/0271884 A1 | 11/2006 | Hurst |
| 2006/0277460 A1 | 12/2006 | Forstall et al. |
| 2006/0279630 A1 | 12/2006 | Aggarwal et al. |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0011150 A1 | 1/2007 | Frank |
| 2007/0011304 A1 | 1/2007 | Error |
| 2007/0016363 A1 | 1/2007 | Huang et al. |
| 2007/0027851 A1 | 2/2007 | Kruy et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0055598 A1 | 3/2007 | Arnott et al. |
| 2007/0055599 A1 | 3/2007 | Arnott |
| 2007/0057966 A1 | 3/2007 | Ohno et al. |
| 2007/0061259 A1 | 3/2007 | Zoldi et al. |
| 2007/0061752 A1 | 3/2007 | Cory |
| 2007/0067233 A1 | 3/2007 | Dalal |
| 2007/0067285 A1 | 3/2007 | Blume |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0091868 A1 | 4/2007 | Hollman et al. |
| 2007/0094248 A1 | 4/2007 | McVeigh et al. |
| 2007/0094312 A1 | 4/2007 | Sim-Tang |
| 2007/0094389 A1 | 4/2007 | Nussey et al. |
| 2007/0106582 A1 | 5/2007 | Baker et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136115 A1 | 6/2007 | Doganaksoy et al. |
| 2007/0150369 A1 | 6/2007 | Zivin |

(56) References Cited

U.S. PATENT DOCUMENTS

| | | |
|---|---|---|
| 2007/0150801 A1 | 6/2007 | Chidlovskii et al. |
| 2007/0150805 A1 | 6/2007 | Misovski |
| 2007/0156673 A1 | 7/2007 | Maga |
| 2007/0168269 A1 | 7/2007 | Chuo |
| 2007/0168270 A1 | 7/2007 | De Diego Arozamena et al. |
| 2007/0168336 A1 | 7/2007 | Ransil et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185867 A1 | 8/2007 | Maga |
| 2007/0192265 A1 | 8/2007 | Chopin et al. |
| 2007/0192281 A1 | 8/2007 | Cradick et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0219882 A1 | 9/2007 | May |
| 2007/0220604 A1 | 9/2007 | Long |
| 2007/0226617 A1 | 9/2007 | Traub et al. |
| 2007/0233709 A1 | 10/2007 | Abnous |
| 2007/0233756 A1 | 10/2007 | D'Souza et al. |
| 2007/0239606 A1 | 10/2007 | Eisen |
| 2007/0240062 A1 | 10/2007 | Christena et al. |
| 2007/0245339 A1 | 10/2007 | Bauman et al. |
| 2007/0260582 A1 | 11/2007 | Liang |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0005063 A1 | 1/2008 | Seeds |
| 2008/0010440 A1 | 1/2008 | Altman et al. |
| 2008/0015920 A1 | 1/2008 | Fawls et al. |
| 2008/0016155 A1 | 1/2008 | Khalatian |
| 2008/0016216 A1 | 1/2008 | Worley et al. |
| 2008/0040250 A1 | 2/2008 | Salter |
| 2008/0040684 A1 | 2/2008 | Crump |
| 2008/0046481 A1 | 2/2008 | Gould et al. |
| 2008/0046803 A1 | 2/2008 | Beauchamp et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0097816 A1 | 4/2008 | Freire et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0104407 A1 | 5/2008 | Horne et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0133310 A1 | 6/2008 | Kim et al. |
| 2008/0140387 A1 | 6/2008 | Linker |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0162616 A1 | 7/2008 | Worley et al. |
| 2008/0172607 A1 | 7/2008 | Baer |
| 2008/0177782 A1 | 7/2008 | Poston et al. |
| 2008/0177994 A1 | 7/2008 | Mayer |
| 2008/0183639 A1 | 7/2008 | DiSalvo |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0196016 A1 | 8/2008 | Todd |
| 2008/0201313 A1 | 8/2008 | Dettinger et al. |
| 2008/0208820 A1 | 8/2008 | Usey et al. |
| 2008/0215543 A1 | 9/2008 | Huang et al. |
| 2008/0215546 A1 | 9/2008 | Baum et al. |
| 2008/0222295 A1 | 9/2008 | Robinson et al. |
| 2008/0228467 A1 | 9/2008 | Womack et al. |
| 2008/0243711 A1 | 10/2008 | Aymeloglu et al. |
| 2008/0243799 A1* | 10/2008 | Rozich .............. G06F 17/30864 |
| 2008/0249845 A1 | 10/2008 | Aronowich et al. |
| 2008/0249957 A1 | 10/2008 | Masuyama et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1 | 11/2008 | MacIntyre et al. |
| 2008/0288471 A1 | 11/2008 | Wu et al. |
| 2008/0301042 A1 | 12/2008 | Patzer |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2008/0313281 A1 | 12/2008 | Scheidl et al. |
| 2009/0002492 A1 | 1/2009 | Velipasalar et al. |
| 2009/0006150 A1 | 1/2009 | Prigge et al. |
| 2009/0006271 A1 | 1/2009 | Crowder |
| 2009/0007056 A1 | 1/2009 | Prigge et al. |
| 2009/0018996 A1 | 1/2009 | Hunt et al. |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0055487 A1 | 2/2009 | Moraes et al. |
| 2009/0076845 A1 | 3/2009 | Bellin et al. |
| 2009/0083275 A1 | 3/2009 | Jacob et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094217 A1 | 4/2009 | Dettinger et al. |
| 2009/0106178 A1 | 4/2009 | Chu |
| 2009/0106242 A1 | 4/2009 | McGrew |
| 2009/0106305 A1 | 4/2009 | Murakami |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0112922 A1 | 4/2009 | Barinaga |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138307 A1 | 5/2009 | Belcsak et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0144747 A1 | 6/2009 | Baker |
| 2009/0150868 A1 | 6/2009 | Chakra et al. |
| 2009/0161147 A1 | 6/2009 | Klave |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172674 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0187556 A1 | 7/2009 | Ross et al. |
| 2009/0193012 A1 | 7/2009 | Williams |
| 2009/0193050 A1 | 7/2009 | Olson |
| 2009/0199047 A1 | 8/2009 | Vaitheeswaran et al. |
| 2009/0199106 A1 | 8/2009 | Jonsson et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0228507 A1 | 9/2009 | Jain et al. |

(56) References Cited

U.S. PATENT DOCUMENTS

| | | |
|---|---|---|
| 2009/0234720 A1 | 9/2009 | George et al. |
| 2009/0248721 A1 | 10/2009 | Burton et al. |
| 2009/0248757 A1 | 10/2009 | Havewala et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0307049 A1 | 12/2009 | Elliott et al. |
| 2009/0313250 A1 | 12/2009 | Folting et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2009/0319996 A1 | 12/2009 | Shafi et al. |
| 2009/0327157 A1 | 12/2009 | Dunne |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057600 A1 | 3/2010 | Johansen et al. |
| 2010/0057622 A1 | 3/2010 | Faith et al. |
| 2010/0057716 A1 | 3/2010 | Stefik et al. |
| 2010/0070426 A1 | 3/2010 | Aymeloglu et al. |
| 2010/0070427 A1 | 3/2010 | Aymeloglu et al. |
| 2010/0070464 A1 | 3/2010 | Aymeloglu et al. |
| 2010/0070489 A1 | 3/2010 | Aymeloglu et al. |
| 2010/0070523 A1 | 3/2010 | Delgo et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0161735 A1 | 6/2010 | Sharma |
| 2010/0162176 A1 | 6/2010 | Dunton |
| 2010/0162371 A1 | 6/2010 | Geil |
| 2010/0169192 A1 | 7/2010 | Zoldi et al. |
| 2010/0169376 A1 | 7/2010 | Chu |
| 2010/0169405 A1 | 7/2010 | Zhang |
| 2010/0191563 A1 | 7/2010 | Schlaifer et al. |
| 2010/0198684 A1 | 8/2010 | Eraker et al. |
| 2010/0199167 A1 | 8/2010 | Uematsu et al. |
| 2010/0199225 A1 | 8/2010 | Coleman et al. |
| 2010/0204983 A1 | 8/2010 | Chung et al. |
| 2010/0205108 A1 | 8/2010 | Mun |
| 2010/0205662 A1 | 8/2010 | Ibrahim et al. |
| 2010/0223260 A1 | 9/2010 | Wu |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306285 A1 | 12/2010 | Shah et al. |
| 2010/0306713 A1 | 12/2010 | Geisner et al. |
| 2010/0312530 A1 | 12/2010 | Capriotti |
| 2010/0312837 A1 | 12/2010 | Bodapati et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004626 A1 | 1/2011 | Naeymi-Rad et al. |
| 2011/0016108 A1* | 1/2011 | Pelenur ............ G06F 17/30864 707/722 |
| 2011/0029526 A1 | 2/2011 | Knight et al. |
| 2011/0035396 A1 | 2/2011 | Merz et al. |
| 2011/0041084 A1 | 2/2011 | Karam |
| 2011/0047159 A1 | 2/2011 | Baid et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0066497 A1 | 3/2011 | Gopinath et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0099628 A1 | 4/2011 | Lanxner et al. |
| 2011/0117878 A1 | 5/2011 | Barash et al. |
| 2011/0119100 A1 | 5/2011 | Ruhl et al. |
| 2011/0131082 A1 | 6/2011 | Manser et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0145401 A1 | 6/2011 | Westlake |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179042 A1 | 7/2011 | Aymeloglu et al. |
| 2011/0185316 A1 | 7/2011 | Reid et al. |
| 2011/0185401 A1 | 7/2011 | Bak et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0238495 A1 | 9/2011 | Kang |
| 2011/0251951 A1 | 10/2011 | Kolkowtiz |
| 2011/0252282 A1 | 10/2011 | Meek et al. |
| 2011/0258072 A1 | 10/2011 | Kerker et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0270871 A1 | 11/2011 | He et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0321008 A1 | 12/2011 | Jhoney et al. |
| 2012/0011238 A1 | 1/2012 | Rathod |
| 2012/0011245 A1 | 1/2012 | Gillette et al. |
| 2012/0013684 A1 | 1/2012 | Robertson et al. |
| 2012/0019559 A1 | 1/2012 | Siler et al. |

(56) References Cited

U.S. PATENT DOCUMENTS

| | | |
|---|---|---|
| 2012/0022945 A1 | 1/2012 | Falkenborg et al. |
| 2012/0030140 A1 | 2/2012 | Aymeloglu et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0101952 A1 | 4/2012 | Raleigh et al. |
| 2012/0102022 A1 | 4/2012 | Miranker et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0136804 A1 | 5/2012 | Lucia |
| 2012/0137235 A1 | 5/2012 | Ts et al. |
| 2012/0143816 A1 | 6/2012 | Zhang et al. |
| 2012/0144335 A1 | 6/2012 | Abeln et al. |
| 2012/0158585 A1 | 6/2012 | Ganti |
| 2012/0158752 A1* | 6/2012 | Chakka ............. G06F 17/30115 707/752 |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0159449 A1 | 6/2012 | Arnold et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0174057 A1 | 7/2012 | Narendra et al. |
| 2012/0180002 A1 | 7/2012 | Campbell et al. |
| 2012/0188252 A1 | 7/2012 | Law |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278249 A1 | 11/2012 | Duggal et al. |
| 2012/0284345 A1 | 11/2012 | Costenaro et al. |
| 2012/0284719 A1 | 11/2012 | Phan et al. |
| 2012/0290506 A1 | 11/2012 | Muramatsu et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013577 A1 | 1/2013 | Fee et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024731 A1 | 1/2013 | Shochat et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0054551 A1 | 2/2013 | Lange |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124193 A1 | 5/2013 | Holmberg |
| 2013/0132348 A1 | 5/2013 | Garrod |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0198624 A1 | 8/2013 | Aymeloglu et al. |
| 2013/0218974 A1 | 8/2013 | Cao et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226944 A1 | 8/2013 | Baid et al. |
| 2013/0226953 A1 | 8/2013 | Markovich et al. |
| 2013/0231862 A1 | 9/2013 | Delling et al. |
| 2013/0232045 A1 | 9/2013 | Tai et al. |
| 2013/0232220 A1 | 9/2013 | Sampson |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290161 A1 | 10/2013 | Aymeloglu et al. |
| 2013/0290825 A1 | 10/2013 | Arndt et al. |
| 2013/0293553 A1 | 11/2013 | Burr et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0012886 A1 | 1/2014 | Downing et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0074888 A1 | 3/2014 | Potter et al. |
| 2014/0081685 A1 | 3/2014 | Thacker et al. |

(56) References Cited

U.S. PATENT DOCUMENTS

| | | |
|---|---|---|
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0115589 A1 | 4/2014 | Marinelli, III et al. |
| 2014/0115610 A1 | 4/2014 | Marinelli, III et al. |
| 2014/0120864 A1 | 5/2014 | Manolarakis et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0143025 A1 | 5/2014 | Fish et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214482 A1 | 7/2014 | Williams et al. |
| 2014/0214579 A1 | 7/2014 | Shen et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0237354 A1 | 8/2014 | Burr et al. |
| 2014/0244388 A1 | 8/2014 | Manouchehri et al. |
| 2014/0258285 A1* | 9/2014 | Lavine ............ G06F 17/30554 707/728 |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0019394 A1 | 1/2015 | Unser et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0120176 A1 | 4/2015 | Curtis et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178743 A1 | 6/2015 | Aymeloglu et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0205848 A1 | 7/2015 | Kumar et al. |
| 2015/0227295 A1 | 8/2015 | Meiklejohn et al. |
| 2015/0254220 A1 | 9/2015 | Burr et al. |
| 2015/0261817 A1 | 9/2015 | Harris et al. |
| 2015/0269030 A1 | 9/2015 | Fisher et al. |
| 2015/0309719 A1 | 10/2015 | Ma et al. |
| 2015/0310005 A1 | 10/2015 | Ryger et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0299652 A1 | 10/2016 | Aymeloglu et al. |
| 2018/0075007 A1 | 3/2018 | Burr et al. |
| 2018/0075126 A1 | 3/2018 | Tamayo |
| 2018/0113740 A1 | 4/2018 | Marinelli et al. |

FOREIGN PATENT DOCUMENTS

| | | |
|---|---|---|
| CA | 2829266 | 6/2017 |
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| EP | 0652513 | 5/1995 |
| EP | 1 109 116 | 6/2001 |
| EP | 1 146 649 | 10/2001 |
| EP | 1647908 | 4/2006 |
| EP | 1672527 | 6/2006 |
| EP | 1926074 | 5/2008 |
| EP | 2350817 | 8/2011 |
| EP | 2487610 | 8/2012 |
| EP | 2551799 | 1/2013 |
| EP | 2555126 | 2/2013 |
| EP | 2560134 | 2/2013 |
| EP | 2562709 | 2/2013 |
| EP | 2634745 | 9/2013 |
| EP | 2743839 | 6/2014 |
| EP | 2 778 974 | 9/2014 |
| EP | 2778913 | 9/2014 |
| EP | 2778914 | 9/2014 |
| EP | 2778977 | 9/2014 |
| EP | 2778986 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2876587 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2921975 | 9/2015 |
| EP | 2940603 | 11/2015 |
| EP | 2940609 | 11/2015 |
| EP | 2963595 | 1/2016 |
| GB | 2366498 | 3/2002 |
| GB | 2513472 | 10/2014 |
| GB | 2513721 | 11/2014 |
| GB | 2508503 | 1/2015 |
| GB | 2516155 | 1/2015 |
| GB | 2517582 | 2/2015 |
| GB | 2508293 | 4/2015 |
| GB | 2518745 | 4/2015 |
| HK | 1194178 | 9/2015 |
| ID | 102014215621 | 2/2015 |
| NL | 2012778 | 11/2014 |

(56) References Cited

FOREIGN PATENT DOCUMENTS

| | | |
|---|---|---|
| NL | 2013134 | 1/2015 |
| NL | 2013306 | 2/2015 |
| NL | 2011613 | 6/2016 |
| NZ | 624557 | 12/2014 |
| NZ | 622485 | 3/2015 |
| NZ | 616212 | 5/2015 |
| NZ | 616299 | 7/2015 |
| WO | WO 00/009529 | 2/2000 |
| WO | WO 00/034895 | 6/2000 |
| WO | WO 01/025906 | 4/2001 |
| WO | WO 2001/088750 | 11/2001 |
| WO | WO 02/065353 | 8/2002 |
| WO | WO 2005/104736 | 11/2005 |
| WO | WO 2005/116851 | 12/2005 |
| WO | WO 2008/064207 | 5/2008 |
| WO | WO 2008/121499 | 10/2008 |
| WO | WO 2009/042548 | 4/2009 |
| WO | WO 2009/051987 | 4/2009 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2010/030915 | 3/2010 |
| WO | WO 2010/030917 | 3/2010 |
| WO | WO 2010/030919 | 3/2010 |
| WO | WO 2010/030946 | 3/2010 |
| WO | WO 2010/030949 | 3/2010 |
| WO | WO 2013/030595 | 3/2010 |
| WO | WO 2012/025915 | 3/2012 |
| WO | WO 2012/119008 | 9/2012 |
| WO | WO 2013/010157 | 1/2013 |
| WO | WO 2013/102892 | 7/2013 |

OTHER PUBLICATIONS

"A First Look: Predicting Market Demand for Food Retail using a Huff Analysis," TRF Policy Solutions, Jul. 2012, pp. 30.
Azad, Khalid, "A Visual Guide to Version Control," http://betterexplained.com/articles/a-visual-guide-to-version-control/, Sep. 27, 2007 in 11 pages.
Beverley, Bill, "Windows Tips & Tricks," http://alamopc.org/pcalamode/columns/beverley/bb0301.shtml, Mar. 2001 in 5 pages.
Bradbard, Matthew, "Technical Analysis Applied," http://partners.futuresource.com/fastbreak/2007/0905.htm, Sep. 5, 2007, pp. 6.
Breierova et al., "An Introduction to Sensitivity Analysis," Published by Massachusetts Institute of Technology, Cambridge, MA, Oct. 2001, pp. 67.
Devanbu et al., "Authentic Third-party Data Publication," 2000, pp. 19, http://www.cs.ucdavis.edu/~devanbu/authdbpub.pdf.
Dramowicz, Ela, "Retail Trade Area Analysis Using the Huff Model," Directions Magazine http://www.directionsmag.com/articles/retail-trade-area-analysis-using-the-huff-model/123411, Jul. 2, 2005 in 10 pages.
Dreyer et al., "An Object-Oriented Data Model for a Time Series Management System," Proceedings of the 7th International Working Conference on Scientific and Statistical Database Management, Charlottesville, Virginia USA, Sep. 28-30, 1994, pp. 12.
Griffith, Daniel A., "A Generalized Huff Model," Geographical Analysis, Apr. 1982, vol. 14, No. 2, pp. 135-144.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"Introduction to Trees", UMBC, CMSC 341, Aug. 3, 2007, pp. 29, as printed from http://www.csee.umbc.edu/courses/undergraduate/CMSC341/Lectures/Trees/TreeIntro.ppt.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft, "How Word Creates and Recovers the AutoRecover files," http://support.microsoft.com/kb/107686, Article ID: 107686, printed Feb. 11, 2010 in 3 pages.
Microsoft, "Introduction to Versioning," http://office.microsoft.com/en-us/sharepointtechnoldy/HA010021576.aspx?nnode=print, 2007 in 3 pages.
Microsoft, "Managing Versions and Checking Documents In and Out (Windows SharePoint Services 2.0)," http://technet.microsoft.com/en-us/library/cc287876.aspx, Aug. 22, 2005 in 2 pages.
Traichal et al., "Forecastable Default Risk Premia and Innovations," Journal of Economics and Finance, Fall 1999, vol. 23, No. 3, pp. 214-225.
Schwieger, V., "Sensitivity Analysis as a General Tool for Model Optimisation-Examples for Trajectory Estimation," 3rd IAG/12th FIG Symposium, Baden, Germany, May 22-24, 2006, Published by IAG, 2006, pp. 10.
Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.
Yahoo, http://web.archive.org/web/20020124161606/http://finance.yahoo.com/q?s=%5eIXIC&d=c . . . printed Mar. 6, 2012 in 2 pages.
International Search Report and Written Opinion in Application No. PCT/US2008/056439, dated Jun. 8, 2009.
International Search Report and Written Opinion in Application No. PCT/US2008/077244, dated Nov. 28, 2008.
International Search Report and Written Opinion in Application No. PCT/US2009/056705, dated Mar. 26, 2010.
International Search Report and Written Opinion in Application No. PCT/US2009/056738, dated Mar. 29, 2010.
International Search Report and Written Opinion in Application No. PCT/US2009/056707, dated Mar. 2, 2010.
Official Communication in European Application No. 14159418.4 dated Oct. 8, 2014.
Official Communication in New Zealand Application No. 622513 dated Apr. 3, 2014.
Official Communication in New Zealand Application No. 628840 dated Aug. 28, 2014.
"A Quick Guide to UniProtKB Swiss-Prot & TrEMBL," Sep. 2011, pp. 2.
"A Tour of Pinboard," http://pinboard.in/tour as printed May 15, 2014 in 6 pages.
"A Word About Banks and the Laundering of Drug Money," Aug. 18, 2012, http://www.golemxiv.co.uk/2012/08/a-wo rd-about-banks-and-the-laundering-of-drug-money/.
"E-MailRelay," http://web.archive.org/web/20080821175021/http://emailrelay.sourceforge.net/ Aug. 21, 2008, pp. 2.
"GrabUp—What a Timesaver!" http://atlchris.com/191/grabup/, Aug. 11, 2008, pp. 3.
"How to Create a small Multiple Masterpiece in Tableau," Nov. 10, 2014.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http:/finsolin.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The FASTA Program Package," fasta-36.3.4, Mar. 25, 2011, pp. 29.

(56) References Cited

OTHER PUBLICATIONS

"Using Whois Based Geolocation and Google Maps API for Support Cybercrime Investigations," http://wseas.us/e-library/conferences/2013/Dubrovnik/TELECIRC/TELECIRC-32.pdf.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Abbey, Kristen, "Review of Google Docs," May 1, 2007, pp. 2.

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.

Acklen, Laura, "Absolute Beginner's Guide to Microsoft Word 2003," Dec. 24, 2003, pp. 15-18, 34-41, 308-316.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Alur et al., "Chapter 2: IBM InfoSphere DataStage Stages," IBM InfoSphere DataStage Data Flow and Job Design, Jul. 1, 2008, pp. 35-137.

AMNET, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Anonymous, "A Real-World Problem of Matching Records," Nov. 2006, http://grupoweb.upf.es/bd-web/slides/ullman.pdf pp. 1-16.

Anonymous, "Frequently Asked Questions about Office Binder 97," http://web.archive.org/web/20100210112922/http://support.microsoft.com/kb/843147 printed Dec. 18, 2006 in 5 pages.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Ashraf, "Protect your Google Account (Gmail) by enabling SMS (text message) notifications for Suspicious Activity," online article from dotTech, Jan. 24, 2013, https://dottech.org/94405/how-to-setup-text-message-sms-google-notifications-for-suspicious-activity/.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bluttman et al., "Excel Formulas and Functions for Dummies," 2005, Wiley Publishing, Inc., pp. 280, 284-286.

Bogle et al., "Reducing Cross-Domain Call Overhead Using Batched Futures," SIGPLAN No. 29, (Oct. 10, 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Boyce, Jim, "Microsoft Outlook 2010 Inside Out," Aug. 1, 2010, retrieved from the Internet https://capdtron.files.wordpress.com/2013/01/outlook-2010-inside_out.pdf.

Brandel, Mary, "Data Loss Prevention Dos and Don'ts," http://web.archive.org/web/20080724024847/http://www.csoonline.com/article/221272/Dos_and_Don_ts_for_Data_Loss_Prevention, Oct. 10, 2007, pp. 5.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, http://www.capptain.com Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Chen et al., "A Novel Emergency Vehicle Dispatching System," 2013 IEEE 77th Vehicular Technology Conference, IEEE, Jun. 2, 2013, 5 pages.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

Countly Mobile Analytics, http://count.ly/ Printed Jul. 18, 2013 in 9 pages.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Delicious, http://delicious.com/ as printed May 15, 2014 in 1 page.

DISTIMO—App Analytics, http://www.distimo.com/app-analytics Printed Jul. 18, 2013 in 5 pages.

Donjerkovic et al., "Probabilistic Optimization of Top N Queries," Proceedings of the 25th VLDB Conference, Edinburgh, Scotland, 1999, pp. 411-422.

Eklund et al., "A Dynamic Multi-source Dijkstra's Algorithm for Vehicle Routing," Intelligent Information Systems, 1996, pp. 329-333.

Fang et al., "Computing Iceberg Queries Efficiently," Proceedings of the 24th VLDB Conference New York, 1998, pp. 299-310.

Fischer et al., "Populating a Release History Database From Version Control and Bug Tracking Systems," Software Maintenance, 2003, ICSM 2003, Proceedings International Conference, pp. 1-10.

Flurry Analytics, http://www.flurry.com/ Printed Jul. 18, 2013 in 14 pages.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Galliford, Miles, "SnagIt Versus Free Screen Capture Software: Critical Tools for Website Owners," http://www.subhub.com/articles/free-screen-capture-software, Mar. 27, 2008, pp. 11.

Gesher, Ari, "Palantir Screenshots in the Wild: Swing Sightings," The Palantir Blog, Sep. 11, 2007, pp. 1-12.

GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.

Goldstein et al., "Stacks Lazy Threads: Implementing a Fast Parallel Call," Journal of Parallel and Distributed Computing, Jan. 1, 1996, pp. 5-20.

Google Analytics Official Website—Web Analytics & Reporting, http://www.google.com/analytics.index.html Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

(56) References Cited

OTHER PUBLICATIONS

Goswami, Gautam, "Quite Writly Saidl," One Brick at a Time, Aug. 21, 2005, pp. 7.
Gu et al., "Record Linkage: Current Practice and Future Directions," Jan. 15, 2004, pp. 32.
Han et al., "Efficient Computation of Iceberg Cubes with Complex Measures," ACM Sigmod, May 21-24, 2001, pp. 1-12.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.
Hart et al., "A Formal Basis for the Heuristic Determination of Minimum Cost Paths," IEEE Transactions on Systems Science and Cybernetics, IEEE, vol. 1, No. 2, Jul. 1, 1968, pp. 100-107.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: http://www.codeproject.com/Articles/7335/An-extensible-math-expression-parser-with-plug-ins.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
JetScreenshot.com, "Share Screenshots via Internet in Seconds," http://web.archive.org/web/20130807164204/http://www.jetscreenshot.com/, Aug. 7, 2013, pp. 1.
Johnson, Maggie, "Introduction to YACC and Bison", Handout 13, Jul. 8, 2005, in 11 pages.
Johnson, Steve, "Access 2013 on demand," Access 2013 on Demand, May 9, 2013, Que Publishing.
Jotshi et al., "Dispatching and Routing of Emergency Vehicles in Disaster Mitigation Using Data Fusion." Socio-Economic Planning Sciences, Pergamon, Amsterdam, Netherlands, vol. 43, No. 1, Mar. 1, 2009, 24 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, http://www.kontagent.com/ Printed Jul. 18, 2013 in 9 pages.
Kwout, http://web.archive.org/web/20080905132448/http://www.kwout.com/ Sep. 5, 2008, pp. 2.

Leela et al., "On Incorporating Iceberg Queries in Query Processors," Technical Report, TR-2002-01, Database Systems for Advanced Applications Lecture Notes in Computer Science, 2004, vol. 2973.
Li et al., "Interactive Multimodal Visual Search on Mobile Device," IEEE Transactions on Multimedia, vol. 15, No. 3, Apr. 1, 2013, pp. 594-607.
Lim et al., "Resolving Attribute Incompatibility in Database Integration: An Evidential Reasoning Approach," Department of Computer Science, University of Minnesota, 1994, http://reference.kfupm.edu.sa/content/r/e/resolving_attribute_incompatibility_in_d 531691.pdf pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu et al., "Methods for Mining Frequent Items in Data Streams: An Overview," Knowledge and Information Systems, vol. 26, No. 1, Jan. 2011, pp. 1-30.
Localytics—Mobile App Marketing & Analytics, http://www.localytics.com/ Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ul_specs/FileSaveDialogs.html, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mendes et al., "TcruziKB: Enabling Complex Queries for Genomic Data Exploration," IEEE International Conference on Semantic Computing, Aug. 2008, pp. 432-439.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Microsoft Windows, "Microsoft Windows Version 2002 Print Out 2," 2002, pp. 1-6.
Microsoft, "Registering an Application to a URI Scheme," http://msdn.microsoft.com/en-us/library/aa767914.aspx, printed Apr. 4, 2009 in 4 pages.
Microsoft, "Using the Clipboard," http://msdn.microsoft.com/en-us/library/ms649016.aspx, printed Jun. 8, 2009 in 20 pages.
Mitzenmacher, Michael, "Compressed Bloom Filters," IEEE/ACM Tranactions on Networking, vol. 10, No. 5, Oct. 2002, pp. 604-612.
Mixpanel—Mobile Analytics, https://mixpanel.com/ Printed Jul. 18, 2013 in 13 pages.
Mizrachi, Ilene, "Chapter 1: GenBank: The Nuckeotide Sequence Database," The NCBI Handbook, Oct. 2002, pp. 1-14.
Mohring et al., "Partitioning Graphs to Speedup Dijkstra's Algorithm," ACM Journal of Experimental Algorithmics, Association of Computing Machinery, New York, New York, vol. 11, Jan. 1, 2006, 29 pages.
Nadeau et al., "A Survey of Named Entity Recognition and Classification," Jan. 15, 2004, pp. 20.
Nierman, "Evaluating Structural Similarity in XML Documents", 6 pages, 2002.
Nin et al., "On the Use of Semantic Blocking Techniques for Data Cleansing and Integration," 11th International Database Engineering and Applications Symposium, 2007, pp. 9.

(56) References Cited

OTHER PUBLICATIONS

Nitro, "Trick: How to Capture a Screenshot as PDF, Annotate, Then Share It," http://blog.nitropdf.com/2008/03/04/trick-how-to-capture-a-screenshot-as-pdf-annotate-it-then-share/, Mar. 4, 2008, pp. 2.

Nolan et al., "MCARTA: A Malicious Code Automated Run-Time Analysis Framework," Homeland Security (HST) 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Online Tech Tips, "Clip2Net—Share files, folders and screenshots easily," http://www.online-tech-tips.com/free-software-downloads/share-files-folders-screenshots/, Apr. 2, 2008, pp. 5.

Open Web Analytics (OWA), http://www.openwebanalytics.com/ Printed Jul. 19, 2013 in 5 pages.

O'Reilly.com, http://oreilly.com/digitalmedia/2006/01/01/mac-os-x-screenshot-secrets.html published Jan. 1, 2006 in 10 pages.

Palantir Technolgies, "Palantir Labs—Timeline," Oct. 1, 2010, retrieved from the internet https://www.youtube.com/watch?v=JCgDW5bru9M retrieved on Aug. 19, 2015.

Palmas et al., "An Edge-Bunding Layout for Interactive Parallel Coordinates" 2014 IEEE Pacific Visualization Symposium, pp. 57-64.

Perdisci et al., "Behavioral Clustering of HTTP-Based Malware and Signature Generation Using Malicious Network Traces," USENIX, Mar. 18, 2010, pp. 1-14.

Piwik—Free Web Analytics Software. http://piwik.org/ Printed Jul. 19, 2013 in18 pages.

Pythagoras Communications Ltd., "Microsoft CRM Duplicate Detection," Sep. 13, 2011, https://www.youtube.com/watch?v=j-7Qis0D0Kc.

Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.

Quest, "Toad for ORACLE 11.6—Guide to Using Toad," Sep. 24, 2012, pp. 1-162.

Reedy, Sarah, "Policy and Charging Rules Function (PCRF)," Sep. 13, 2010, http://www.lightreading.com/document.asp?doc_id=680015 printed Dec. 10, 2013 in 4 pages.

Rouse, Margaret, "OLAP Cube," http://searchdatamanagement.techtarget.com/definition/OLAP-cube, Apr. 28, 2012, pp. 16.

Russell et al., "NITELIGHT: A Graphical Tool for Semantic Query Construction," 2008, pp. 10.

Schroder, Stan, "15 Ways to Create Website Screenshots," http://mashable.com/2007/08/24/web-screenshots/, Aug. 24, 2007, pp. 2.

Sekine et al., "Definition, Dictionaries and Tagger for Extended Named Entity Hierarchy," May 2004, pp. 1977-1980.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. É29-Oct. 3, 2008, pp. 16.

SnagIt, "SnagIt 8.1.0 Print Out 2," Software release date Jun. 15, 2006, pp. 1-3.

SnagIt, "SnagIt 8.1.0 Print Out," Software release date Jun. 15, 2006, pp. 6.

SnagIt, "SnagIt Online Help Guide," http://download.techsmith.com/snagit/docs/onlinehelp/enu/snagit_help.pdf, TechSmith Corp., Version 8.1, printed Feb. 7, 2007, pp. 284.

Stamos et al., "Remote Evaluation," Journal ACM Transactions on Programming Languages and Systems (TOPLAS), vol. 12, Issue 4, Oct. 1990, pp. 537-564.

StatCounter—Free Invisible Web Tracker, Hit Counter and Web Stats, http://statcounter.com/ Printed Jul. 19, 2013 in 17 pages.

Symantec Corporation, "E-Security Begins with Sound Security Policies," Announcement Symantec, Jun. 14, 2001.

TestFlight—Beta Testing on the Fly, http://testflightapp.com/ Printed Jul. 18, 2013 in 3 pages.

Thompson, Mick, "Getting Started with GEO," Getting Started with GEO, Jul. 26, 2011.

trak.io, http://trak.io/ printed Jul. 18, 2013 in 3 pages.

Umagandhi et al., "Search Query Recommendations Using Hybrid User Profile with Query Logs," International Journal of Computer Applications, vol. 80, No. 10, Oct. 1, 2013, pp. 7-18.

UserMetrix, http://usermetrix.com/android-analytics printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wagner et al., "Dynamic Shortest Paths Containers," Electronic Notes in Theoretical Computer Science, vol. 92, No. 1, 2003, pp. 1-19.

Wang et al., "Research on a Clustering Data De-Duplication Mechanism Based on Bloom Filter," IEEE 2010, 5 pages.

Warren, Christina, "TUAW Faceoff: Screenshot apps on the firing line," http://www.tuaw.com/2008/05/05/tuaw-faceoff-screenshot-apps-on-the-firing-line/, May 5, 2008, pp. 11.

Wikipedia, "Federated Database System," Sep. 7, 2013, retrieved from the Internet on Jan. 27, 2015 http://en.wikipedia.org/w/index.php?title-Federated_database_system&oldid=571954221.

Wikipedia, "Machine Code," p. 1-5, printed Aug. 11, 2014.

Wikipedia, "Multimap," Jan. 1, 2013, https://en.wikipedia.org/w/index.php?title=Multimap&oldid=530800748.

Wollrath et al., "A Distributed Object Model for the Java System," Proceedings of the 2nd Conference on USENEX, Conference on Object-Oriented Technologies (COOTS), Jun. 17, 1996, pp. 219-231.

Wright et al., "Palantir Technologies VAST 2010 Challenge Text Records_Investigations into Arms Dealing," Oct. 29, 2010, pp. 1-10.

Xobni, "About Page," http://www.xobni.com/about/ printed Jun. 26, 2014 in 2 pages.

Xobni, "Blog," http://blog.xobni.com/ printed Jun. 26, 2014 in 11 pages.

Xobni, http://www.xobni.com/ printed Jun. 26, 2014 in 5 pages.

Yang et al., "An Enhanced Routing Method with Dijkstra Algorithm and AHP Analysis in GIS-based Emergency Plan," Geoinformatics, 2010 18th International Conference on, IEEE, Piscataway, New Jersey, Jun. 18, 2010, 6 pages.

Yang et al., "HTML Page Analysis Based on Visual Cues", A129, pp. 859-864, 2001.

Zhao et al., "Entity Matching Across Heterogeneous Data Sources: An Approach Based on Constrained Cascade Generalization," Data & Knowledge Engineering, vol. 66, No. 3, Sep. 2008, pp. 368-381.

International Search Report and Written Opinion for Patent Application No. PCT/US2009/056700 dated Apr. 15, 2010.

International Search Report and Written Opinion for Patent Application No. PCT/US2009/056703 dated Mar. 15, 2010.

International Search Report and Written Opinion for Patent Application No. PCT/US2009/056742 dated Apr. 19, 2010.

Notice of Acceptance for Australian Patent Application No. 2014250678 dated Oct. 7, 2015.

Notice of Acceptance for New Zealand Patent Application No. 616212 dated Jan. 23, 2015.

Notice of Acceptance for New Zealand Patent Application No. 616299 dated Apr. 7, 2015.

(56) References Cited

OTHER PUBLICATIONS

Notice of Acceptance for New Zealand Patent Application No. 622485 dated Nov. 24, 2014.
Notice of Allowance for U.S. Appl. No. 12/556,318 dated Nov. 2, 2015.
Notice of Allowance for U.S. Appl. No. 13/196,788 dated Dec. 18, 2015.
Notice of Allowance for U.S. Appl. No. 13/411,291 dated Apr. 22, 2016.
Notice of Allowance for U.S. Appl. No. 13/657,635 dated Jan. 29, 2016.
Notice of Allowance for U.S. Appl. No. 13/657,656 dated May 10, 2016.
Notice of Allowance for U.S. Appl. No. 13/767,779 dated Mar. 17, 2015.
Notice of Allowance for U.S. Appl. No. 13/826,228 dated Mar. 27, 2015.
Notice of Allowance for U.S. Appl. No. 13/827,627 dated Apr. 11, 2016.
Notice of Allowance for U.S. Appl. No. 13/922,212 dated Mar. 9, 2016.
Notice of Allowance for U.S. Appl. No. 14/019,534 dated Feb. 4, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/149,608 dated Aug. 5, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/254,757 dated Sep. 10, 2014.
Notice of Allowance for U.S. Appl. No. 14/254,773 dated Aug. 20, 2014.
Notice of Allowance for U.S. Appl. No. 14/265,637 dated Feb. 13, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/302,279 dated Apr. 5, 2016.
Notice of Allowance for U.S. Appl. No. 14/304,741 dated Apr. 7, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/581,902 dated Nov. 13, 2015.
Notice of Allowance for U.S. Appl. No. 14/616,080 dated Apr. 2, 2015.
Notice of Allowance for U.S. Appl. No. 14/746,671 dated Jan. 21, 2016.
Notice of Allowance for U.S. Appl. No. 14/923,364 dated May 6, 2016.
Notice of Allowance for U.S. Appl. No. 15/066,970 dated Jun. 29, 2016.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201511 dated Feb. 27, 2015.
Official Communication for Australian Patent Application No. 2014201580 dated Feb. 27, 2015.
Official Communication for Australian Patent Application No. 2014202442 dated Mar. 19, 2015.
Official Communication for Australian Patent Application No. 2014203669 dated May 29, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2807899 dated Jul. 20, 2015.
Official Communication for Canadian Patent Application No. 2807899 dated Oct. 24, 2014.
Official Communication for Canadian Patent Application No. 2828264 dated Apr. 11, 2016.
Official Communication for Canadian Patent Application No. 2828264 dated Apr. 28, 2015.
Official Communication for Canadian Patent Application No. 2829266 dated Apr. 1, 2016.
Official Communication for Canadian Patent Application No. 2829266 dated Apr. 28, 2015.
Official Communication for Canadian Patent Application No. 2846414 dated Apr. 13, 2016.
Official Communication for European Patent Application No. 08730336.8 dated Jun. 6, 2012.
Official Communication for European Patent Application No. 08839003.4 dated Aug. 14, 2012.
Official Communication for European Patent Application No. 09813700.3 dated Apr. 3, 2014.
Official Communication for European Patent Application No. 09813693.0 dated Apr. 8, 2014.
Official Communication for European Patent Application No. 13157474.1 dated May 28, 2013.
Official Communication for European Patent Application No. 13157474.1 dated Apr. 29, 2016.
Official Communication for European Patent Application No. 13157474.1 dated Oct. 30, 2015.
Official Communication for European Patent Application No. 14158861.6 dated Jun. 16, 2014.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Apr. 16, 2015.

(56) References Cited

OTHER PUBLICATIONS

Official Communication for European Patent Application No. 14159175.0 dated Jul. 17, 2014.
Official Communication for European Patent Application No. 14159175.0 dated Feb. 4, 2016.
Official Communication for European Patent Application No. 14159464.8 dated Feb. 18, 2016.
Official Communication for European Patent Application No. 14159464.8 dated Jul. 31, 2014.
Official Communication for European Patent Application No. 14159629.6 dated Sep. 22, 2014.
Official Communication for European Patent Application No. 14159629.6 dated Jul. 31, 2014.
Official Communication for European Patent Application No. 14162372.8 dated Apr. 30, 2015.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15159520.4 dated Jul. 15, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1318666.3 dated Mar. 25, 2014.
Official Communication for Great Britain Patent Application No. 1318667.1 dated Mar. 28, 2014.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012436 dated Nov. 6, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013134 dated Apr. 20, 2015.
Official Communication for Netherlands Patent Application No. 2013306 dated Apr. 24, 2015.
Official Communication for New Zealand Patent Application No. 627962 dated Aug. 5, 2014.
Official Communication for New Zealand Patent Application No. 616212 dated May 7, 2014.
Official Communication for New Zealand Patent Application No. 616212 dated Oct. 9, 2013.
Official Communication for New Zealand Patent Application No. 616299 dated Jan. 26, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622414 dated Mar. 24, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622484 dated Apr. 2, 2014.
Official Communication for New Zealand Patent Application No. 622485 dated Nov. 21, 2014.

(56) References Cited

OTHER PUBLICATIONS

Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 623323 dated Apr. 17, 2014.
Official Communication for New Zealand Patent Application No. 623323 dated Jun. 6, 2014.
Official Communication for New Zealand Patent Application No. 624557 dated May 14, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for U.S. Appl. No. 12/210,947 dated Jul. 1, 2013.
Official Communication for U.S. Appl. No. 12/210,947 dated Aug. 19, 2014.
Official Communication for U.S. Appl. No. 12/210,947 dated Nov. 28, 2014.
Official Communication for U.S. Appl. No. 12/210,947 dated Apr. 8, 2011.
Official Communication for U.S. Appl. No. 12/210,980 dated Mar. 10, 2015.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Oct. 6, 2016.
Official Communication for U.S. Appl. No. 12/556,321 dated Jul. 7, 2015.
Official Communication for U.S. Appl. No. 13/079,690 dated Sep. 11, 2013.
Official Communication for U.S. Appl. No. 13/079,690 dated Jan. 29, 2014.
Official Communication for U.S. Appl. No. 13/079,690 dated Mar. 5, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 13/218,238 dated Nov. 21, 2013.
Official Communication for U.S. Appl. No. 13/218,238 dated Oct. 25, 2013.
Official Communication for U.S. Appl. No. 13/218,238 dated Jul. 29, 2013.
Official Communication for U.S. Appl. No. 13/218,238 dated Jan. 6, 2014.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/411,291 dated Oct. 1, 2015.
Official Communication for U.S. Appl. No. 13/411,291 dated Jul. 15, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Jul. 10, 2014.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/669,274 dated May 6, 2015.
Official Communication for U.S. Appl. No. 13/728,879 dated Mar. 17, 2015.
Official Communication for U.S. Appl. No. 13/799,535 dated Jul. 29, 2014.
Official Communication for U.S. Appl. No. 13/799,535 dated Feb. 3, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/827,627 dated Aug. 26, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 13/922,212 dated Jan. 5, 2015.
Official Communication for U.S. Appl. No. 13/937,063 dated Apr. 22, 2016.
Official Communication for U.S. Appl. No. 14/134,558 dated May 16, 2016.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Mar. 3, 2016.
Official Communication for U.S. Appl. No. 14/025,653 dated Oct. 6, 2015.
Official Communication for U.S. Appl. No. 14/134,558 dated Oct. 7, 2015.
Official Communication for U.S. Appl. No. 14/141,252 dated Oct. 8, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.

(56) References Cited

OTHER PUBLICATIONS

Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/265,637 dated Nov. 18, 2014.
Official Communication for U.S. Appl. No. 14/265,637 dated Sep. 26, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/302,279 dated Sep. 24, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 31, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/516,386 dated Apr. 27, 2017.
Official Communication for U.S. Appl. No. 14/516,386 dated Jun. 30, 2016.
Official Communication for U.S. Appl. No. 14/516,386 dated Nov. 4, 2016.
Official Communication for U.S. Appl. No. 14/552,336 dated Jul. 20, 2015.
Official Communication for U.S. Appl. No. 14/562,524 dated Nov. 10, 2015.

(56) References Cited

OTHER PUBLICATIONS

Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/618,213 dated May 16, 2017.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/715,834 dated Apr. 13, 2016.
Official Communication for U.S. Appl. No. 14/715,834 dated Jun. 28, 2016.
Official Communication for U.S. Appl. No. 14/715,834 dated Feb. 29, 2016.
Official Communication for U.S. Appl. No. 14/726,211 dated Apr. 5, 2016.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/816,599 dated Dec. 22, 2016.
Official Communication for U.S. Appl. No. 14/816,599 dated May 31, 2017.
Official Communication for U.S. Appl. No. 14/842,734 dated Nov. 19, 2015.
Official Communication for U.S. Appl. No. 14/877,229 dated Mar. 22, 2016.
Official Communication for U.S. Appl. No. 14/923,374 dated May 23, 2016.
Official Communication for U.S. Appl. No. 14/923,374 dated Feb. 9, 2016.
Official Communication for U.S. Appl. No. 15/017,324 dated Apr. 22, 2016.
Restriction Requirement for U.S. Appl. No. 13/839,026 dated Apr. 2, 2015.
Notice of Allowance for U.S. Appl. No. 14/516,386 dated Sep. 1, 2017.
Notice of Allowance for U.S. Appl. No. 14/715,834 dated Sep. 27, 2017.
Notice of Allowance for U.S. Appl. No. 15/144,602 dated Sep. 7, 2017.
Official Communication for European Patent Application No. 12181585.6 dated Sep. 4, 2015.
Official Communication for European Patent Application No. 12181585.6 dated Jan. 7, 2013.
Official Communication for European Patent Application No. 14158861.6 dated Nov. 2, 2016.
Official Communication for European Patent Application No. 15159520.4 dated Jul. 20, 2016.
Official Communication for New Zealand Patent Application No. 616299 dated Oct. 9, 2013.
Official Communication for U.S. Appl. No. 12/556,321 dated Jun. 30, 2017.
Official Communication for U.S. Appl. No. 14/134,558 dated Aug. 26, 2016.
Official Communication for U.S. Appl. No. 14/618,213 dated Oct. 24, 2017.
Official Communication for U.S. Appl. No. 14/715,834 dated Feb. 19, 2016.
Official Communication for U.S. Appl. No. 14/715,834 dated Aug. 28, 2017.
Official Communication for U.S. Appl. No. 15/220,021 dated Jul. 12, 2017.
International Search Report and Written Opinion for Patent Application No. PCT/US2008/077528 dated Dec. 4, 2008.
Notice of Acceptance for Australian Patent Application No. 2014201553 dated Feb. 19, 2018.
Notice of Acceptance for Australian Patent Application No. 2014201558 dated Mar. 1, 2018.
Official Communication for U.S. Appl. No. 15/220,021 dated Dec. 14, 2017.
Official Communication for U.S. Appl. No. 12/556,321 dated Mar. 26, 2018.
Official Communication for U.S. Appl. No. 14/618,213 dated Mar. 29, 2018.
Official Communication for U.S. Appl. No. 14/816,599 dated Feb. 6, 2018.
Official Communication for U.S. Appl. No. 15/847,720 dated Mar. 8, 2018.
Bruce Eckel, Thinking in Java, EckelObjects, 1997 (Year: 1997).
Pedicini J et al: "Step by Step. Microsoft Word Version 2002, Chapter 8 Collaborating with Others", Microsoft Word Version 2002 Step by Step, Microsoft, Redmond, WA, US, Jan. 1, 2001, pp. 129-149, 208.
Official Communication for European Patent Application No. 9813693.0 dated Jan. 8, 2019.
Official Communication for U.S. Appl. No. 14/618,213 dated Sep. 7, 2018.
Official Communication for U.S. Appl. No. 15/847,720 dated Jun. 12, 2018.

* cited by examiner

FILTER CHAINS FOR EXPLORING LARGE DATA SETS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/149,608 filed Jan. 7, 2014, which claims benefit of U.S. Provisional Application No. 61/794,653, entitled "FILTER CHAINS WITH ASSOCIATED MULTI-PLATH VIEWS FOR EXPLORING LARGE DATA SETS," which was filed Mar. 15, 2013. Each of these applications are hereby incorporated by reference herein in their entireties.

TECHNICAL FIELD

The present disclosure relates to systems and techniques for data integration, analysis, and visualization. More specifically, the present disclosure relates to systems and techniques for exploring large data sets in multipath views.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysts often perform analysis of a large collection of data items, such as data relating to the medical field, the financial industry, the real estate market, and the like. In many instances, the amount of raw data about data items (also referred to as "inventory") can be massive and dynamically increasing all the time. For example, such data may be updated in large volumes and/or numerous times in a day. Therefore, in addition to metadata that captures relatively stable aspects of the inventory, a huge amount of raw data may be accumulated over a particular period of time.

While inventory can possibly be analyzed based on the raw data, it is often difficult to make sense of the raw data, metadata, or related computations. This problem is drastically compounded when analyzing a large collection of inventory. Thus, an analyst often is forced to rely on inexact hunches, experience, and/or cumbersome spreadsheets to identify trends, diagnose problems, and/or otherwise evaluate the inventory.

SUMMARY

One aspect of this disclosure provides a computing system comprising a network interface that is coupled to a data network for receiving and transmitting one or more packet flows. The computer system further comprises a processor. The computer system further comprises one or more stored program instructions configured for execution by the processor in order to cause the computing system to create and store in computer memory a first filter chain indicating one or more first membership criteria. The executed stored program instructions may further cause the computing system to apply the first filter chain to a data set to identify one or more first data items that satisfy the first membership criteria and one or more second data items that do not satisfy the first membership criteria. The executed stored program instructions may further cause the computing system to transmit the first data items and the second data items to a client computer configured to display the first data items in a first filter view in a first graphically demarcated area and the second data items in a second filter view in a second graphically demarcated area. The executed stored program instructions may further cause the computing system to receive a user selection of the first graphically demarcated area and the second graphically demarcated area. The executed stored program instructions may further cause the computing system to determine one or more second membership criteria. The executed stored program instructions may further cause the computing system to create a second filter chain based on the first filter chain and the second membership criteria. The executed stored program instructions may further cause the computing system to apply the second filter chain to the data set to identify one or more third data items that satisfy the first membership criteria and the second membership criteria, one or more fourth data items that satisfy the first membership criteria and do not satisfy the second membership criteria, one or more fifth data items that satisfy the second membership criteria and do not satisfy the first membership criteria, and one or more sixth data items that do not satisfy the first membership criteria and do not satisfy the second membership criteria. The executed stored program instructions may further cause the computing system to transmit the third data items, the fourth data items, the fifth data items, and sixth data items to the client computer. The client computer may be configured to display the third data items and the fourth data items in the first graphically demarcated area, and the fifth data items and the sixth data items in the second graphically demarcated area.

Another aspect of this disclosure provides a computer-implemented method of analyzing and exploring a large amount of dynamically updating data. The computer-implemented method comprises, as implemented by one or more computer systems comprising computer hardware and memory, the one or more computer systems configured with specific executable instructions, receiving, from a user of the one or more computer systems, selection of a first membership criteria for application on a first data set comprising a plurality of data items. The computer-implemented method further comprises applying the first membership criteria to the data set to identify a first set of data items that satisfy the first membership criteria and a second set of data items that do not satisfy the first membership criteria. The computer-implemented method further comprises generating a user interface including indications of the first set of data items in a first area and indications of the second set of data items in a second area. The computer-implemented method further comprises receiving, from the user, selection of a second membership criteria for application on the first data set. The computer-implemented further comprises applying the first membership criteria and the second membership criteria to the data set to identify a third set of data items that satisfy the first membership criteria and the second membership criteria, a fourth set of data items that satisfy the first membership criteria and do not satisfy the second membership criteria, a fifth set of data items that satisfy the second membership criteria and do not satisfy the first membership criteria, and a sixth set of data items that do not satisfy the first membership criteria and do not satisfy the second membership criteria. The computer-implemented method further comprises updating the user interface to include an indication of the third set of data items and the fourth set of data items in the first area, and the fifth set of data items and the sixth set of data items in the second area.

Another aspect of this disclosure provides a non-transitory computer-readable medium comprising one or more program instructions recorded thereon, the instructions configured for execution by a computing system comprising one or more processors in order to cause the computing system to determine a first membership criteria to be applied to a data set including a plurality of data items. The medium further comprises one or more program instructions configured for execution by the computing system to cause the computing system to identify one or more first data items of the data set that satisfy the first membership criteria. The medium further comprises one or more program instructions configured for execution by the computing system to cause the computing system to identify one or more second data items of the data set that do not satisfy the first membership criteria. The medium further comprises one or more program instructions configured for execution by the computing system to cause the computing system to transmit display instructions to a client computer device, the display instructions indicating display of a first filter view of the one or more first data items in a first graphically demarcated area and display of a second filter view of the one or more second data items in a second graphically demarcated area, such that information regarding both the data items matching the first membership criteria and data items not matching the first membership criteria are viewable by a user of the client computer device.

BRIEF DESCRIPTION OF THE DRAWINGS

FIG. 9-1 illustrates a content pane included in the GUI of FIG. 9.

FIG. 9-2 illustrates another content pane included in the GUI of FIG. 9.

FIG. 9-3 illustrates another content pane included in the GUI of FIG. 9.

FIG. 9-4 illustrates another content pane included in the GUI of FIG. 9.

FIG. 10-1A illustrates a content pane included in the GUI of FIG. 10.

FIG. 10-1B illustrates another content pane included in the GUI of FIG. 10.

FIG. 10-2A illustrates another content pane included in the GUI of FIG. 10.

FIG. 10-2B illustrates another content pane included in the GUI of FIG. 10.

FIG. 10-3A illustrates another content pane included in the GUI of FIG. 10.

FIG. 10-3B illustrates another content pane included in the GUI of FIG. 10.

FIG. 10-4A illustrates another content pane included in the GUI of FIG. 10.

FIG. 10-4B illustrates another content pane included in the GUI of FIG. 10.

FIG. 11-1A illustrates a content pane included in the GUI of FIG. 11.

FIG. 11-1B illustrates another content pane included in the GUI of FIG. 11.

FIG. 11-1C illustrates another content pane included in the GUI of FIG. 11.

FIG. 11-1D illustrates another content pane included in the GUI of FIG. 11.

FIG. 11-2A illustrates another content pane included in the GUI of FIG. 11.

FIG. 11-2B illustrates another content pane included in the GUI of FIG. 11.

FIG. 11-2C illustrates another content pane included in the GUI of FIG. 11.

FIG. 11-2D illustrates another content pane included in the GUI of FIG. 11.

FIG. 11-3A illustrates another content pane included in the GUI of FIG. 11.

FIG. 11-3B illustrates another content pane included in the GUI of FIG. 11.

FIG. 11-3C illustrates another content pane included in the GUI of FIG. 11.

FIG. 11-3D illustrates another content pane included in the GUI of FIG. 11.

FIG. 11-4A illustrates another content pane included in the GUI of FIG. 11.

FIG. 11-4B illustrates another content pane included in the GUI of FIG. 11.

FIG. 11-4C illustrates another content pane included in the GUI of FIG. 11.

FIG. 11-4D illustrates another content pane included in the GUI of FIG. 11.

FIG. 12-1A illustrates a content pane included in the GUI of FIG. 12.

FIG. 12-1B illustrates another content pane included in the GUI of FIG. 12.

FIG. 12-1C illustrates another content pane included in the GUI of FIG. 12.

FIG. 12-1D illustrates another content pane included in the GUI of FIG. 12.

FIG. 12-2A illustrates another content pane included in the GUI of FIG. 12.

FIG. 12-2B illustrates another content pane included in the GUI of FIG. 12.

FIG. 12-3A illustrates another content pane included in the GUI of FIG. 12.

FIG. 12-3B illustrates another content pane included in the GUI of FIG. 12.

FIG. 12-4A illustrates another content pane included in the GUI of FIG. 12.

FIG. 12-4B illustrates another content pane included in the GUI of FIG. 12.

DETAILED DESCRIPTION OF SPECIFIC EMBODIMENTS

Overview

Figure 1:
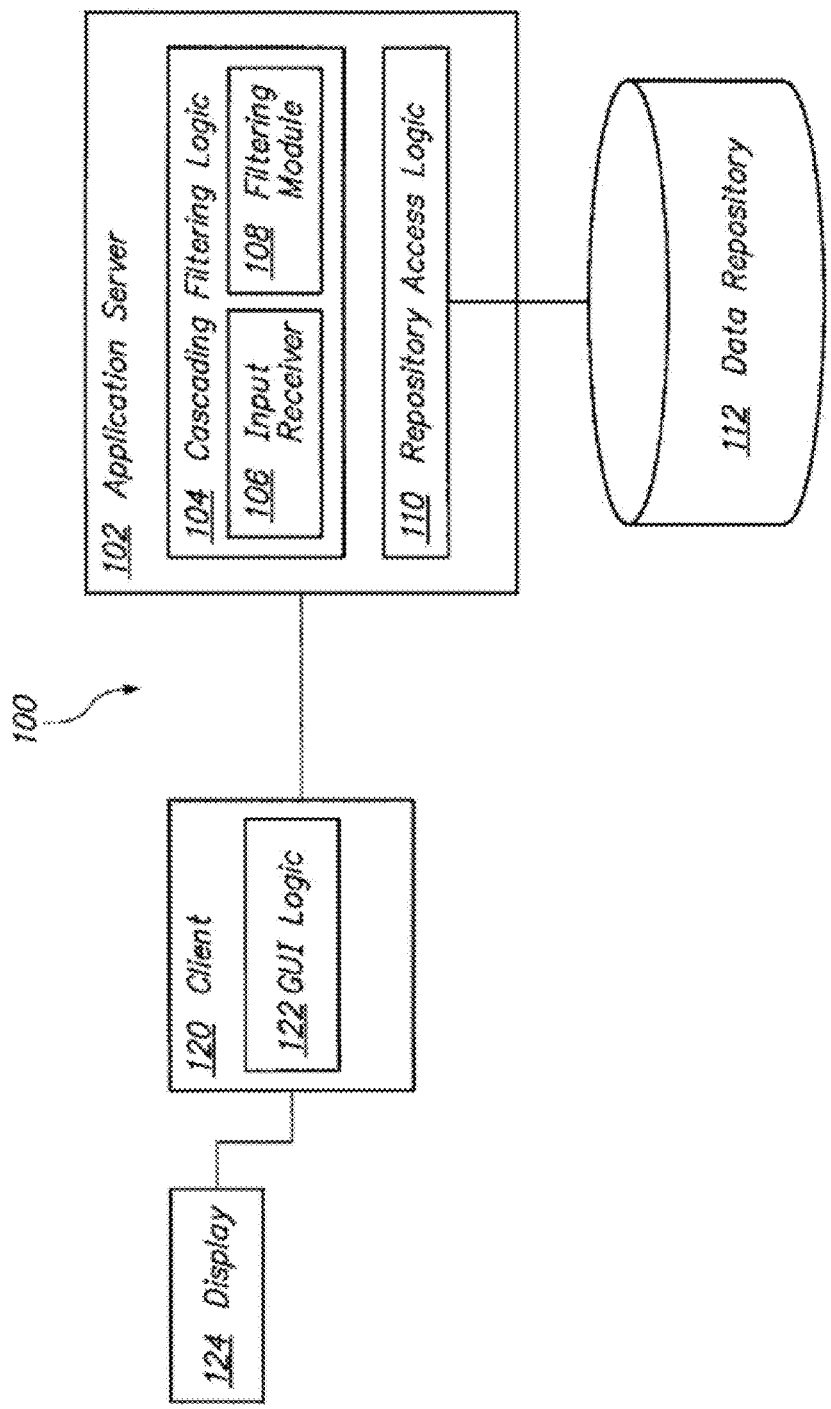
FIG. 1 illustrates an example data analysis system for analyzing a universe of data items.

Aspects of the disclosure provided herein describe the creation and implementation of a multipath explorer. As described above, it can be very difficult to make sense of raw data, metadata, or related computations, especially when analyzing a large collection of inventory. The multipath explorer reduces or eliminates the need for an analyst to rely on inexact hunches, experience, and/or cumbersome spreadsheets to identify trends, diagnose problems, and/or otherwise evaluate inventory or objects in one or more databases. In particular, the multipath explorer simplifies the analysis such that an analyst can make sense of raw data, metadata, or related computations, even when analyzing a large collection of inventory that is dynamically updating all the time.

In one embodiment, the multipath explorer allows a user (e.g., analyst) to quickly (e.g., immediately or substantially immediately) visualize an entire population (e.g., all the data in a data set), one or more subsets of the entire population (e.g., certain data in the data set that satisfies membership criteria), and one or more endpoints of an analysis of subsets of the entire population arranged hierarchically in a structure, such as a tree, a directed acyclic graph (DAG), or other structure. Any discussion herein of a particular structure or view, such as a tree structure, may also be applicable to any other structure or view, such as a DAG. As the population is updated, the multipath explorer dynamically updates one or more views such that the user can immediately visualize the entire updated population, one or more subsets of the entire updated population, and one or more endpoints of an analysis of subsets of the entire updated population. The speed and accuracy by which the multipath explorer updates the one or more views cannot be performed manually by a human since a human would need to continuously redo hundreds to millions or more computations each time the inventory is updated.

For example, a user can select a first filter to be applied to a data set, and the multipath explorer can display data in the data set that satisfies the first filter requirements and data in the data set that does not satisfy the first filter requirements. A second filter can be applied to some or all of the data in the data set, and the multipath explorer can display data in the data set that satisfies the first filter and second filter requirements, data in the data set that satisfies the first filter requirements and not the second filter requirements, data in the data set that satisfies the second filter requirements and not the first filter requirements, and/or data in the data set that does not satisfy the first filter or second filter requirements. Additional filters may be applied and the multipath explorer may generate corresponding views.

As an example use case, the data set may correspond to loan values for homes. A first filter may require that the homes be in California and a second filter may require that the homes be single family homes. Once the first filter is applied, the multipath explorer may display loan values for homes in California and loan values for homes not in California. The second filter may then be applied to only homes in California, only homes not in California, and/or to all homes. For example, if the second filter is applied to only homes in California, the multipath explorer may display loan values for single family homes in California, loan values for homes in California that are not single family homes (e.g., multi family homes in California), and loan values for homes not in California. As another example, if the second filter is applied to only homes not in California, the multipath explorer may display loan values for homes in California, loan values for single family homes not in California, and loan values for homes that are not single family homes and that are not in California (e.g., multi family homes not in California). As another example, if the second filter is applied to all homes, the multipath explorer may display loan values for single family homes in California, loan values for homes in California that are not single family homes (e.g., multi family homes in California), loan values for single family homes not in California, and loan values for homes that are not single family homes and that are not in California (e.g., multi family homes not in California).

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, an inventory, an item, a product, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Data Item: An attribute of a data object. A data item can be represented by a number of attributes. These attributes may comprise relatively stable attributes along a dimension, such as time, and a number of measurable attributes that are dynamic along the same dimension. Values of the relatively stable properties of a data item constitute metadata. Values of the measurable properties of a data item constitute measured data along a certain dimension, say time. Examples of measured data include, but are not limited to, one or more sequences of measurements (e.g., raw measurement data) on one or more of the measurable properties. The data analysis system may determine a plurality of attributes for a data item based on the sequences of measurements. In an embodiment, a data item may be represented by a combination of metadata, sequences of measurements, and/or attributes based on the sequences of measurements.

Data Set: A starting set of data items for a filter chain, a universe of data items, a result set from one or more prior filtering operations performed on the universe of data items, or a subset in the universe of data items.

Filter: A filter link that can be selected by a user to be a part of a filter chain; and/or a filter view that provides a display of results of an evaluation of the filter chain. In some embodiments, a filter view can be used to modify an existing filter that is within the filter view.

Filter Chain: An object that consists of a starting set of data items, such as inventory, and a set of zero or more filter links.

Filter Link: A component object that consists of a set operation (e.g., narrow, expand, modify, transform, average, plot, etc.) and a membership criterion. A filter link may be one of many in a filter chain.

Filter View: A view of results of an evaluation of an existing filter chain. Each filter link in the filter chain can have a filter view associated with it. Filter views may be paired 1:1 with filter links. An individual filter view gives some graphical representation of some internal state of the computation involved in applying the membership criterion in the filter link to a set of data items that has made it to the filter link in question (which has passed all the previous filter links in the chain). The user can interact with the view associated with a particular filter link in order to change membership criterion for the particular filter link. For example, a histogram view shown in FIG. 3B is a view attached to the Histogram filter, and by clicking and dragging to select ranges along the x-axis of the histogram view, one actually changes the membership criterion for that filter.

Frame: A graphical representation object that is configurable to include one or more GUI components. Examples of frames include, but are not limited to, dialog boxes, forms, and other types of windows or graphical containers.

Graphically Demarcated Area: A bounded area on a graphic user interface. In some embodiments, a graphically demarcated area may be implemented as a window, a frame, or a content pane that is separate and apart from a portion of GUI that concurrently displays a list view, a table view, or a tree view, of data items. Examples of a graphically demarcated area also include a specific portion of a display on a handheld computing device.

Inventory: A data object that can be monitored. For example, medical data (e.g., types of surgeries, number of heart attacks, ailments that cause illness and/or death, etc.), financial data (e.g., stocks, bonds and derivatives thereof (e.g. stock options, bond futures, mutual funds) that can be traded on stock markets and/or exchanges), real estate data (e.g., loan values, number of plots and/or homes sold, number of homes and/or buildings constructed, etc.), and the like can be types of inventory that can be monitored.

Membership Criterion: A function that selects a set of inventory. Starting Set of Inventory: A set of inventory that can be specified independent of the rest of the filter chain. This can be the "universe" of all the inventory known to a system or it can be the empty set.

Universe of Data Items: A set of data items that is known to a data analysis system.

Data Analysis System Overview

FIG. 1 illustrates an example data analysis system for analyzing a universe of data items. Data analysis system 100 comprises application server 102 and one or more clients, such as client 120.

Figure 14:
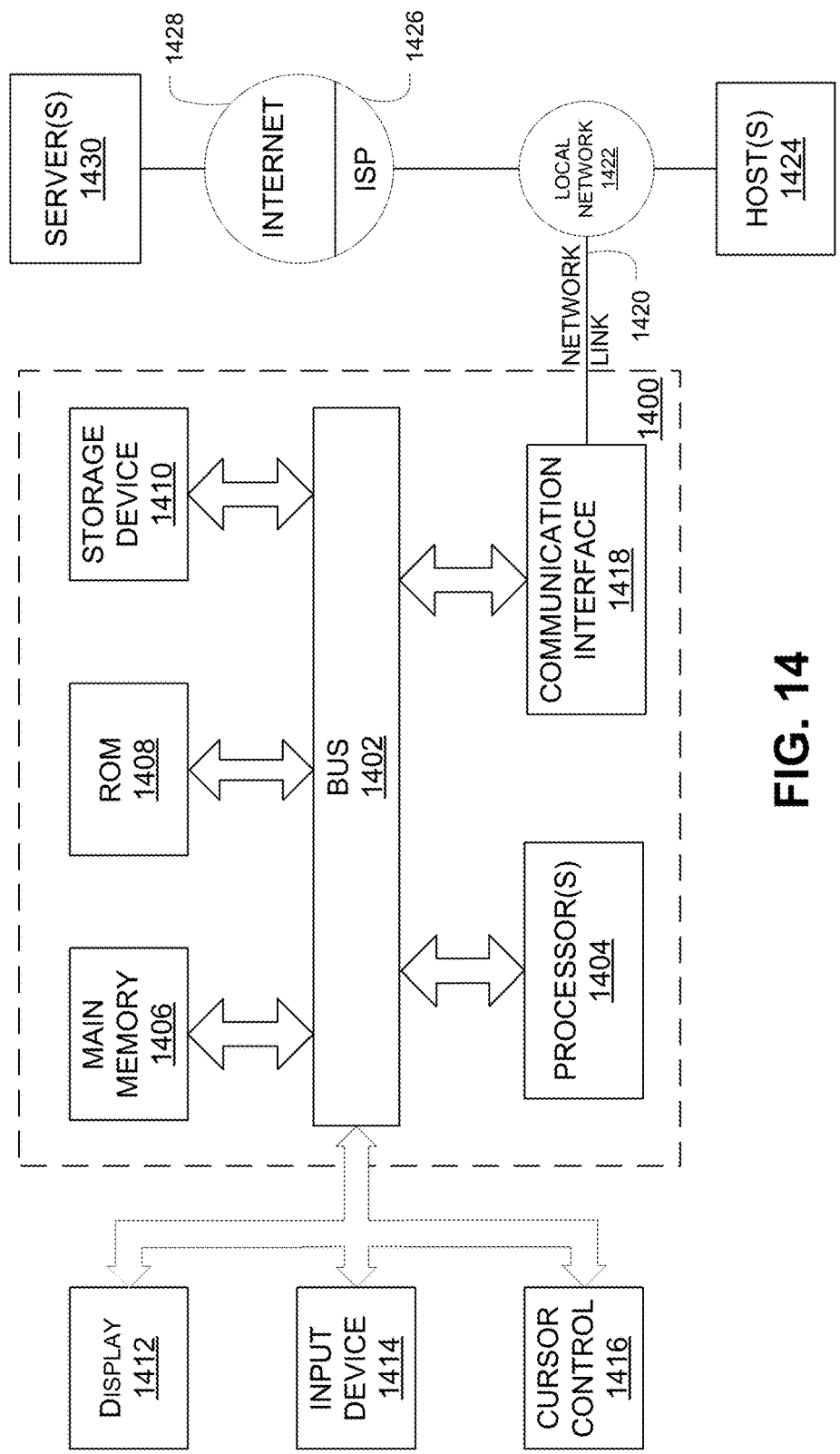
FIG. 14 illustrates a computer system with which certain methods discussed herein may be implemented.

In the embodiment illustrated in FIG. 1, client 120, which may be implemented by one or more first physical computing devices, is communicatively connected to application server 102, which may be implemented by one or more second physical computing devices, over a network. In some embodiments, each such physical computing device may be implemented as a computer system as shown in FIG. 14. For example, client 120 may be implemented in a computer system as a set of program instructions recorded on a machine-readable storage medium. Client 120 comprises graphical user interface (GUI) logic 122. GUI logic 122 may be a set of program instructions which, when executed by one or more processors of the computer system, are operable to receive user input and to display a graphical representation of analytical results of a universe of data items using the approaches herein. GUI logic 122 may be operable to receive user input from, and display analytical results to, a graphical user interface that is provided on display 124 by the computer system on which client 120 executes.

In some embodiments, GUI logic 122 is omitted. For example, in one embodiment, client 120 may comprise an application program or process that issues one or more function calls or application programming interface (API) calls to application server 102 to obtain information resulting from, to provide input to, and to execute along with application server 102, the processes or one or more steps thereof as described herein. For example, client 120 may request and obtain filtered data, filter chains, sets and other data as described further herein using a programmatic interface, and then the client may use, process, log, store, or otherwise interact with the received data according to local logic. Client 120 may also interact with application server 102 to provide input, definition, editing instructions, expressions related to filtered data, filter chains, sets and other data as described herein using a programmatic interface, and then the application server 102 may use, process, log, store, or otherwise interact with the received input according to application server logic.

Application server 102 may be implemented as a special-purpose computer system having the logical elements shown in FIG. 1. In an embodiment, the logical elements may comprise program instructions recorded on one or more machine-readable storage media. Alternatively, the logical elements may be implemented in hardware, firmware, or a combination.

When executed by one or more processors of the computer system, logic in application server 102 is operable to analyze the universe of data items according to the techniques described herein. In one embodiment, application server 102 may be implemented in a Java Virtual Machine (JVM) that is executing in a distributed or non-distributed computer system. In other embodiments, application server 102 may be implemented as a combination of programming instructions written in any programming language (e.g. C++ or Visual Basic) and hardware components (e.g., memory, CPU time) that have been allocated for executing the program instructions.

In an embodiment, application server 102 comprises repository access logic 110 and cascading filtering logic 104. Repository access logic 110 may comprise a set of program instructions which, when executed by one or more processors, are operable to access and retrieve data from data repository 112. For example, repository access logic 110 may be a database client or an Open Database Connectivity (ODBC) client that supports calls to a database server that manages data repository 112. Data repository 112 may be any type of structured storage for storing data including, but not limited to, relational or object-oriented databases, data warehouses, directories, data files, and any other structured data storage.

In an embodiment, cascading filtering logic 104 is operable to retrieve an existing filter chain based on prior saved information or prior user selections, receive new user selection of membership criteria and set operations from a client, create a new filter chain based on the user selection and the existing filter chain, create a new inventory group based on the new filter chain, and generate a filter view that may be operated on by a user of a client. In the embodiment illustrated in FIG. 1, cascading filtering logic 104 comprises input receiver 106 and filtering module 108. Cascading filtering logic 104 may be object-oriented logic. As used herein, the universe of data items can be accessed and/or operated by the cascading filtering logic 104 to generate the analytical results.

In an embodiment, input receiver 106 is a set of program instructions which, when executed by one or more processors, are operable to receive input, including user selection of membership criteria and set operations, from a client.

Filtering module 108 is a set of program instructions that implement logic to create filter chains based on membership criteria and set operations and apply the filter chains to a universe of data items to create filter views that may be provided to a client. Filter views may also be rendered by GUI logic 122 on display 120.

Example Process Flows

Figure 2A:
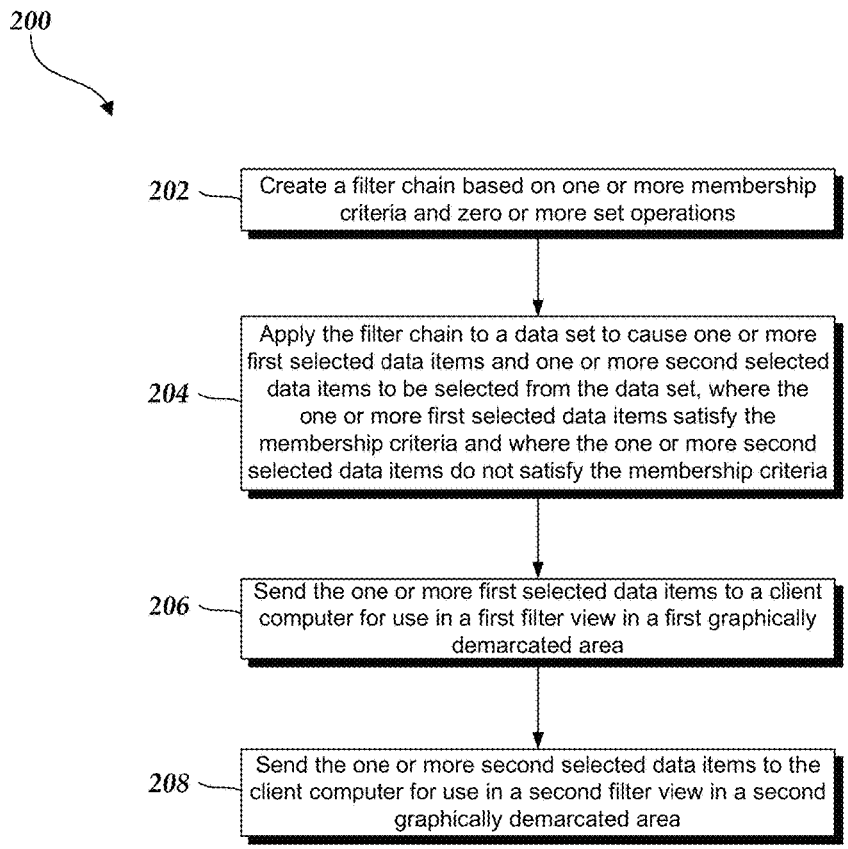
FIG. 2A illustrates an example process flow for analyzing a data set.

FIG. 2A illustrates an example process flow for analyzing a data set. In block 202, the data analysis system 100 creates a filter chain based on one or more membership criteria and zero or more set operations. For example, the filter chain may be retrieved from the data repository 112 in which the filter chain has been previously defined and saved, or may be defined by one or more user inputs.

In block 204, the data analysis system 100 applies the filter chain to a data set to cause one or more first selected data items to be selected from the data set and one or more second selected data items to be selected from the data set. For example, the first selected data items may be data items that satisfy the membership criteria and the second selected data items may be data items that do not satisfy the membership criteria. The filter chain may be a histogram filter that selects all data items in a data set that satisfy the membership criteria. In alternative embodiments, zero data items may be returned when the filter chain is applied to the data set.

In block 206, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the membership criteria. As another example, the first filter view may be a list view filter that displays all heart attacks that occurred in a region specified by the membership criteria. As another example, the first filter view may be a histogram view filter that displays the number of stocks purchased over a period specified by the membership criteria. The first graphically demarcated area may be a content pane that is separate and apart from a list, table, or tree view that presents a scrollable listing of all inventory.

In block 208, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the membership criteria. The second graphically demarcated area may be a content pane that is separate and apart from a list, table, or tree view that presents a scrollable listing of all inventory. Thus the user can advantageously view homes for sale (or other objects) that match the provided membership criteria in a first graphical display and also view homes for sale (or other objects) that do not match the provided membership criteria in a second graphical display.

Figure 2B:
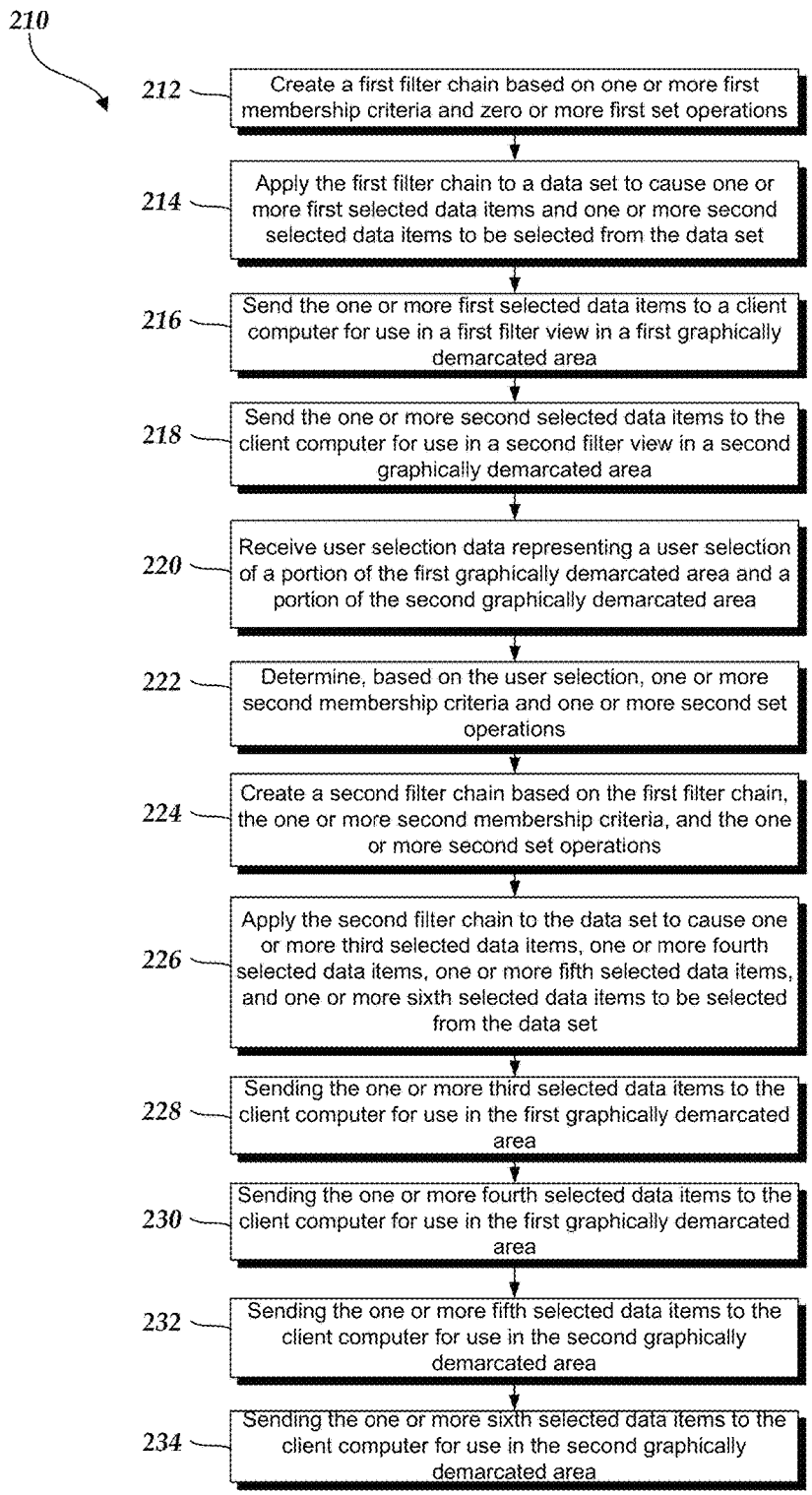
FIG. 2B illustrates another example process flow for analyzing a data set.

FIG. 2B illustrates another example process flow for analyzing a data set, wherein a second filter chain is applied in order to generate further visualizations of various combinations of data sets matching and not matching the first and second filter chain. In block 212, the data analysis system 100 creates a first filter chain based on one or more first membership criteria and zero or more first set operations. For example, the first filter chain may be retrieved from the data repository 112 in which the first filter chain has been previously defined and saved.

In block 214, the data analysis system 100 applies the first filter chain to a data set to cause one or more first selected data items to be selected from the data set and one or more second selected data items to be selected from the data set. For example, the first selected data items may be data items that satisfy the first membership criteria and the second selected data items may be data items that do not satisfy the first membership criteria. The first filter chain may be a histogram filter that selects all data items in a data set that satisfy the first membership criteria. In alternative embodiments, zero data items may be returned when the first filter chain is applied to the data set.

In block 216, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the first membership criteria. The first graphically demarcated area may be a content pane that is separate and apart from a list, table, or tree view that presents a scrollable listing of all inventory.

In block 218, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the first membership criteria. The second graphically demarcated area may be a content pane that is separate and apart from a list, table, or tree view that presents a scrollable listing of all inventory.

In block 220, the data analysis system 100 receives user selection data representing a user selection of a portion of the first graphically demarcated area and a portion of the second graphically demarcated area. For example, the user may select a particular type of home in the list view, where the particular type of home represents homes of a particular type of use (e.g., single family, multi family, etc.). The user may select the same type of home in the first graphically demarcated area and the second graphically demarcated area. In alternative embodiments, the user may additionally or alternatively enter criteria in a suitable input means such as a text field entry. For example, the user may specify in a text field entry the type of home to be selected.

In block 222, the data analysis system 100 determines, based on the user selection, one or more second membership criteria and one or more second set operations. For example, the one or more second membership criteria may comprise a membership criterion that an inventory must be the selected type of home.

In block 224, the data analysis system 100 creates a second filter chain based on the first filter chain, the one or more second membership criteria, and the one or more second set operations. For example, this second filter chain comprises two filter links, with the first filter link selecting all the homes in a particular region and the second filter link selecting only those inventories in the particular region that are of the selected type of home.

In block 226, the data analysis system 100 applies the second filter chain to the data set to cause one or more third selected data items, one or more fourth selected data items, one or more fifth data items, and one or more sixth data items to be selected from the data set. For example, the third selected data items may be data items that satisfy the first membership criteria and the second membership criteria, the fourth selected data items may be data items that satisfy the first membership criteria and do not satisfy the second membership criteria, the fifth selected data items may be data items that do not satisfy the first membership criteria and do satisfy the second membership criteria, and the sixth selected data items may be data items that do not satisfy the first membership criteria and do not satisfy the second membership criteria.

In block 228, the data analysis system 100 sends the one or more third selected data items to the client computer for constructing a third filter view in the first graphically demarcated area (e.g., the one or more third selected data items are configured to be viewed in the third filter view). For example, the third filter view may be a histogram filter view that displays the number of homes and the sale value for those homes in a region specified by the first membership criteria and that are of a type specified by the second membership criteria. In alternative embodiments, zero data items may be returned when the second filter chain is applied to the data set.

In block 230, the data analysis system 100 sends the one or more fourth selected data items to the client computer for constructing a fourth filter view in the first graphically demarcated area (e.g., the one or more fourth selected data items are configured to be viewed in the fourth filter view). For example, the fourth filter view may be a histogram filter view that displays the number of homes and the sale value for those homes in a region specified by the first membership criteria and that are not of a type specified by the second membership criteria. In alternative embodiments, zero data items may be returned when the second filter chain is applied to the data set.

In block 232, the data analysis system 100 sends the one or more fifth selected data items to the client computer for constructing a fifth filter view in the second graphically demarcated area (e.g., the one or more fifth selected data items are configured to be viewed in the fifth filter view). For example, the fifth filter view may be a histogram filter view that displays the number of homes and the sale value for those homes that are not in a region specified by the first membership criteria and that are of a type specified by the second membership criteria. In alternative embodiments, zero data items may be returned when the second filter chain is applied to the data set.

In block 234, the data analysis system 100 sends the one or more sixth selected data items to the client computer for constructing a sixth filter view in the second graphically demarcated area (e.g., the one or more sixth selected data items are configured to be viewed in the sixth filter view). For example, the sixth filter view may be a histogram filter view that displays the number of homes and the sale value for those homes that are not in a region specified by the first membership criteria and that are not of a type specified by the second membership criteria. In alternative embodiments, zero data items may be returned when the second filter chain is applied to the data set.

Figure 2C:
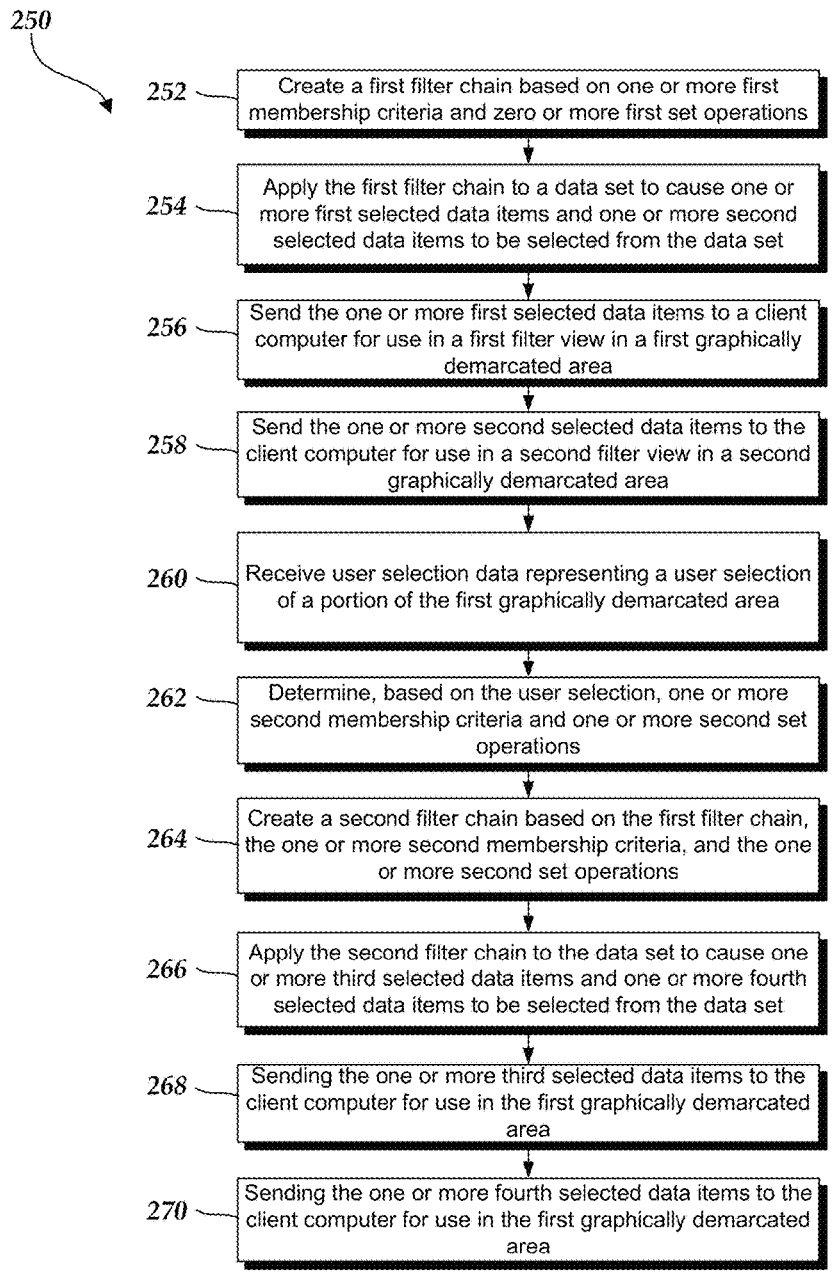
FIG. 2C illustrates another example process flow for analyzing a data set.

FIG. 2C illustrates another example process flow for analyzing a data set. In block 252, the data analysis system 100 creates a first filter chain based on one or more first membership criteria and zero or more first set operations. For example, the first filter chain may be retrieved from the data repository 112 in which the first filter chain has been previously defined and saved, or may be determined based on user input.

In block 254, the data analysis system 100 applies the first filter chain to a data set to cause one or more first selected data items to be selected from the data set and one or more second selected data items to be selected from the data set. For example, the first selected data items may be data items that satisfy the first membership criteria and the second selected data items may be data items that do not satisfy the first membership criteria. The first filter chain may be a histogram filter that selects all data items in a data set that satisfy the first membership criteria. In alternative embodiments, zero data items may be returned when the first filter chain is applied to the data set.

In block 256, the data analysis system 100 sends the one or more first selected data items to a client computer for constructing a first filter view in a first graphically demarcated area (e.g., the one or more first selected data items are configured to be viewed in the first filter view). For example, the first filter view may be a list view filter that displays all homes for sale in a region specified by the first membership criteria. The first graphically demarcated area may be a content pane that is separate and apart from a list, table, or tree view that presents a scrollable listing of all inventory.

In block 258, the data analysis system 100 sends the one or more second selected data items to a client computer for constructing a second filter view in a second graphically demarcated area (e.g., the one or more second selected data items are configured to be viewed in the second filter view). For example, the second filter view may be a list view filter that displays all homes for sale in all regions not specified by the first membership criteria. The second graphically demarcated area may be a content pane that is separate and apart from a list, table, or tree view that presents a scrollable listing of all inventory.

In block 260, the data analysis system 100 receives user selection data representing a user selection of a portion of the first graphically demarcated area. For example, the user may select a particular type of home in the list view in the first graphically demarcated area, where the particular type of home represents homes of a particular type of use (e.g., single family, multi family, etc.). In alternative embodiments, the user may additionally or alternatively enter criteria in a suitable input means such as a text field entry. For example, the user may specify in a text field entry the type of home to be selected.

In block 262, the data analysis system 100 determines, based on the user selection, one or more second membership criteria and one or more second set operations. For example, the one or more second membership criteria may comprise a membership criterion that an inventory must be the selected type of home.

In block 264, the data analysis system 100 creates a second filter chain based on the first filter chain, the one or more second membership criteria, and the one or more second set operations. For example, this second filter chain comprises two filter links, with the first filter link selecting all the homes in a particular region and the second filter link selecting only those inventories in the particular region that are of the selected type of home.

In block 266, the data analysis system 100 applies the second filter chain to the data set to cause one or more third selected data items and one or more fourth selected data items to be selected from the data set. For example, the third selected data items may be data items that satisfy the first membership criteria and the second membership criteria and the fourth selected data items may be data items that satisfy the first membership criteria and do not satisfy the second membership criteria.

In block 268, the data analysis system 100 sends the one or more third selected data items to the client computer for constructing a third filter view in the first graphically demarcated area (e.g., the one or more third selected data items are configured to be viewed in the third filter view). For example, the third filter view may be a histogram filter view that displays the number of homes and the sale value for those homes in a region specified by the first membership criteria and that are of a type specified by the second membership criteria. In alternative embodiments, zero data items may be returned when the second filter chain is applied to the data set.

In block 270, the data analysis system 100 sends the one or more fourth selected data items to the client computer for constructing a fourth filter view in the first graphically demarcated area (e.g., the one or more fourth selected data items are configured to be viewed in the fourth filter view). For example, the fourth filter view may be a histogram filter view that displays the number of homes and the sale value for those homes in a region specified by the first membership criteria and that are not of a type specified by the second membership criteria. In alternative embodiments, zero data items may be returned when the second filter chain is applied to the data set.

In this way, the second filter chain can be applied to the first graphically demarcated area and not the second graphically demarcated area such that the first graphically demarcated includes filter views that are more refined than the filter views included in the second graphically demarcated area.

Object Centric Data Model

To provide a framework for the following discussion of specific systems and methods described herein, an example database system 310 using an ontology 305 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 305. The conceptual data model is independent of any particular database used for durably storing one or more database(s) 309 based on the ontology 305. For example, each object of the conceptual data model may correspond to one or more rows in a relational database or an entry in Lightweight Directory Access Protocol (LDAP) database, or any combination of one or more databases.

Figure 3:
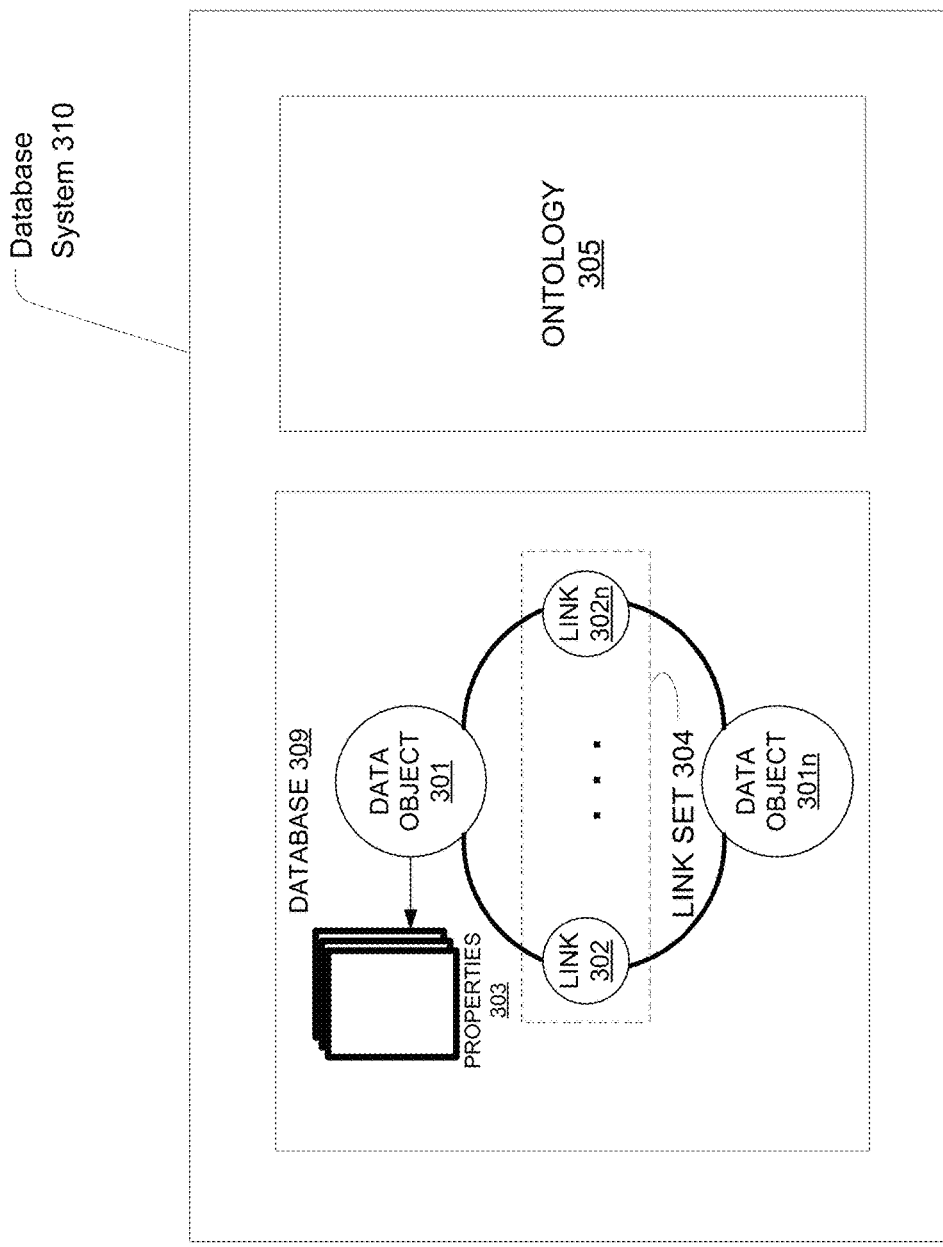
FIG. 3 illustrates one embodiment of a database system using an ontology.

FIG. 3 illustrates an object-centric conceptual data model according to an embodiment. An ontology 305, as noted above, may include stored information providing a data model for storage of data in the database 309. The ontology 305 may be defined by one or more object types, which may each be associated with one or more property types. At the highest level of abstraction, data object 301 is a container for information representing things in the world. For example, data object 301 can represent an entity such as a person, a place, an organization, a market instrument, an inventory, or other noun. Data object 301 can represent an event that happens at a point in time or for a duration. Data object 301 can represent a document or other unstructured data source such as an e-mail message, a news report, or a written paper or article. Each data object 301 is associated with a unique identifier that uniquely identifies the data object within the database system.

Different types of data objects may have different property types. For example, a "Person" data object might have an "Eye Color" property type and an "Event" data object might have a "Date" property type. Each property 303 as represented by data in the database system 310 may have a property type defined by the ontology 305 used by the database 305.

Objects may be instantiated in the database 309 in accordance with the corresponding object definition for the particular object in the ontology 305. For example, a specific monetary payment (e.g., an object of type "event") of US$30.00 (e.g., a property of type "currency") taking place on Mar. 27, 2009 (e.g., a property of type "date") may be stored in the database 309 as an event object with associated currency and date properties as defined within the ontology 305.

The data objects defined in the ontology 305 may support property multiplicity. In particular, a data object 301 may be allowed to have more than one property 303 of the same property type. For example, a "Person" data object might have multiple "Address" properties or multiple "Name" properties.

Each link 302 represents a connection between two data objects 301. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 301 can have multiple links with another data object 301 to form a link set 304. For example, two "Person" data objects representing a husband and a wife could be linked through a "Spouse Of" relationship, a matching "Address" property, and one or more matching "Event" properties (e.g., a wedding). Each link 302 as represented by data in a database may have a link type defined by the database ontology used by the database.

Figure 4:
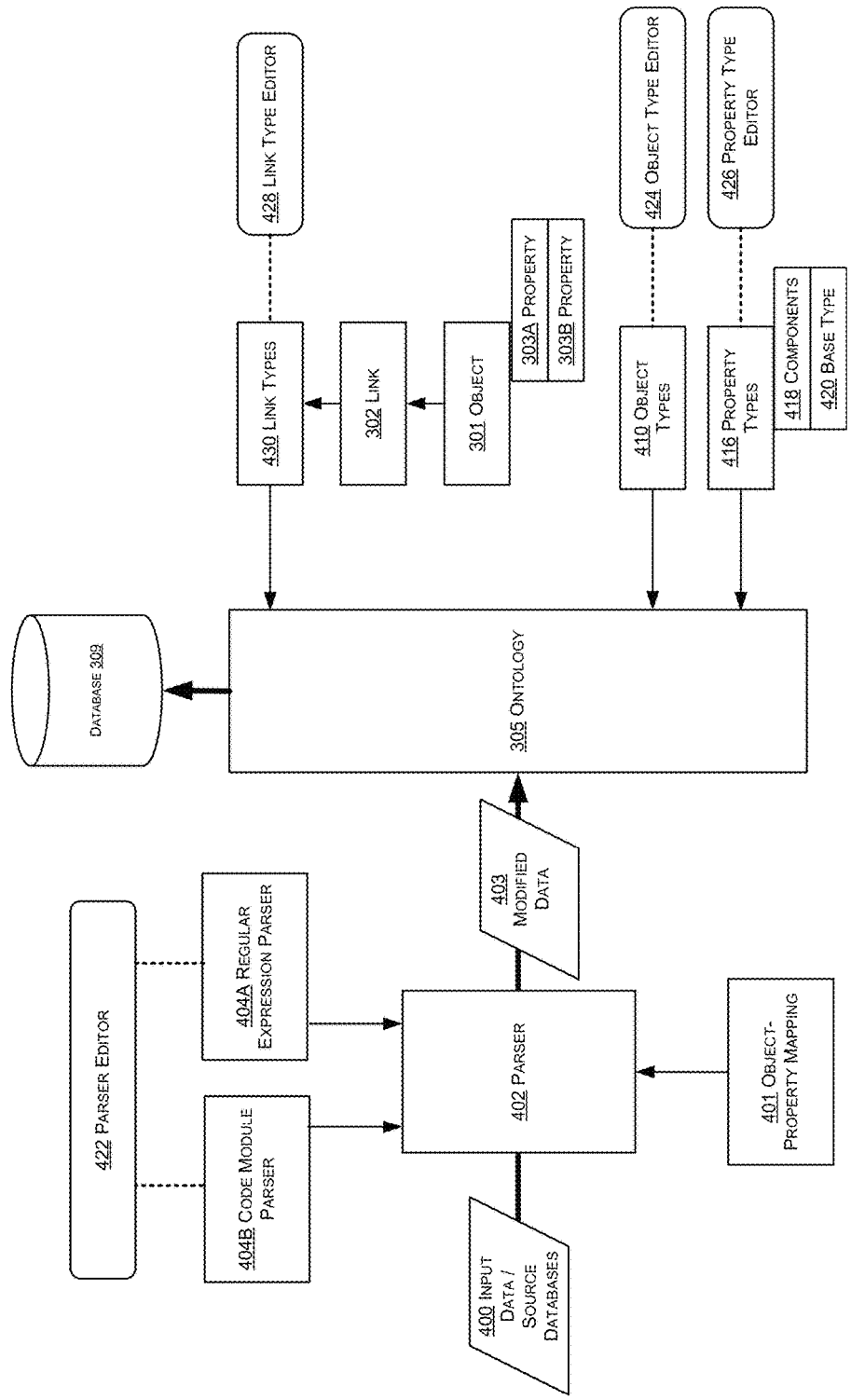
FIG. 4 illustrates one embodiment of a system for creating data in a data store using a dynamic ontology.

FIG. 4 is a block diagram illustrating exemplary components and data that may be used in identifying and storing data according to an ontology. In this example, the ontology may be configured, and data in the data model populated, by a system of parsers and ontology configuration tools. In the embodiment of FIG. 4, input data 400 is provided to parser 402. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 402 is able to read a variety of source input data types and determine which type of data it is reading.

In accordance with the discussion above, the example ontology 305 comprises stored information providing the data model of data stored in database 309, and the ontology is defined by one or more object types 410, one or more property types 416, and one or more link types 430. Based on information determined by the parser 402 or other mapping of source input information to object type, one or more data objects 301 may be instantiated in the database 309 based on respective determined object types 410, and each of the objects 301 has one or more properties 303 that are instantiated based on property types 416. Two data objects 301 may be connected by one or more links 302 that may be instantiated based on link types 430. The property types 416 each may comprise one or more data types 418, such as a string, number, etc. Property types 416 may be instantiated based on a base property type 420. For example, a base property type 420 may be "Locations" and a property type 416 may be "Home."

In an embodiment, a user of the system uses an object type editor 424 to create and/or modify the object types 410 and define attributes of the object types. In an embodiment, a user of the system uses a property type editor 426 to create and/or modify the property types 416 and define attributes of the property types. In an embodiment, a user of the system uses link type editor 428 to create the link types 430. Alternatively, other programs, processes, or programmatic controls may be used to create link types and property types and define attributes, and using editors is not required.

In an embodiment, creating a property type 416 using the property type editor 426 involves defining at least one parser definition using a parser editor 422. A parser definition comprises metadata that informs parser 402 how to parse input data 400 to determine whether values in the input data can be assigned to the property type 416 that is associated with the parser definition. In an embodiment, each parser definition may comprise a regular expression parser 404A or a code module parser 404B. In other embodiments, other kinds of parser definitions may be provided using scripts or other programmatic elements. Once defined, both a regular expression parser 404A and a code module parser 404B can provide input to parser 402 to control parsing of input data 400.

Using the data types defined in the ontology, input data 400 may be parsed by the parser 402 determine which object type 410 should receive data from a record created from the input data, and which property types 416 should be assigned to data from individual field values in the input data. Based on the object-property mapping 401, the parser 402 selects one of the parser definitions that is associated with a property type in the input data. The parser parses an input data field using the selected parser definition, resulting in creating new or modified data 403. The new or modified data 403 is added to the database 309 according to ontology 305 by storing values of the new or modified data in a property of the specified property type. As a result, input data 400 having varying format or syntax can be created in database 309. The ontology 305 may be modified at any time using object type editor 424, property type editor 426, and link type editor 428, or under program control without human use of an editor. Parser editor 422 enables creating multiple parser definitions that can successfully parse input data 400 having varying format or syntax and determine which property types should be used to transform input data 400 into new or modified input data 403.

The properties, objects, and the links (e.g. relationships) between the objects can be visualized using a graphical user interface (GUI). In an embodiment, a user interface that allows for searching, inspecting, filtering, and/or statistically aggregating data in a multipath format is illustrated and described below with respect to FIGS. 5A through 12-4B.

Multipath Explorer Creation

A multipath explorer can provide an interface that allows a user to apply one or more filters to a data set and visually identify data that satisfies the one or more filters and data that does not satisfy one or more of the filters. For example, a user can apply a first filter to a data set and the multipath explorer displays data in the data set that satisfies the first filter. The multipath explorer can also display data in the data set that does not satisfy the first filter (e.g., in a different view of window). As additional filters are applied by the user, the multipath explorer can display additional views or windows that show data that satisfy all of the filters, some of the filters, and/or none of the filters. In this way, the multipath explorer can display all combinations of data that do and do not satisfy the filters applied by the user. In other words, the multipath explorer allows a user to immediately visualize an entire population, one or more subsets of the entire population, and one or more endpoints of an analysis of subsets of the entire population. FIGS. 5A-7 illustrate how the different paths displayed by the multipath explorer can be generated.

Figure 5A:
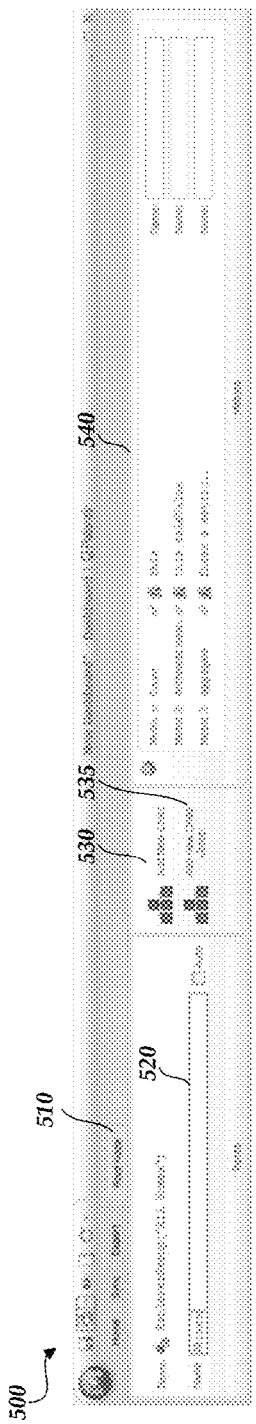
FIG. 5A illustrates a toolbar that allows a user to create a root node of a multipath view.

FIG. 5A illustrates an example toolbar 500 that allows a user to create a root node of a multipath view. In an embodiment, the multipath view may be illustrated in a tree structure. In another embodiment, the multipath view may be illustrated in a DAG structure. As illustrated in FIG. 5A, the toolbar 500 (also referred to as a dashboard) includes a tab 510. The tab 510 includes buttons, text fields, and/or other options that allow a user to create a root node (e.g., add new child button 530, add new child group button 535, and metrics group 540). The root node may represent all inventory in a data set. For example, the inventory may comprise all homes that currently have pending loans and a title of the root node may be "All Loans," as illustrated in text field 520.

Figure 5B:
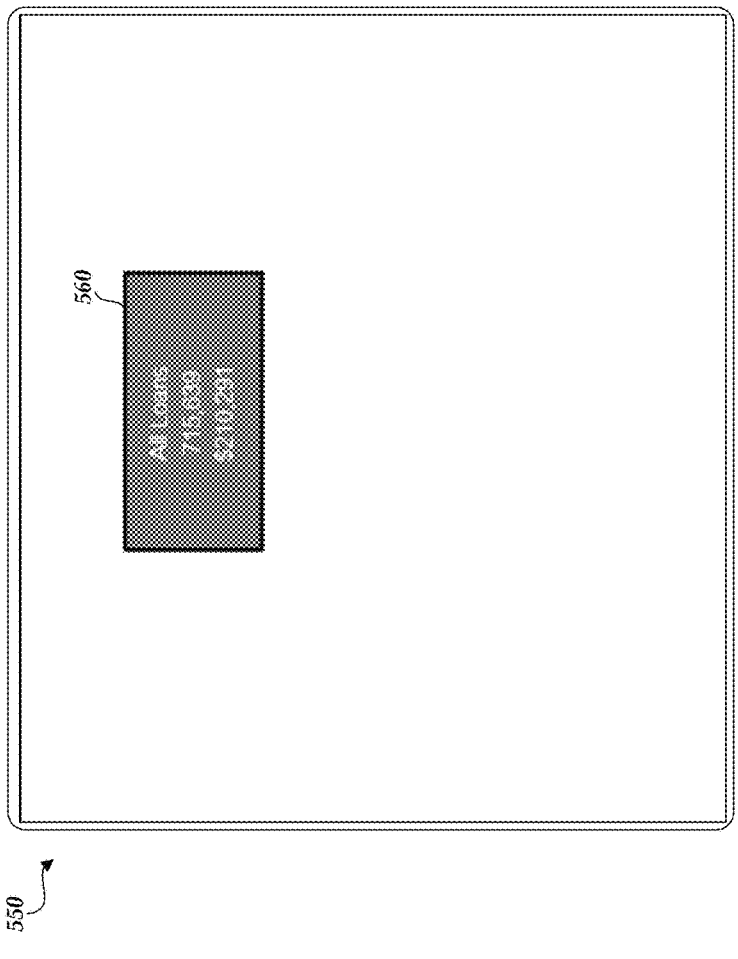
FIG. 5B illustrates a widget that displays a created root node.

FIG. 5B illustrates an example widget 550 that displays a created root node 560. In the example of FIG. 5B, the root node 560 is represented as a rectangular box and includes the title of the root node (e.g., "All Loans"), the number of inventory in the data set (e.g., 715,639 homes), and/or a metric or attribute associated with the inventory (e.g., an average or median value of the pending loans, etc.). While the root node 560 is illustrated in the shape of a rectangular box, this is not meant to be limiting as the root node 560 may be illustrated in any shape or form.

Figure 6A:
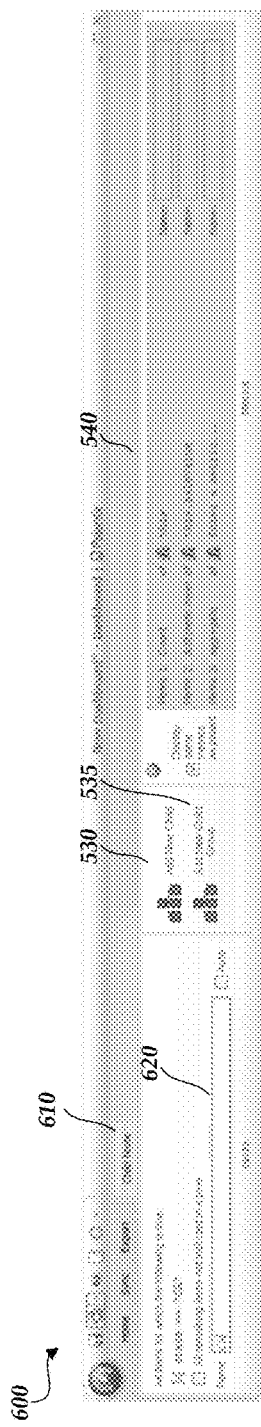
FIG. 6A illustrates a toolbar that allows a user to create a child node of a multipath view.

FIG. 6A illustrates an example toolbar 600 that allows a user to create a child node of a multipath view. As illustrated in FIG. 6A, the toolbar 600 (also referred to as a dashboard) includes a tab 610. The tab 610 includes buttons, text fields, and/or other options that allow a user to create a child node (e.g., add new child button 530, add new child group button 535, and metrics group 540). In an embodiment, the child node represents all inventory in a data set that corresponds to a membership criteria. For example, the inventory may comprise all homes that currently have pending loans and a membership criteria may be that the homes must be in California. In an alternative embodiment, the child node represents all inventory in a data set that does not correspond to a membership criteria. For example, the inventory may comprise all homes that currently have pending loans and the membership criteria may be that the homes cannot be in California. The membership criteria may be selected and/or entered in a text field, and name of the child node may be provided in text field 620.

In an embodiment, the child node inherits the metrics or attributes of its parent node. Alternatively or in addition, other metrics or attributes may be specified in metrics group 540.

In an embodiment, the add new child button 530 adds a new child node to a parent node selected by the user. The new child node includes the criteria set forth by the user in the tab 610. For example, the new child node may specify additional membership criteria to be applied to the data included in the parent node. In this way, a parent node may include one or more child nodes, whereas sibling nodes of the parent node may not include any child nodes.

In an embodiment, the add new child group button 535 adds a new child node to a parent node selected by the user and one or more sibling nodes of the parent node. For example, the new child node may specify additional membership criteria to be applied to the data included in the parent node and the data included in the sibling nodes of the parent node. In this way, a parent node and sibling nodes of the parent node may each include one or more child nodes (e.g., the parent node and the sibling nodes of the parent node may each include the same number of child nodes with the same membership criteria).

In another embodiment, the add new child group button 535 adds some or all of the possible results of a criteria as new child nodes to a parent node. For example, a parent node can include a data set that comprises a group of loans for homes. When the add new child group button 535 is selected, the membership criteria "homeType" may be entered, and a new child node may be added to the parent node for each unique value of "homeType" for all of the homes in the parent node.

In a further embodiment, the tab 610 includes an add new sibling button, not shown. The add new sibling button may add a sibling node to a parent node selected by the user. For example, the sibling node may specify the same membership criteria as the parent node.

In a further embodiment, the tab 610 include an add new parent button, not shown. The add new parent button may create a parent node (or a child node) based on one or more child nodes selected by the user. For example, a first child node may include a first data set and a second child node may include a second data set. The add new parent button may, when selected, create a parent node (or a child node) based on the first child node and the second child node. The parent node (or child node) may include a master data set, where the master data set is based on at least one common attribute of the first data set and the second data set (e.g. one common data type or property, such as the two nodes both being a collection of "house" object types). The creation of a new node based on at least one common attribute of a first data set and a second data set may be displayed in a manner as illustrated in FIGS. 13E-F, which are described in greater detail below. In some embodiments, the one or more child nodes used to create the parent node (or the child node) share another parent node. In other embodiments, the one or more child nodes used to create the parent node (or the child node) do not share any other parent node. If one or more child nodes are used to create a child node, the one or more child nodes may be considered parent nodes of the created child node.

In a further embodiment, the tab 610 includes a transform object type button, not shown. The transform object type button may, when selected, transform a data set from a first object type to a second object type. For example, a data set may include homes having a default mortgage and a result of a node may be documents (e.g., the mortgages). The data set may be transformed into new objects, such as real estate agents associated with those homes, so that a result of the node is now a person (e.g., the real estate agents). Additional child nodes may then be created based on the real estate agent data set (e.g., by requesting the names of real estate agents that appear three or more times). Such a transformation may be displayed in a manner as illustrated in FIGS. 13H-G, which are described in greater detail below.

Figure 6B:
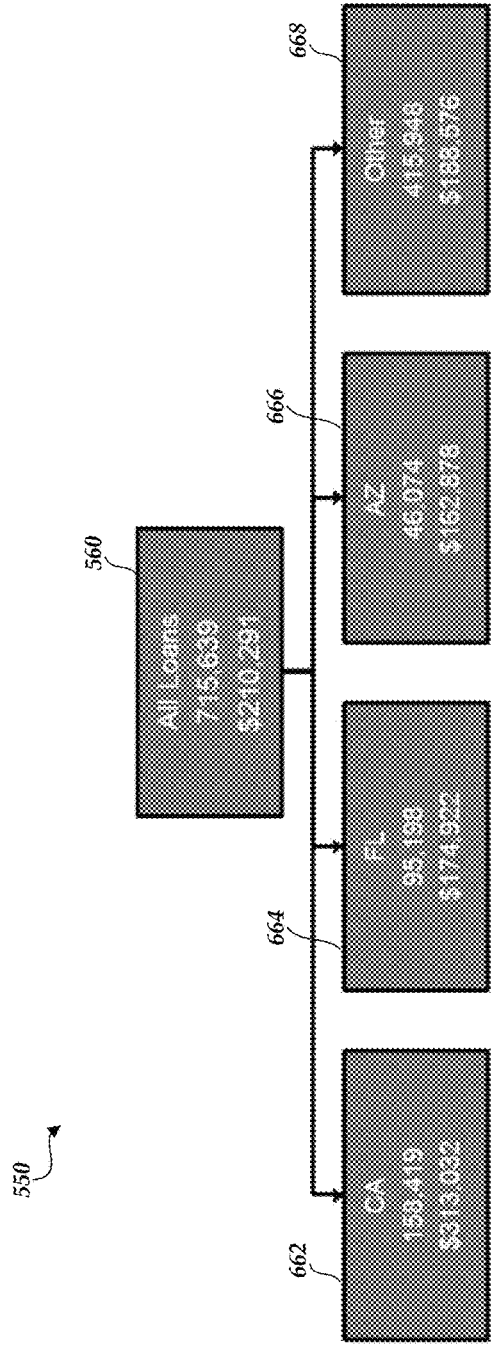
FIG. 6B illustrates the widget that displays the created root node and created child nodes.

FIG. 6B illustrates the widget 550 that displays the created root node 560 and created child nodes 662, 664, 666, and 668. As illustrated in FIG. 6B, like the root node 560, the child nodes 662, 664, 666, and 668 are represented as rectangular boxes and include the title of the child node (e.g., "CA," "FL," "AZ," and "Other"), the number of inventory in the data set (e.g., 158,419 homes, 95,198 homes, 46,074 homes, and 415,948 homes), and/or a metric or attribute associated with the inventory (e.g., an average or median value of the pending loans, etc.). While the child nodes 662, 664, 666, and 668 are illustrated in the shape of a rectangular box, this is not meant to be limiting as the child nodes 662, 664, 666, and 668 may be illustrated in any shape or form.

In an embodiment, the child nodes 662, 664, 666, and 668 are created by selecting the root node 560 and the add new child button 530 or the add new child group button 535. For example, the membership criteria specified for the child node may be homes in California, Florida, and Arizona. Thus, child nodes 662, 664, and 666 may be created for each value (e.g., California, Florida, and Arizona) and display the data that satisfies the membership criteria. The child node 668 may be created to illustrate the data that does not satisfy the membership criteria. In some embodiments, the data that does not satisfy the membership criteria may be identified by identifying all items from the parent node that are not included in the other child nodes. In other embodiments, the data that does not satisfy the membership criteria may be identified by identifying all items from the parent node that are not included in the other child nodes and that are above or below a certain percentage.

In an embodiment, the root node 560 and/or the child nodes 662, 664, 666, and/or 668 auto arrange, auto size and/or auto shape such that all nodes can fit in the widget 550. In a further embodiment, the user can adjust the background color, the font, the font size, the font color, the alignment, and/or the border of the root node 560 and/or the child nodes 662, 664, 666, and/or 668. In a further embodiment, the user can copy, drag (e.g., to change order or location), resize, and/or rotate the root node 560 and/or the child nodes 662, 664, 666, and/or 668. In a further embodiment, the user can select the root node 560 and/or the child nodes 662, 664, 666, and/or 668 to view additional information (e.g., data associated with the root node and/or child node displayed in a list, in a graph, etc.).

Figure 7:
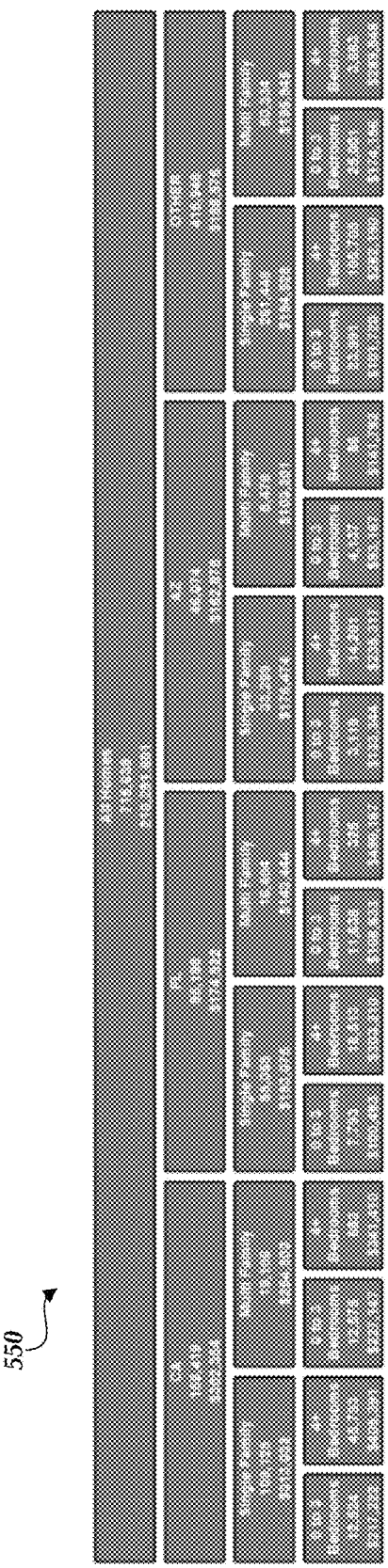
FIG. 7 illustrates the widget that displays a root node and a series of child nodes in a tree structure.

FIG. 7 illustrates the widget 550 that displays a root node and a series of child nodes in a tree structure. As illustrated in FIG. 7, each parent node includes child nodes with the same membership criteria as the parent node's sibling nodes (e.g., the parent nodes titled "CA," "FL," "AZ," and "Other" each include child nodes titled "Single Family," which represent data that does satisfy a specified membership criteria). In addition, each parent node and each of the parent node's sibling nodes include child nodes that do not satisfy the membership criteria at a particular level in the tree structure (e.g., the parent nodes titled "CA," "FL," "AZ," and "Other" each include child nodes titled "Multi Family," which represent data that does not satisfy the membership criteria specified by the "Single Family" child nodes). While the parent nodes and child nodes are illustrated in the shape of a rectangular box, this is not meant to be limiting as the parent nodes and child nodes may be illustrated in any shape or form.

In an embodiment, the widget 550 provides functionality such that the user can save a filtered or defiltered data set (e.g., a parent-child node chain or a root node) as a new object series. The user may be able to title the new object series. The new object series may be shared with other users, or restricted from other users viewing. The new object series may also be used in later analysis or filtering. For example, the new object series may be applied to the same data set at a later time (e.g., after the data set has been updated). As another example, the new object series may be applied to a different data set. When applying the new object series to the different data set, root nodes, parent nodes, and/or child nodes may be created and be formed in the same or similar tree structure as the root nodes, parent nodes, and/or child nodes of the saved data set.

In an embodiment (not shown), a parent node can include child nodes that are not included in the parent node's sibling nodes. For example, the "CA" parent node may include the "Single Family" and the "Multi Family" child nodes, whereas the "FL," "AZ," and/or "Other" parent nodes may not include the "Single Family" and the "Multi Family" child nodes.

In an embodiment (not shown), filter chains (e.g., a parent-child node chain) are color coded. The filter chains may be color coded based on a metric or attribute (e.g., magnitude, name, value, etc.) determined by the user. For example, if the output of nodes are numbers (e.g., home loan values), then filter chains that include nodes with loan values in a high range may appear red and filter chains that include nodes with loan values in a low range may appear blue.

The widget 550 as illustrated in FIG. 7 allows a user to immediately visualize an entire population, one or more subsets of the entire population, and one or more endpoints of an analysis of subsets of the entire population.

Multipath Explorer Graphical User Interface

Figure 8:
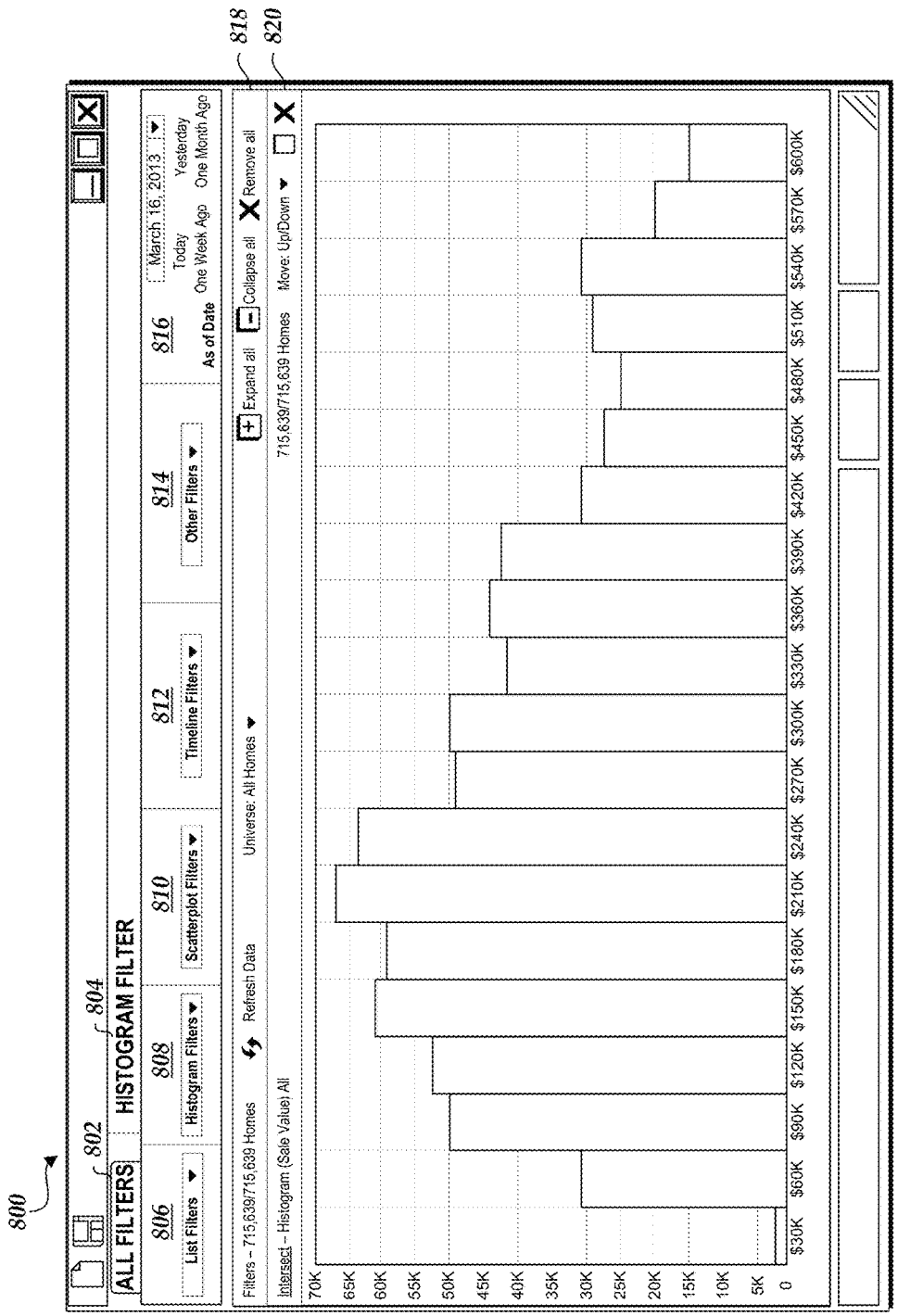
FIG. 8 illustrates an example graphical user interface (GUI) for a multipath explorer.

FIG. 8 illustrates an example graphical user interface (GUI) 800 for a multipath explorer. As illustrated in FIG. 8, the GUI 800 includes an all filters tab 802 and a histogram filter tab 804. While the GUI 800 includes the all filters tab 802 and the histogram filter tab 804, this is not meant to be limiting as the GUI 800 may include fewer or additional tabs, such as tabs associated with each of the filters discussed below.

In an embodiment, the all filters tab 802 is selected by the user and includes list filters group 806, histogram filters group 808, scatterplot filters group 810, timeline filters group 812, other filters group 814, and date group 816. The list filters group 806 includes list filters that can be applied to a data set. For example, list filters may include filters that display data in the data set in a list form. The histogram filters group 808 includes histogram filters that can be applied to a data set. For example, the histogram filters may include filters that display data in the data set in a graphical (e.g., bar graph, line graph, etc.) form. The scatterplot filters group 810 includes scatterplot filters that can be applied to a data set. For example, the scatterplot filters may include filters that display data in the data set in a scatterplot form. The timeline filters group 812 includes timeline filters that can be applied to a data set. For example, the timeline filters may include filters that display data in the data set in a timeline. The other filters group 814 include filters other than the filters described above that can be applied to a data set. The date group 816 includes options that can display data in the data set that correspond to a range of dates, a particular date, and/or the like.

As illustrated in FIG. 8, the GUI 800 includes a content pane 818 and a content pane 820. In an embodiment, the inventory includes homes with currently pending loans. Content pane 818 includes information related to the inventory, including the total number of homes with currently pending loans. In an embodiment, no filter has been applied to content pane 818 such that content pane 818 includes information on the entire inventory (e.g., the entire population).

In an embodiment, a histogram filter has been applied to the entire inventory. Thus, the content pane 820 displays a histogram for the entire inventory. The histogram includes a loan value on the x-axis and a count on the y-axis (e.g., a number of homes that have a particular loan value).

In an embodiment, the content pane 818 and/or the content pane 820 are embedded in the GUI 800. In another embodiment, the content pane 818 and/or the content pane 820 can open in separate windows within or outside the GUI 800.

Figure 9:
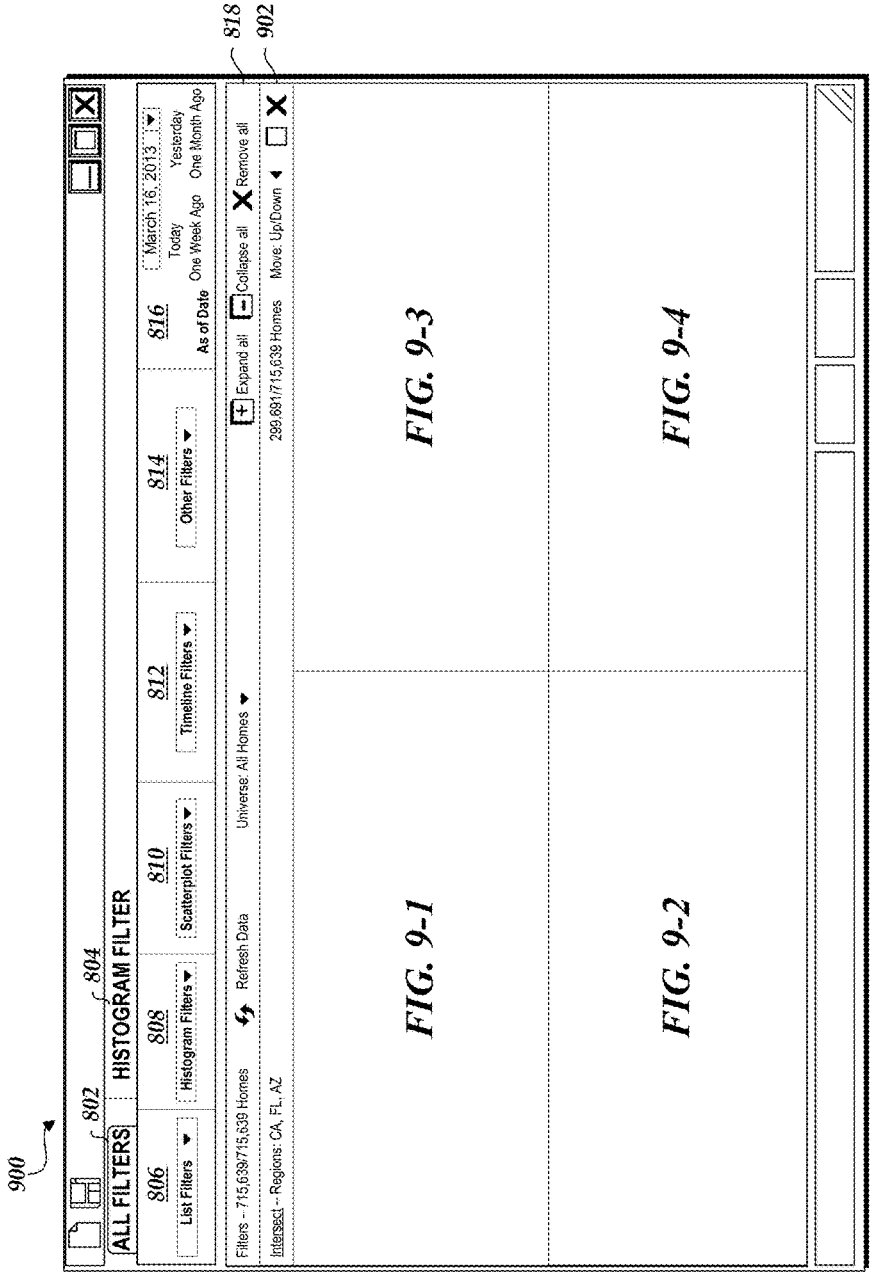
FIG. 9 illustrates another example GUI for a multipath explorer.
Figures 1, 9:
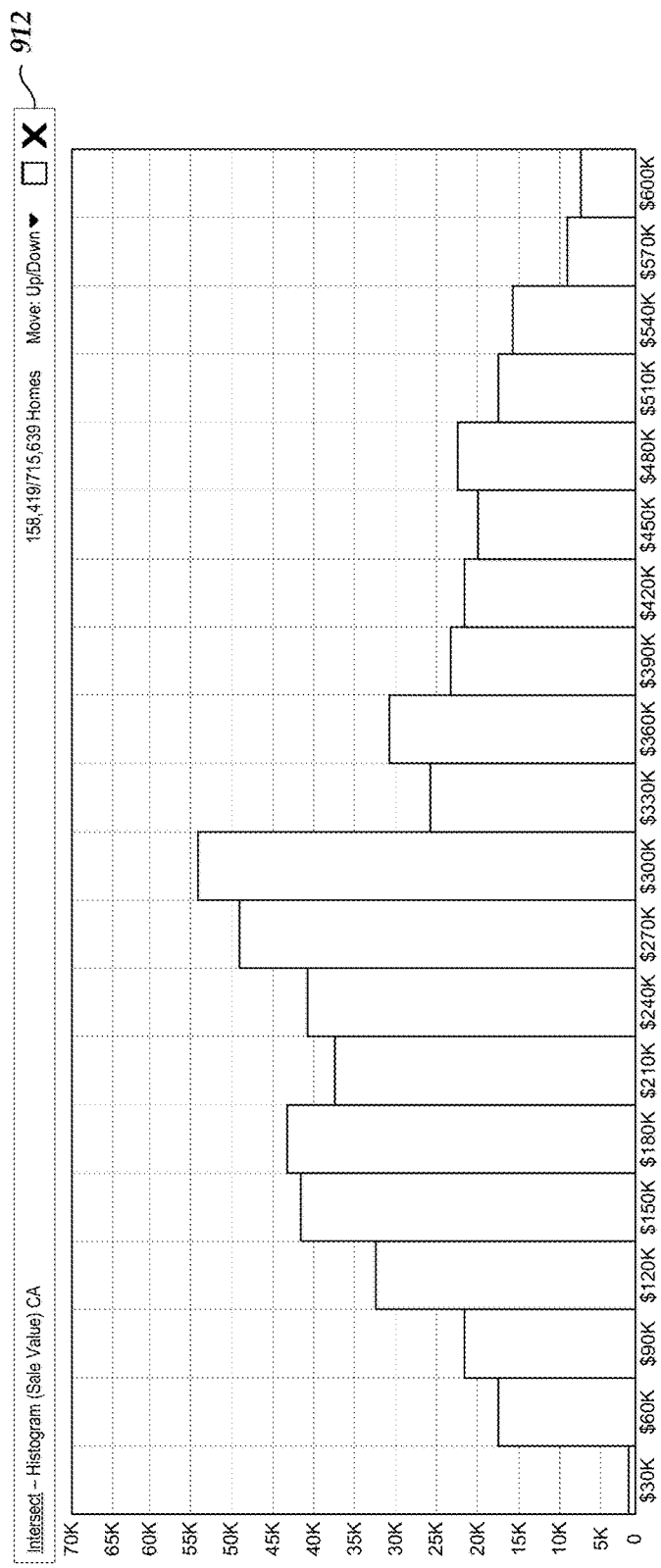

FIG. 9 illustrates another example graphical user interface (GUI) 900 for a multipath explorer. As illustrated in FIG. 9, the GUI 900 includes the all filters tab 802 and the histogram filter tab 804. While the GUI 900 includes the all filters tab 802 and the histogram filter tab 804, this is not meant to be limiting as the GUI 900 may include fewer or additional tabs, such as tabs associated with each of the filters discussed below.

As illustrated in FIG. 9, the GUI 900 includes the content pane 818 and a content pane 902. In an embodiment, the content pane 902 includes a filter that is applied to the entire inventory in content pane 818 such that 299,691 out of 715,639 homes satisfy the membership criteria embodied by the filter. For example, the membership criteria may specify that the homes must be in a particular region (e.g., California, Florida, or Arizona). Based on this membership criteria, four additional content panes may be included in the GUI 900. The first additional content pane is illustrated in FIG. 9-1, the second in FIG. 9-2, the third in FIG. 9-3, and the fourth in FIG. 9-4. The additional content panes may display data that satisfies the membership criteria and data that does not satisfy the membership criteria.

FIG. 9-1 illustrates a content pane 912 included in the GUI 900 of FIG. 9. In an embodiment, the content pane 912 includes a filter that is applied to the data in content pane 902 such that 158,419 out of 715,639 homes satisfy the membership criteria embodied by the filter. For example, the membership criteria may specify that the data is to be displayed in a histogram and that the homes must be in California. Thus, content pane 912 displays data that satisfies the membership criteria originally specified in content pane 902.

Figures 2, 9:
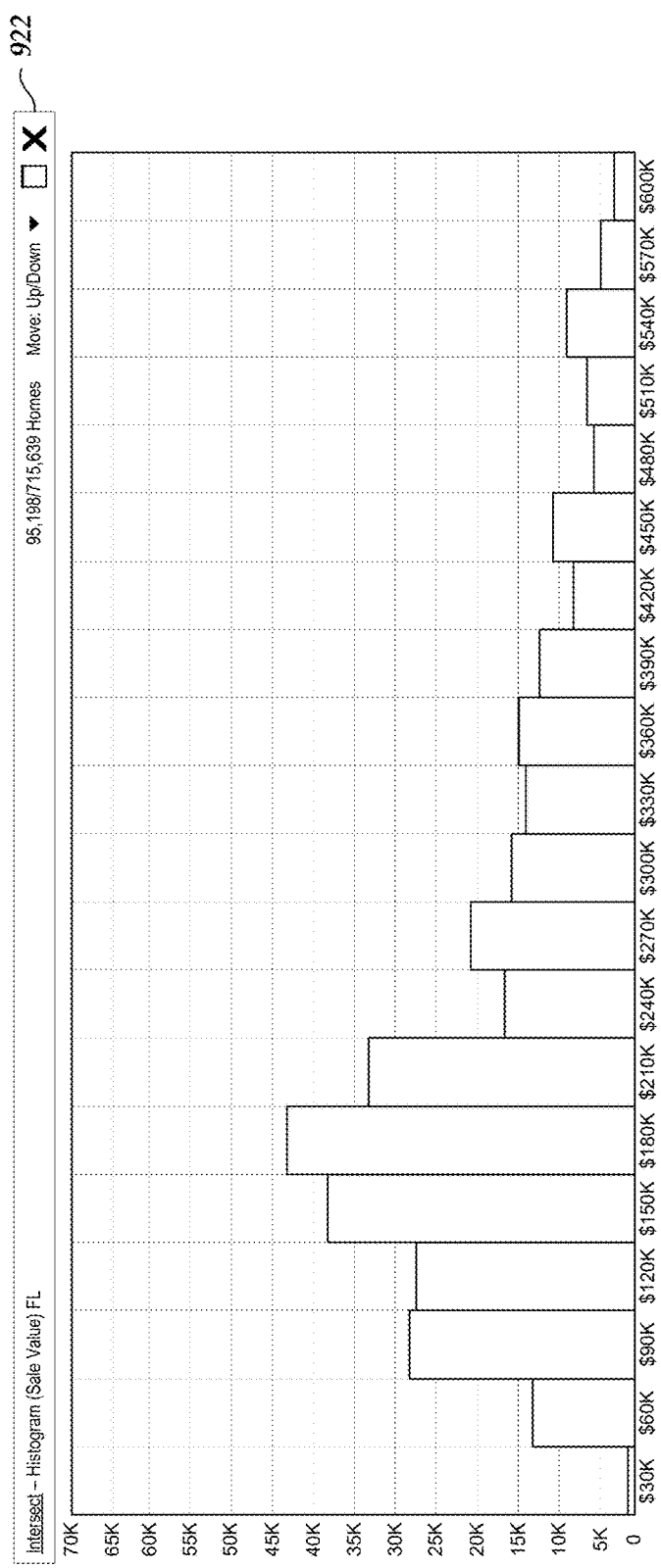
Figures 3, 9:
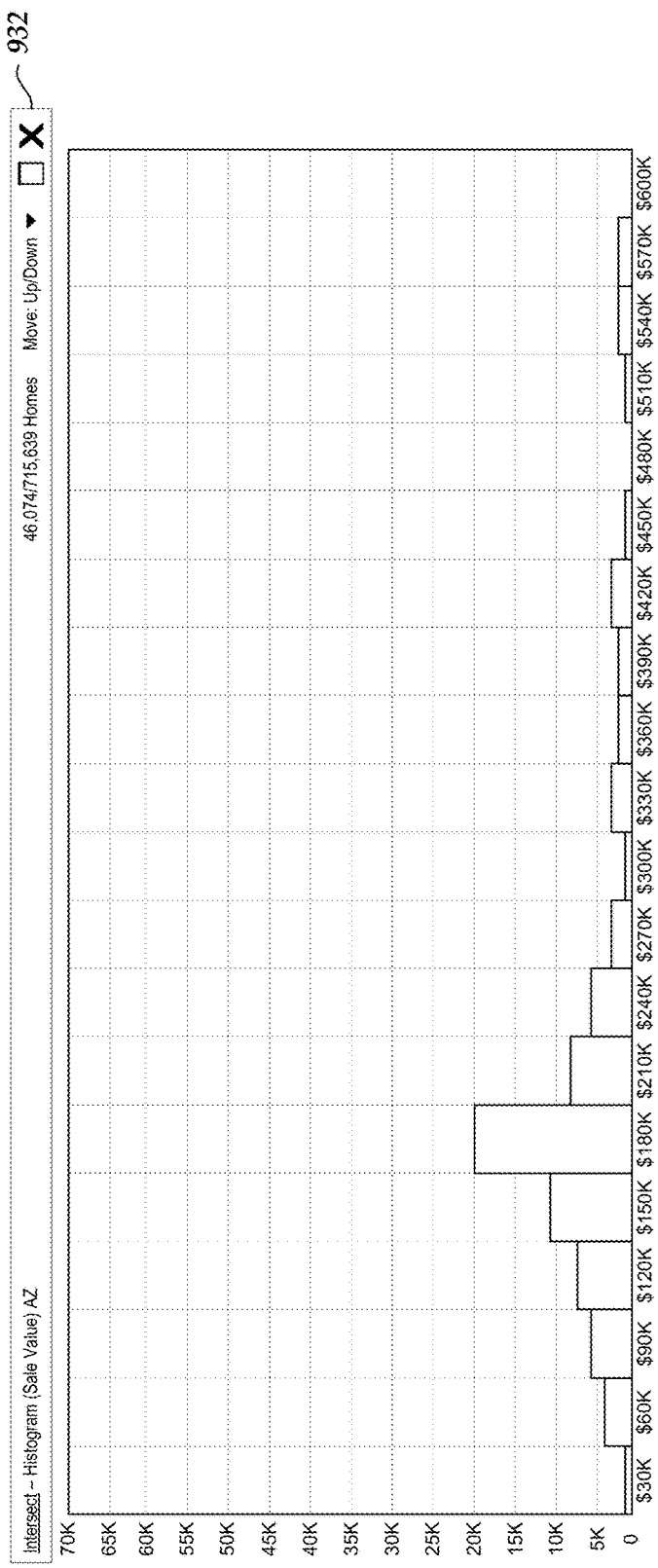
Figures 4, 9:
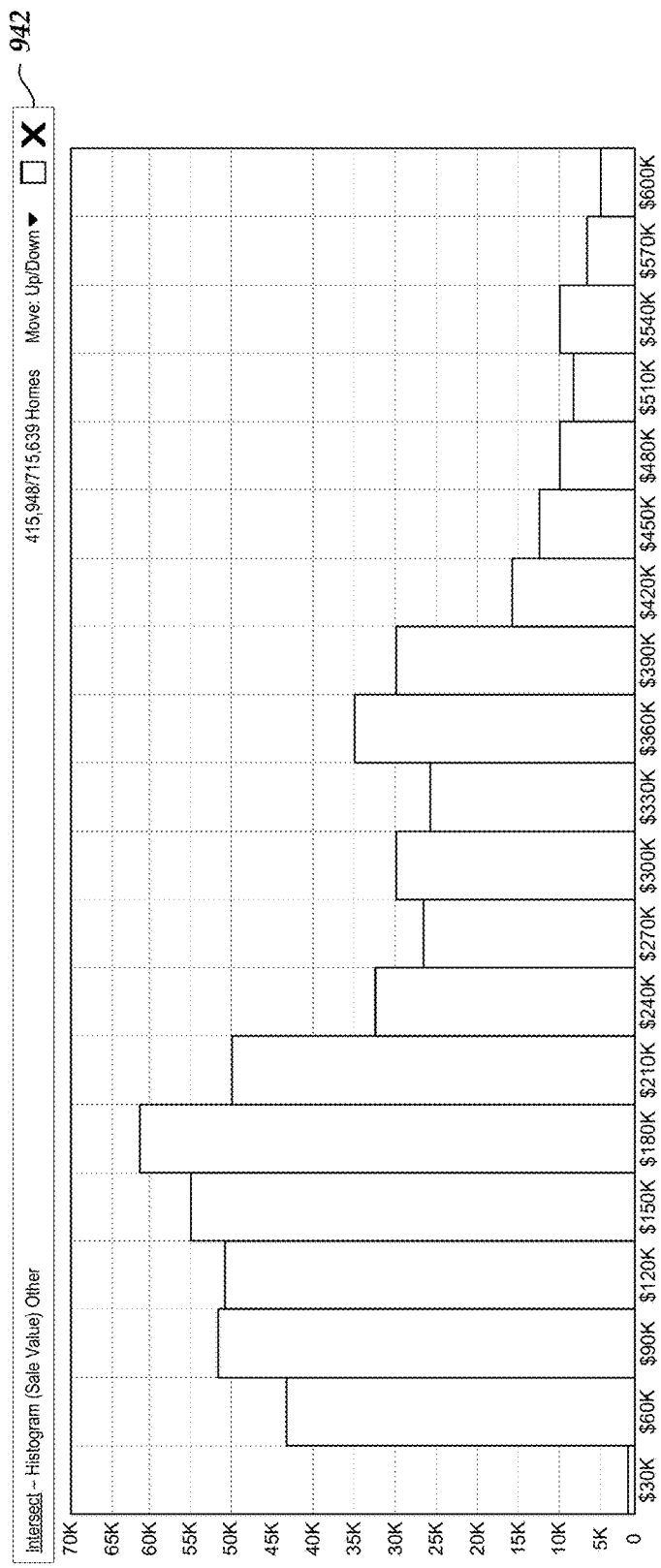

FIG. 9-2 illustrates another content pane 922 included in the GUI 900 of FIG. 9. In an embodiment, the content pane 922 includes a filter that is applied to the data in content pane 902 such that 95,196 out of 715,639 homes satisfy the membership criteria embodied by the filter. For example, the membership criteria may specify that the data is to be displayed in a histogram and that the homes must be in Florida. Thus, content pane 922 displays data that satisfies the membership criteria originally specified in content pane 902.

FIG. 9-3 illustrates another content pane 932 included in the GUI 900 of FIG. 9. In an embodiment, the content pane 932 includes a filter that is applied to the data in content pane 902 such that 46,074 out of 715,639 homes satisfy the membership criteria embodied by the filter. For example, the membership criteria may specify that the data is to be displayed in a histogram and that the homes must be in Arizona. Thus, content pane 932 displays data that satisfies the membership criteria originally specified in content pane 902.

FIG. 9-4 illustrates another content pane 942 included in the GUI 900 of FIG. 9. In an embodiment, the content pane 942 includes a filter that is applied to the data in content pane 902 such that 415,948 out of 715,639 homes are identified as not satisfying the membership criteria embodied by the filter. For example, the membership criteria may specify that the data is to be displayed in a histogram and that the homes must not be in California, Florida, or Arizona (e.g., "Other"). Thus, content pane 942 displays data that does not satisfy the membership criteria originally specified in content pane 902.

Figure 10:
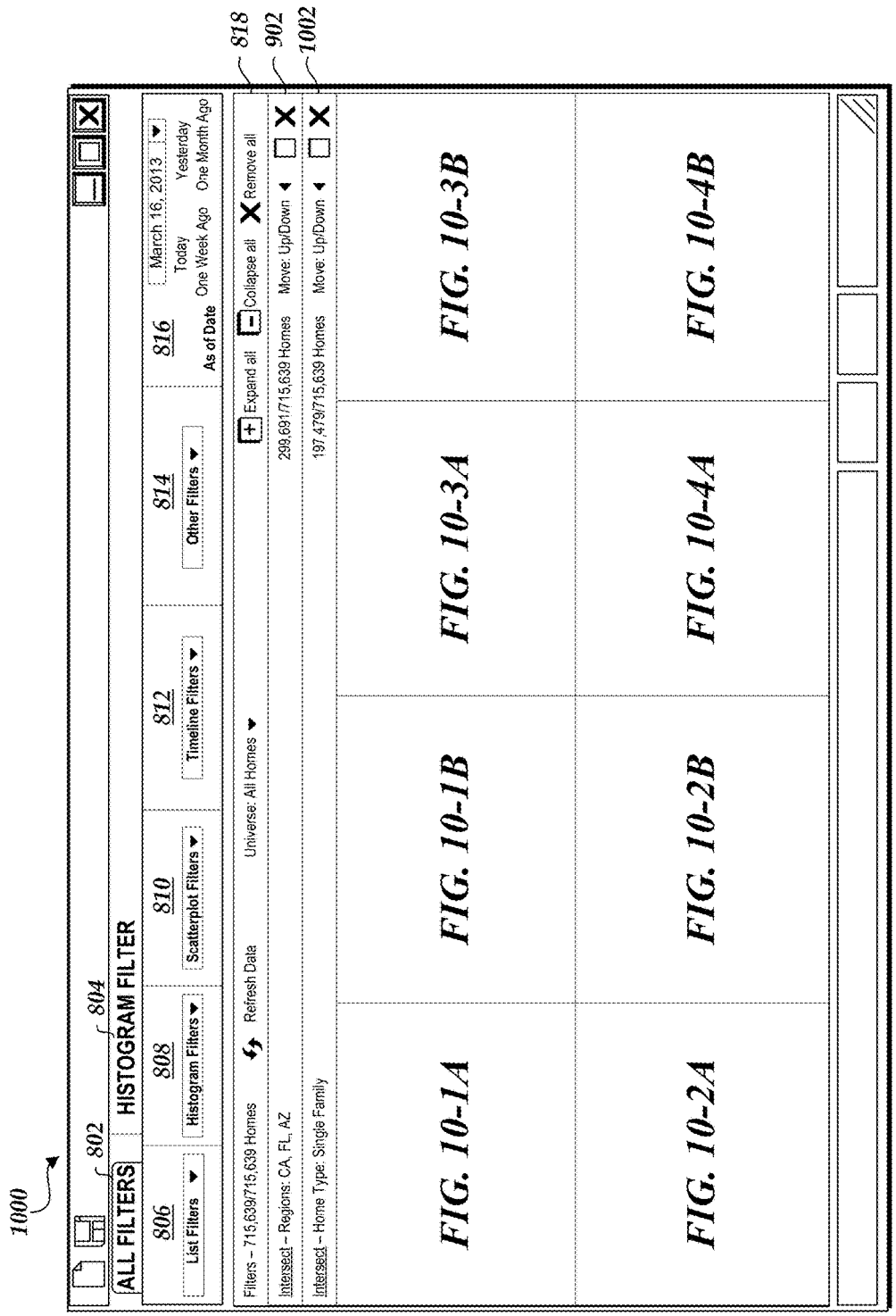
FIG. 10 illustrates another example GUI for a multipath explorer.

FIG. 10 illustrates another example graphical user interface (GUI) 1000 for a multipath explorer. As illustrated in FIG. 10, the GUI 1000 includes the all filters tab 802 and the histogram filter tab 804. While the GUI 1000 includes the all filters tab 802 and the histogram filter tab 804, this is not meant to be limiting as the GUI 1000 may include fewer or additional tabs, such as tabs associated with each of the filters discussed below.

Figures 1A, 10:
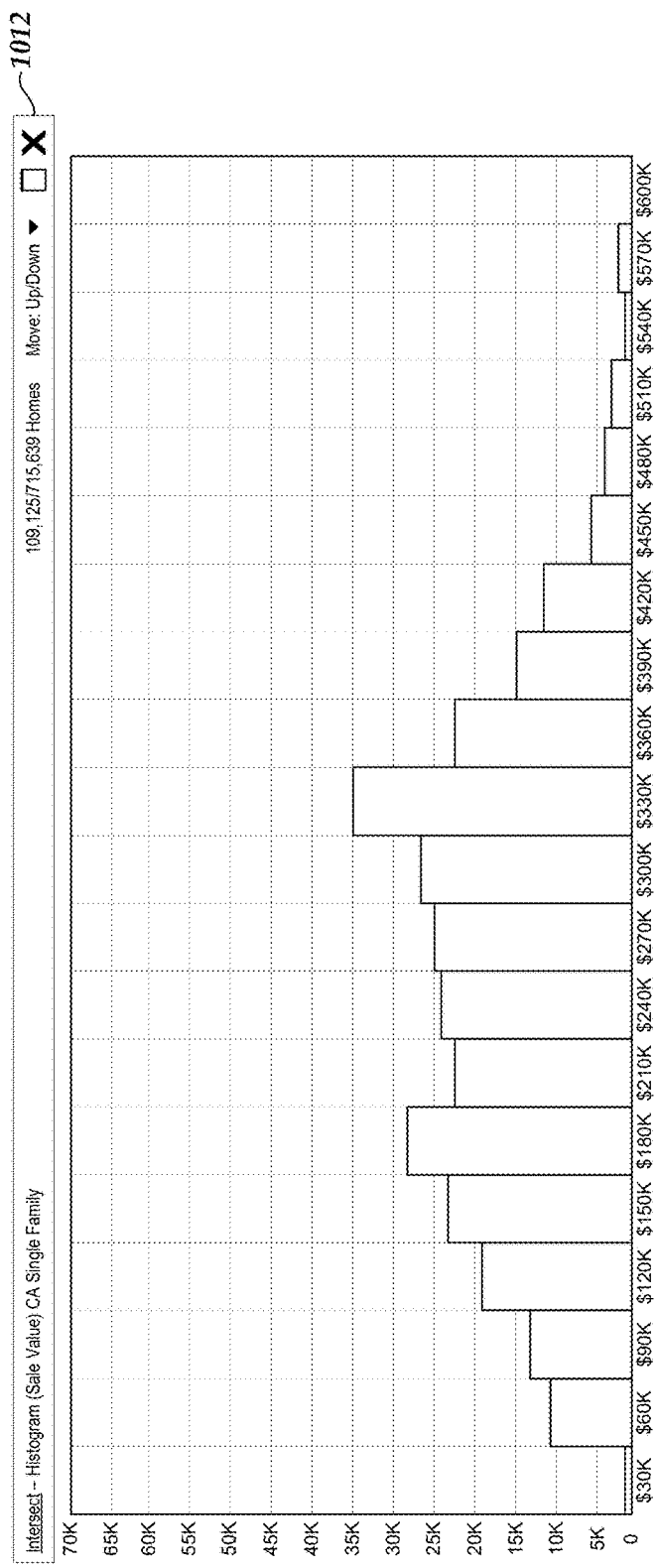

As illustrated in FIG. 10, the GUI 1000 includes the content pane 818, the content pane 902, and a content pane 1002. In an embodiment, the content pane 1002 includes a filter that is applied to the inventory in content pane 902 such that 197,479 out of 715,639 homes satisfy the membership criteria embodied by the filter. For example, the membership criteria may specify that the homes must be of a particular type (e.g., single family homes). Based on this membership criteria, eight additional content panes may be included in the GUI 1000. The first additional content pane is illustrated in FIG. 10-1A, the second in FIG. 10-1B, the third in FIG. 10-2A, the fourth in FIG. 10-2B, the fifth in FIG. 10-3A, the sixth in FIG. 10-3B, the seventh in FIG. 10-4A, and the eight in FIG. 10-4B. The additional content panes may display data that satisfies the membership criteria, data that satisfies some of the membership criteria, and data that does not satisfy the membership criteria.

FIG. 10-1A illustrates a content pane 1012 included in the GUI 1000 of FIG. 10. In an embodiment, the content pane 1012 includes a filter that is applied to the data in content pane 1002 such that 109,125 out of 715,639 homes satisfy the membership criteria embodied by the filter. For example, the membership criteria may specify that the data is to be displayed in a histogram and that the homes must be single family homes in California. Thus, content pane 1012 displays data that satisfies the membership criteria originally specified in content pane 902 and content pane 1002.

Figures 1B, 10:
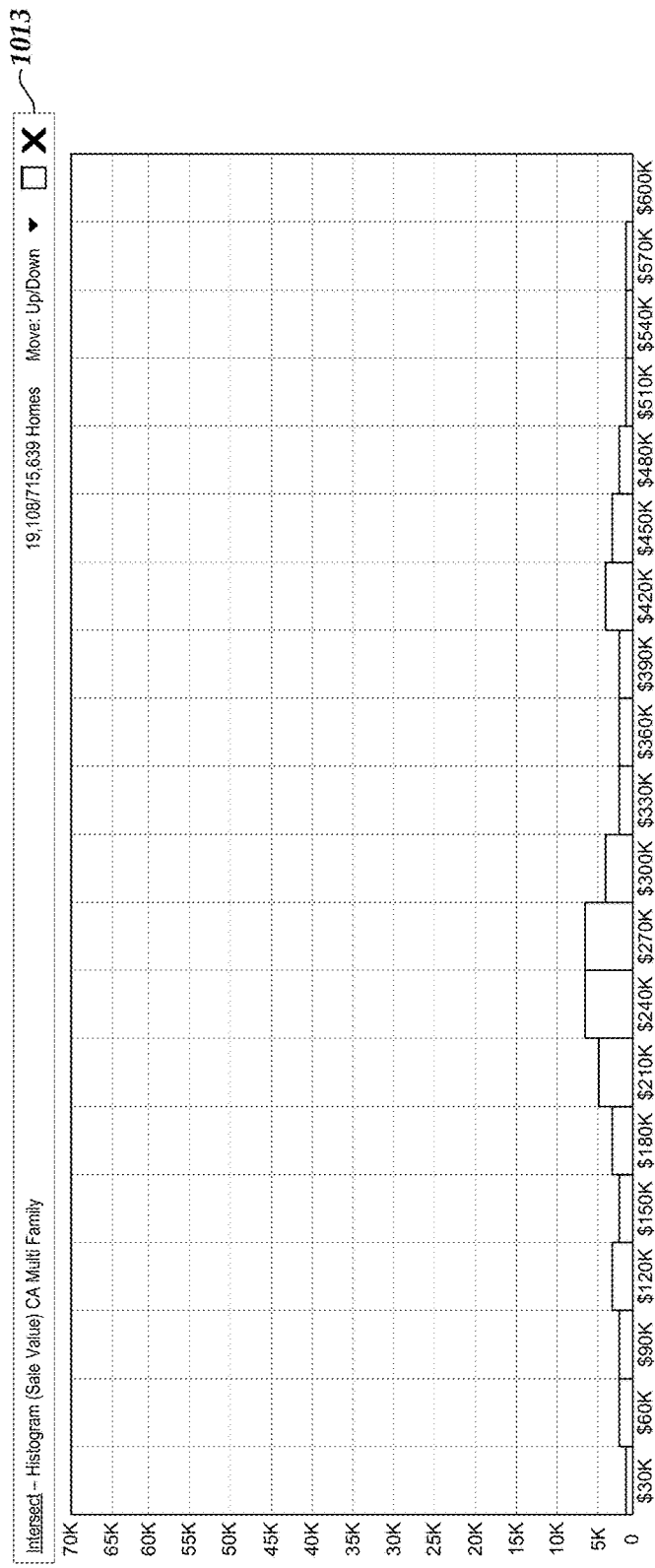
Figures 2A, 10:
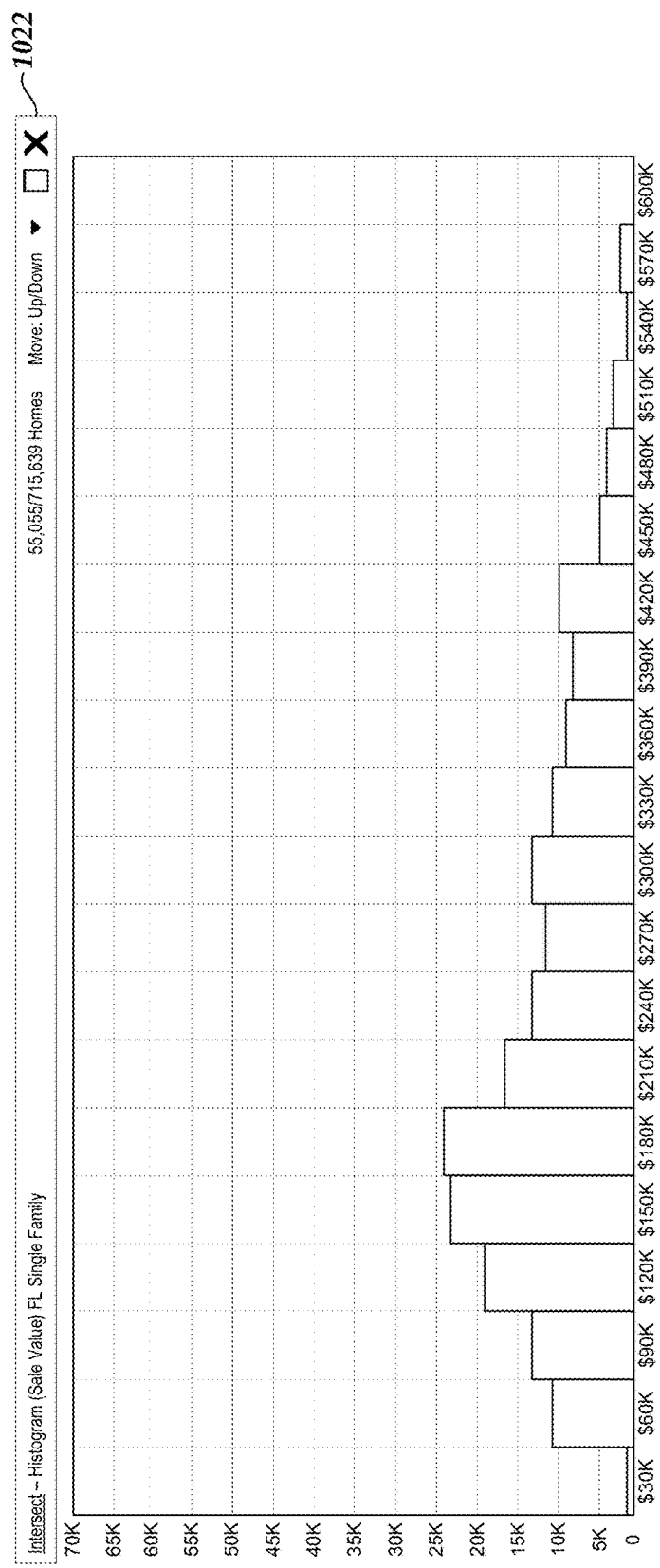
Figures 2B, 10:
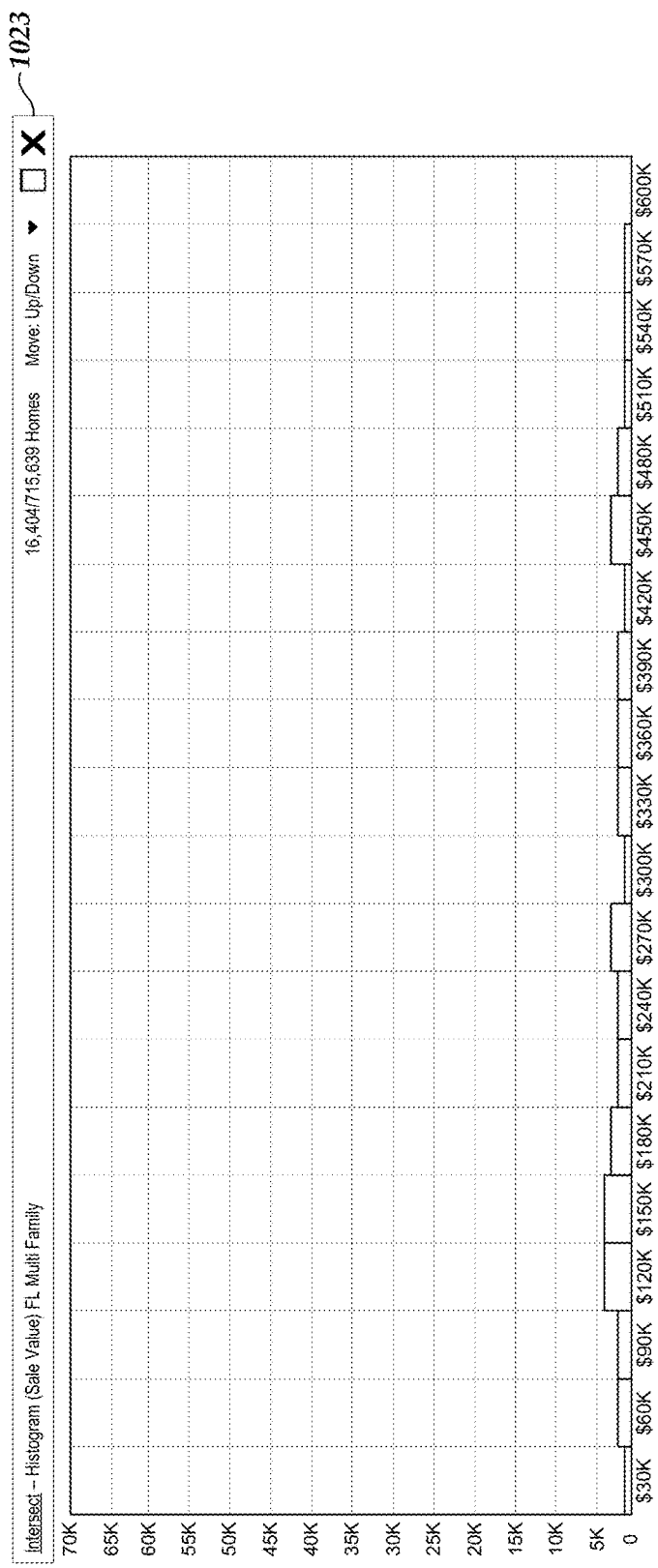

FIG. 10-1B illustrates another content pane 1013 included in the GUI 1000 of FIG. 10. In an embodiment, the content pane 1013 includes a filter that is applied to the data in content pane 1002 such that 19,108 out of 715,639 homes are identified as not satisfying the membership criteria embodied by the filter. For example, the membership criteria may specify that the data is to be displayed in a histogram and that the homes must not be single family homes in California (e.g., must be multi family homes in California). Thus, content pane 1013 displays data that satisfies the membership criteria originally specified in content pane 902 and that does not satisfy the membership criteria originally specified in content pane 1002.

FIG. 10-2A illustrates another content pane 1022 included in the GUI 1000 of FIG. 10. In an embodiment, the content pane 1022 includes a filter that is applied to the data in content pane 1002 such that 55,055 out of 715,639 homes satisfy the membership criteria embodied by the filter. For example, the membership criteria may specify that the data is to be displayed in a histogram and that the homes must be single family homes in Florida. Thus, content pane 1022 displays data that satisfies the membership criteria originally specified in content pane 902 and content pane 1002.

FIG. 10-2B illustrates another content pane 1023 included in the GUI 1000 of FIG. 10. In an embodiment, the content pane 1023 includes a filter that is applied to the data in content pane 1002 such that 16,404 out of 715,639 homes are identified as not satisfying the membership criteria embodied by the filter. For example, the membership criteria may specify that the data is to be displayed in a histogram and that the homes must not be single family homes in Florida (e.g., must be multi family homes in Florida). Thus, content pane 1023 displays data that satisfies the membership criteria originally specified in content pane 902 and that does not satisfy the membership criteria originally specified in content pane 1002.

Figures 3A, 10:
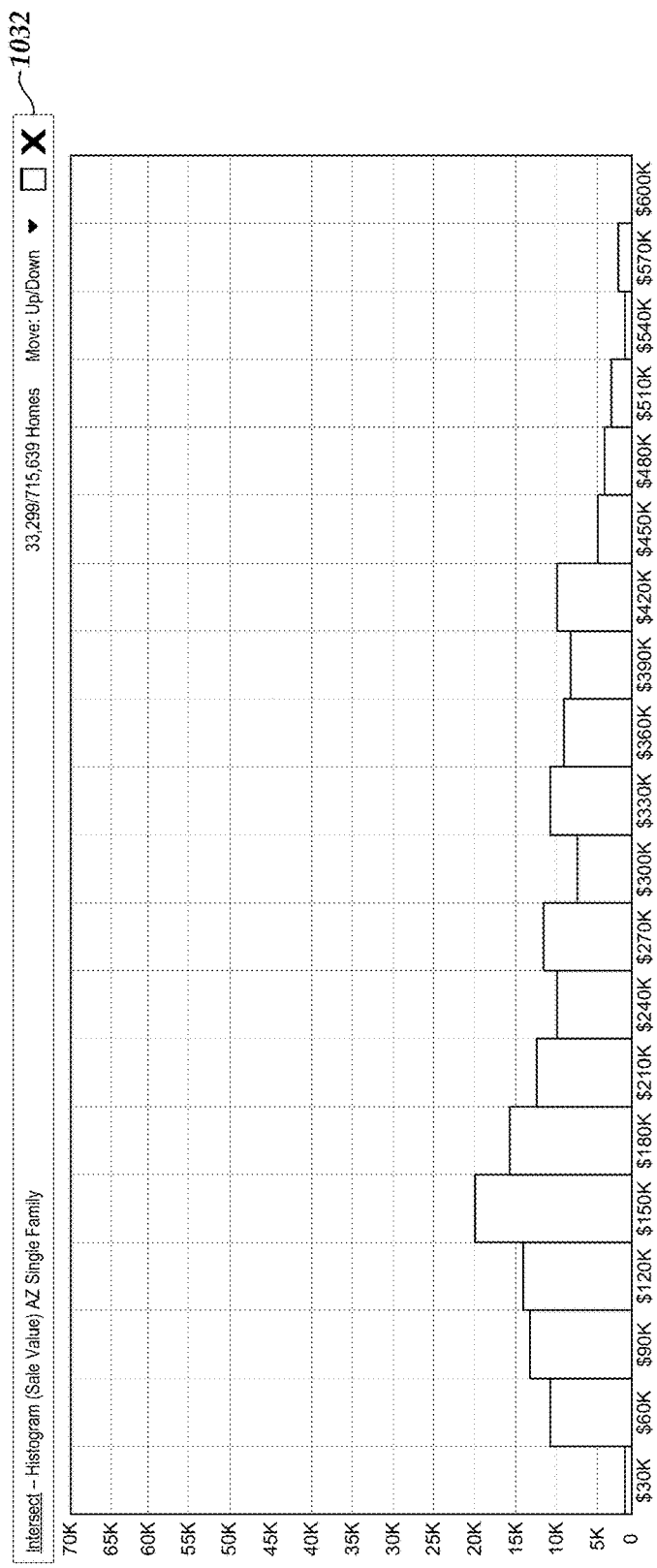
Figures 3B, 10:
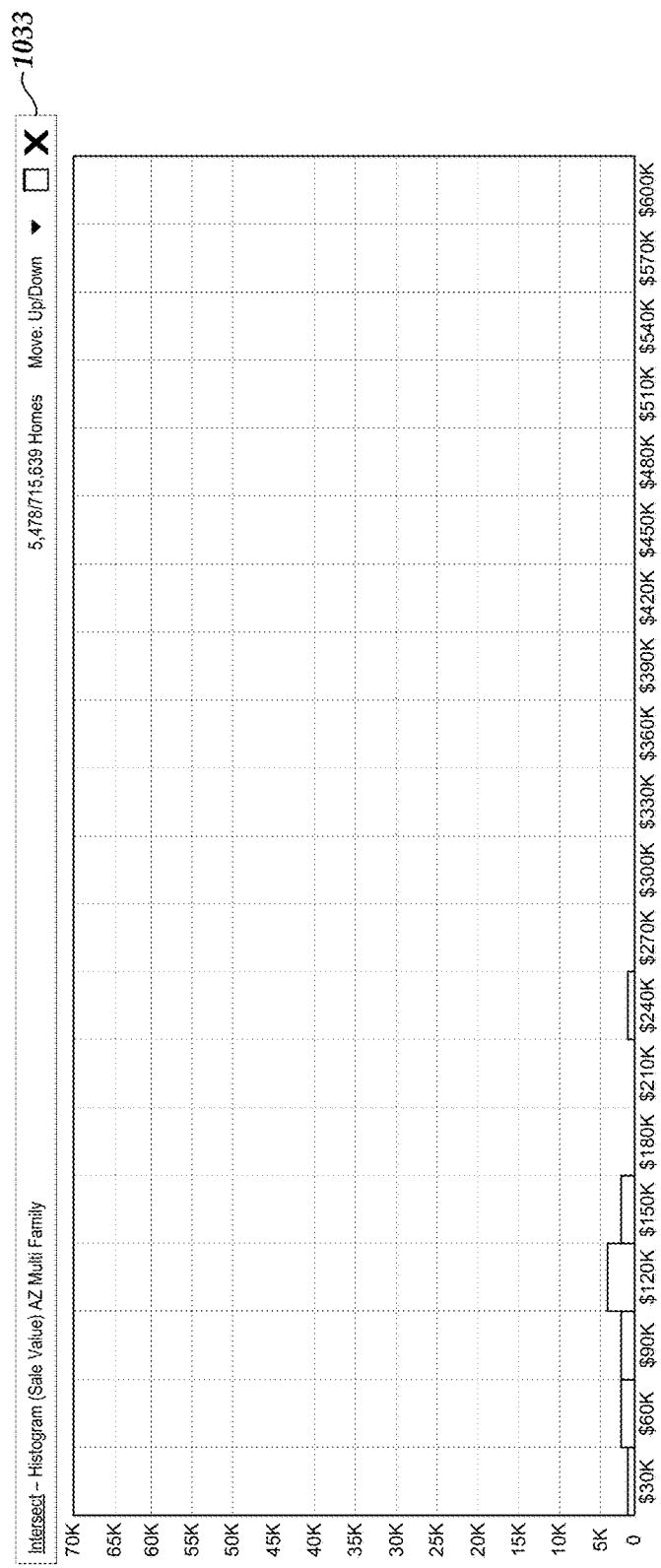

FIG. 10-3A illustrates another content pane 1032 included in the GUI 1000 of FIG. 10. In an embodiment, the content pane 1032 includes a filter that is applied to the data in content pane 1002 such that 33,299 out of 715,639 homes satisfy the membership criteria embodied by the filter. For example, the membership criteria may specify that the data is to be displayed in a histogram and that the homes must be single family homes in Arizona. Thus, content pane 1032 displays data that satisfies the membership criteria originally specified in content pane 902 and content pane 1002.

FIG. 10-3B illustrates another content pane 1033 included in the GUI 1000 of FIG. 10. In an embodiment, the content pane 1033 includes a filter that is applied to the data in content pane 1002 such that 5,478 out of 715,639 homes are identified as not satisfying the membership criteria embodied by the filter. For example, the membership criteria may specify that the data is to be displayed in a histogram and that the homes must not be single family homes in Arizona (e.g., must be multi family homes in Arizona). Thus, content pane 1033 displays data that satisfies the membership criteria originally specified in content pane 902 and that does not satisfy the membership criteria originally specified in content pane 1002.

Figures 4A, 10:
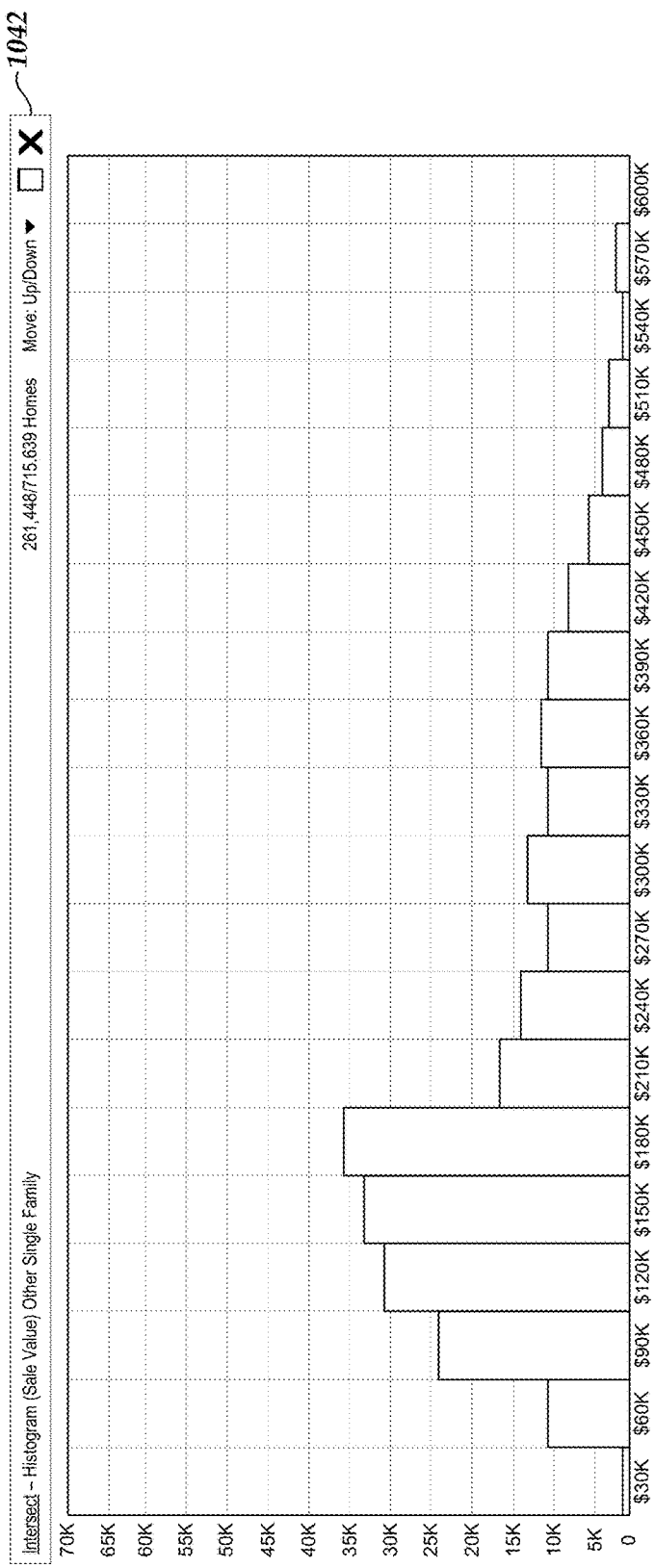

FIG. 10-4A illustrates another content pane 1042 included in the GUI 1000 of FIG. 10. In an embodiment, the content pane 1042 includes a filter that is applied to the data in content pane 1002 such that 261,448 out of 715,639 homes are identified as not satisfying the membership criteria embodied by the filter. For example, the membership criteria may specify that the data is to be displayed in a histogram and that the homes must be single family homes not in California, Florida, or Arizona. Thus, content pane 1042 displays data that does not satisfy the membership criteria originally specified in content pane 902 and that does satisfy the membership criteria originally specified in content pane 1002.

Figures 4B, 10:
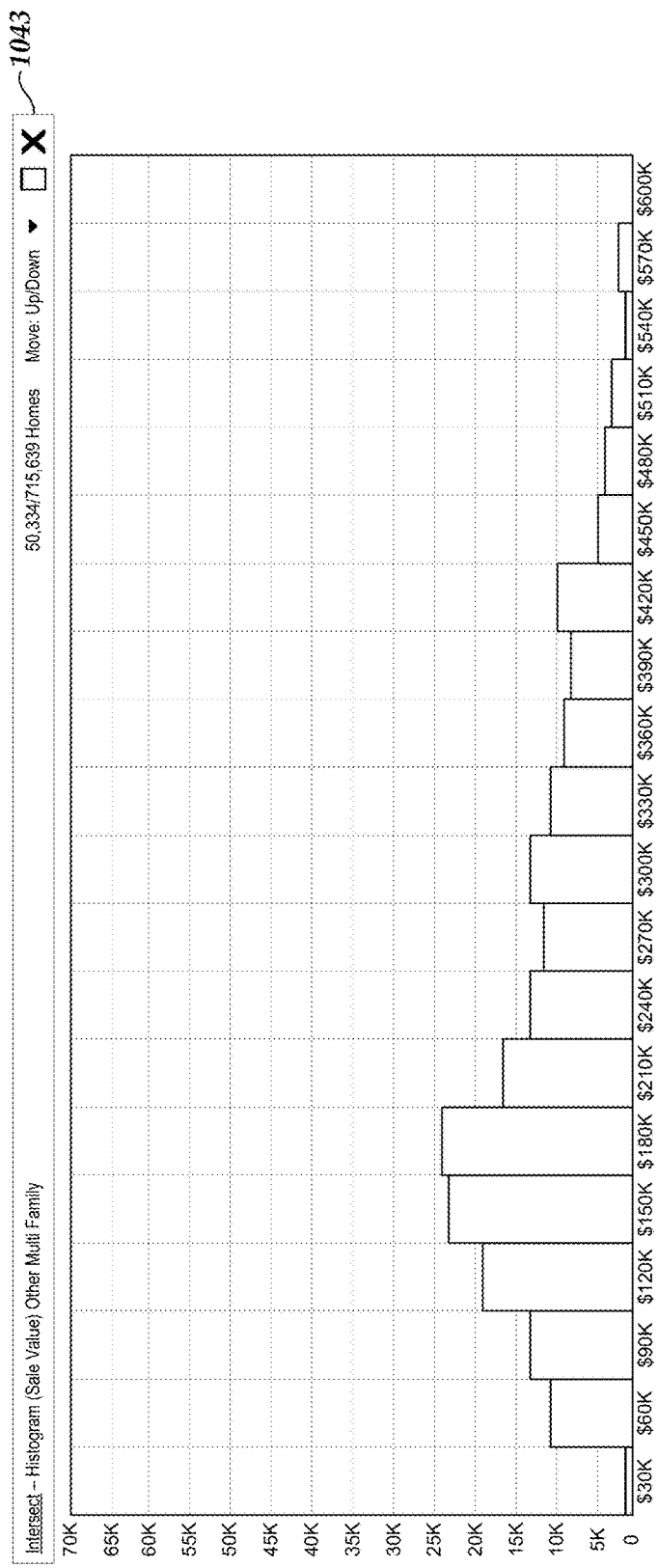

FIG. 10-4B illustrates another content pane 1043 included in the GUI 1000 of FIG. 10. In an embodiment, the content pane 1043 includes a filter that is applied to the data in content pane 1002 such that 50,334 out of 715,639 homes are identified as not satisfying the membership criteria embodied by the filter. For example, the membership criteria may specify that the data is to be displayed in a histogram, that the homes must not be single family homes, and that the homes must not be in California, Florida, or Arizona (e.g., must be multi family homes locations other than California, Florida, or Arizona). Thus, content pane 1043 displays data that does not satisfy the membership criteria originally specified in content pane 902 and content pane 1002.

Figure 11:
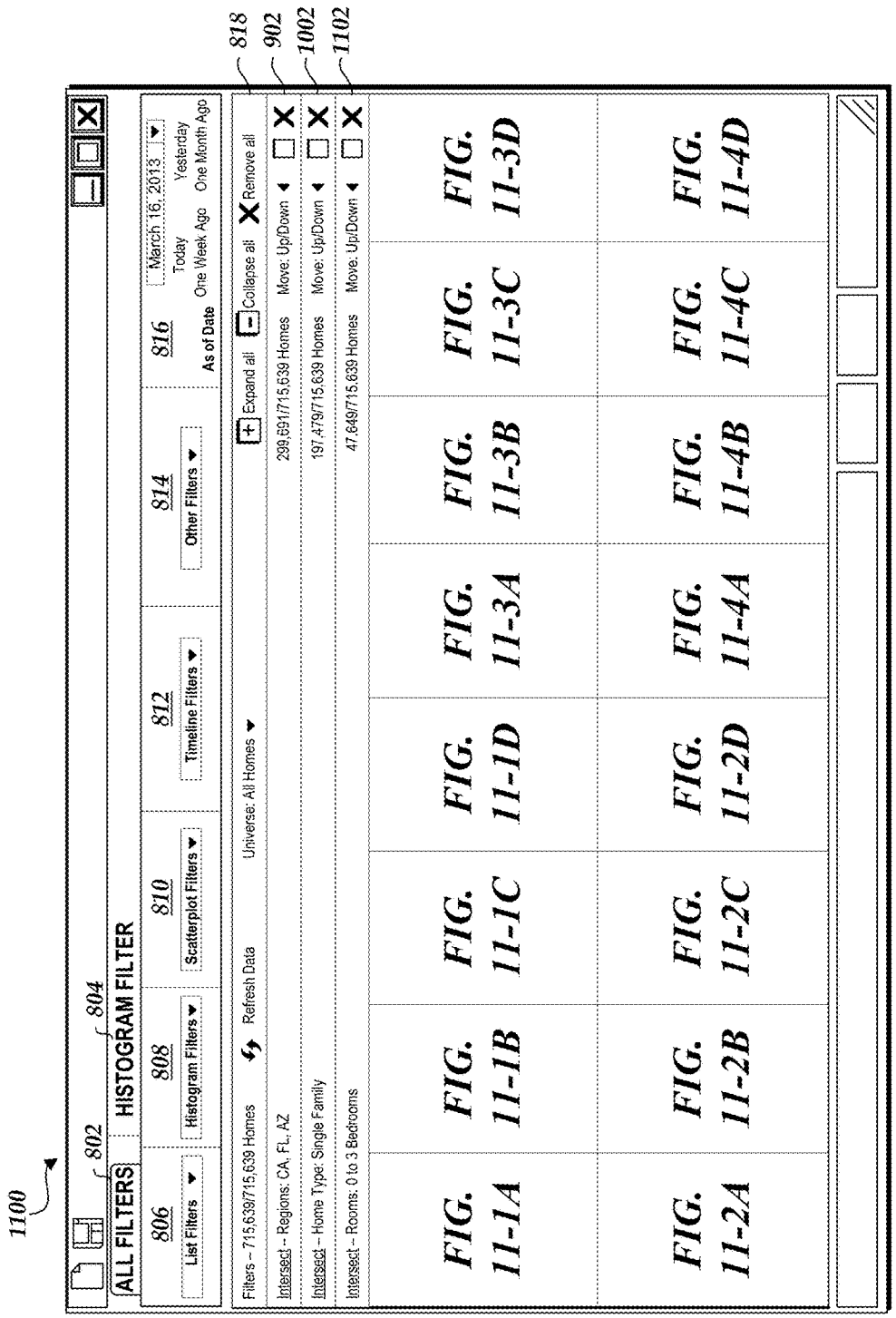
FIG. 11 illustrates another example GUI for a multipath explorer.
Figures 1A, 11:
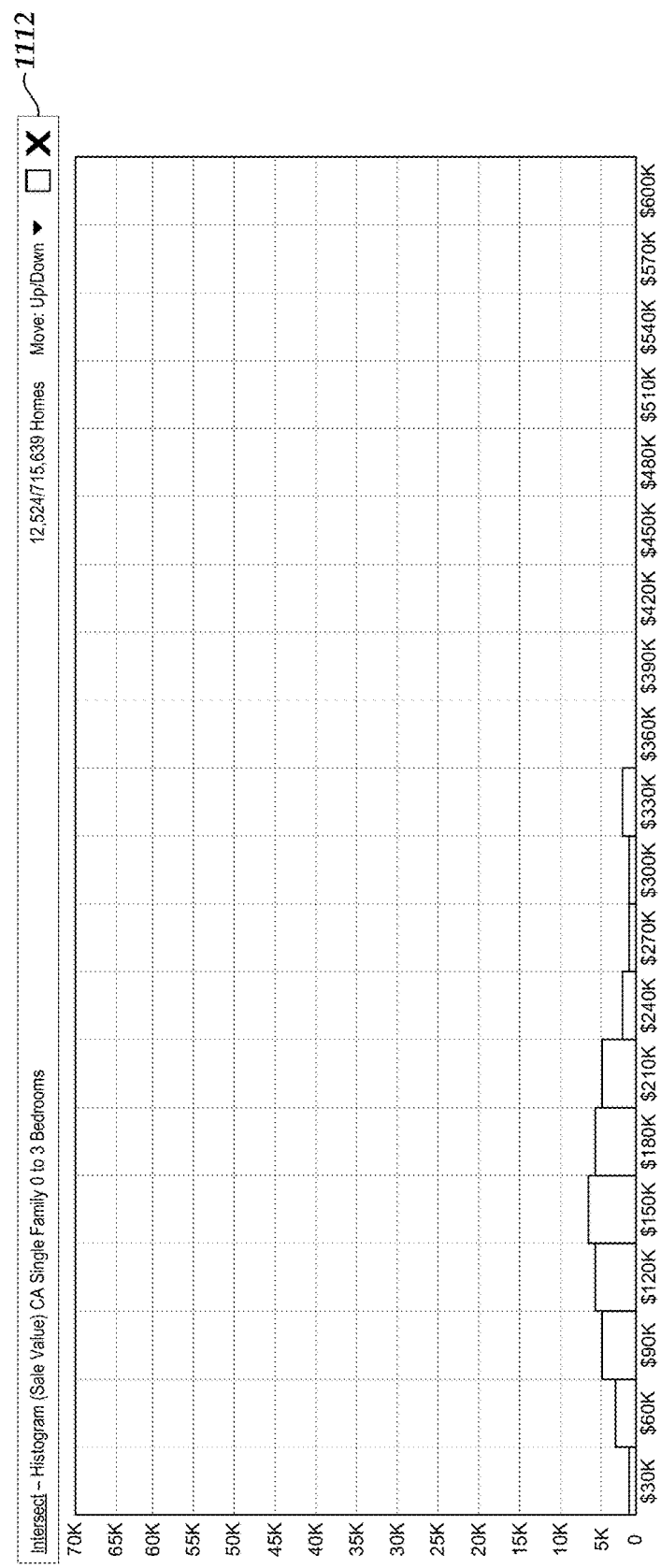
Figures 1B, 11:
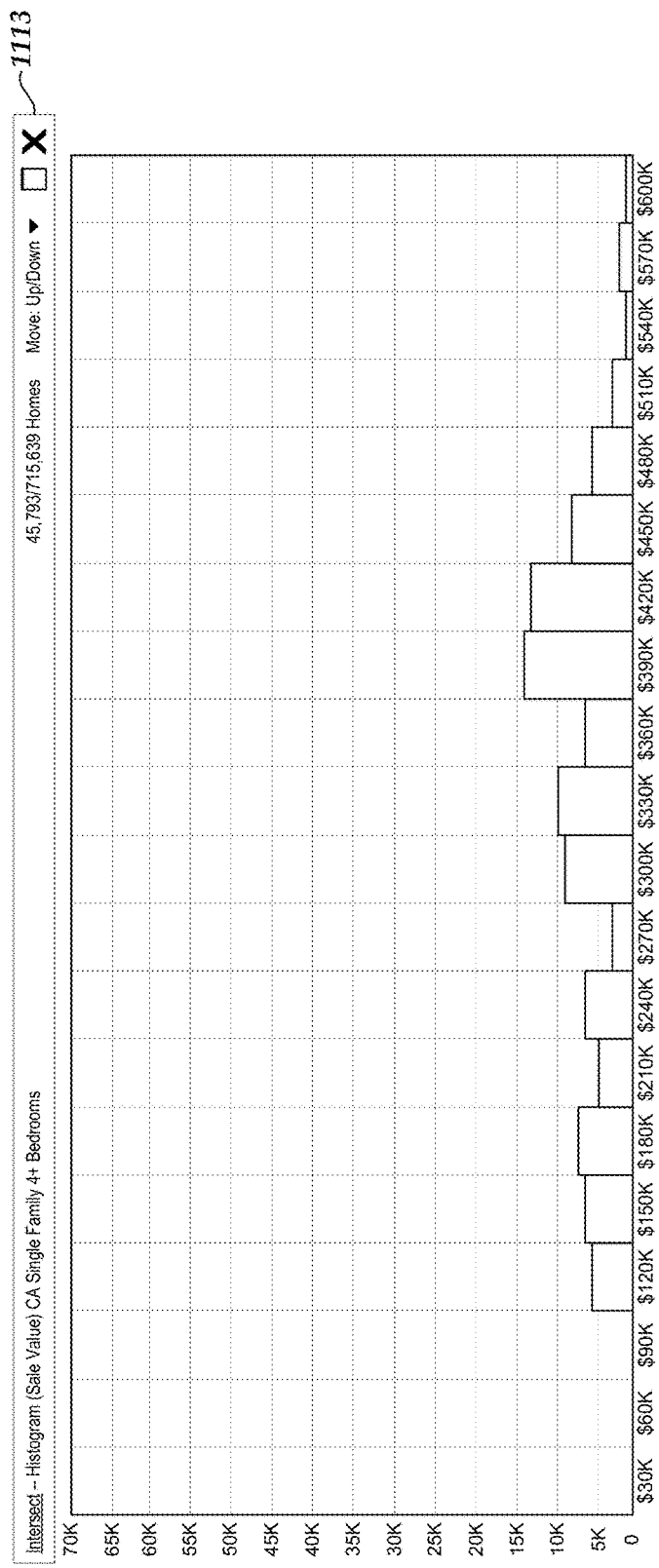

FIG. 11 illustrates another example graphical user interface (GUI) 1100 for a multipath explorer. As illustrated in FIG. 11, the GUI 1100 includes the all filters tab 802 and the histogram filter tab 804. While the GUI 1100 includes the all filters tab 802 and the histogram filter tab 904, this is not meant to be limiting as the GUI 1200 may include fewer or additional tabs, such as tabs associated with each of the filters discussed below.

As illustrated in FIG. 11, the GUI 1100 includes the content pane 818, the content pane 902, the content pane 1002, and a content pane 1102. In an embodiment, the content pane 1102 includes a filter that is applied to the inventory in content pane 1002 such that 47,649 out of 715,639 homes satisfy the membership criteria embodied by the filter. For example, the membership criteria may specify that the homes must include a certain number of bedrooms (e.g., zero to three bedrooms). Based on this membership criteria, sixteen additional content panes may be included in the GUI 1100. The first additional content pane is illustrated in FIG. 11-1A, the second in FIG. 11-1B, the third in FIG. 11-1C, the fourth in FIG. 11-1D, the fifth in FIG. 11-2A, the sixth in FIG. 11-2B, the seventh in FIG. 11-2C, the eight in FIG. 11-2D, the ninth in FIG. 11-3A, the tenth in FIG. 11-3B, the eleventh in FIG. 11-3C, the twelfth in FIG. 11-3D, the thirteenth in FIG. 11-4A, the fourteenth in FIG. 11-4B, the fifteenth in FIG. 11-4C, and the sixteenth in FIG. 11-4D. The additional content panes may display data that satisfies the membership criteria, data that satisfies some of the membership criteria, and data that does not satisfy the membership criteria.

FIG. 11-1A illustrates a content pane 1112 included in the GUI 1100 of FIG. 11. In an embodiment, the content pane 1112 includes a filter that is applied to the data in content pane 1102 such that 12,524 out of 715,639 homes satisfy the membership criteria embodied by the filter. For example, the membership criteria may specify that the data is to be displayed in a histogram and that the homes must be single family homes with zero to three bedrooms in California. Thus, content pane 1112 displays data that satisfies the membership criteria originally specified in content pane 902, content pane 1002, and content pane 1102.

FIG. 11-1B illustrates another content pane 1113 included in the GUI 1100 of FIG. 11. In an embodiment, the content pane 1113 includes a filter that is applied to the data in content pane 1102 such that 45,793 out of 715,639 homes are identified as not satisfying the membership criteria embodied by the filter. For example, the membership criteria may specify that the data is to be displayed in a histogram and that the homes must be single family homes not with zero to three bedrooms in California (e.g., must be single family homes with four or more bedrooms in California). Thus, content pane 1113 displays data that satisfies the membership criteria originally specified in content pane 902 and content pane 1002 and that does not satisfy the membership criteria originally specified in content pane 1102.

Figures 1C, 11:
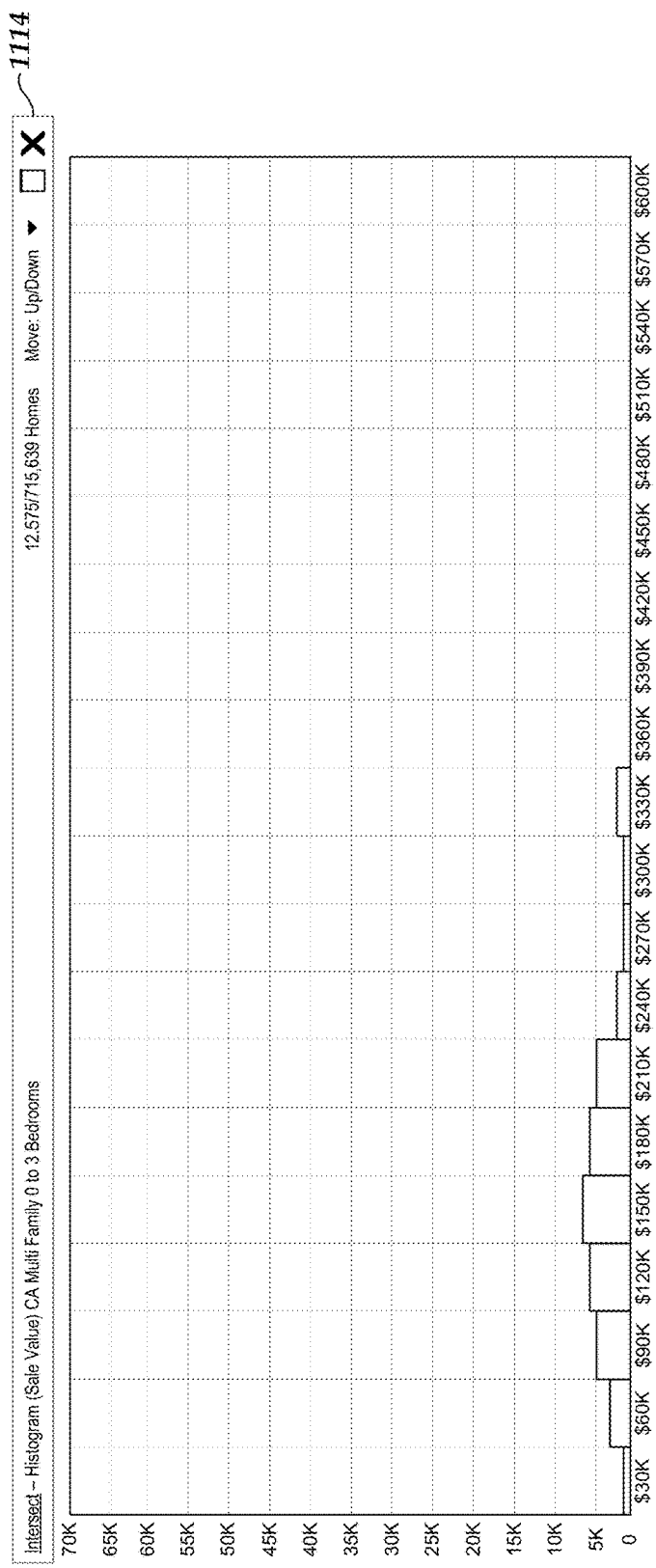

FIG. 11-1C illustrates another content pane 1114 included in the GUI 1100 of FIG. 11. In an embodiment, the content pane 1114 includes a filter that is applied to the data in content pane 1102 such that 12,575 out of 715,639 homes are identified as not satisfying the membership criteria embodied by the filter. For example, the membership criteria may specify that the data is to be displayed in a histogram and that the homes must not be single family homes with zero to three bedrooms in California (e.g., must be multi family homes with zero to three bedrooms in California). Thus, content pane 1114 displays data that satisfies the membership criteria originally specified in content pane 902 and content pane 1102 and that does not satisfy the membership criteria originally specified in content pane 1002.

Figures 1D, 11:
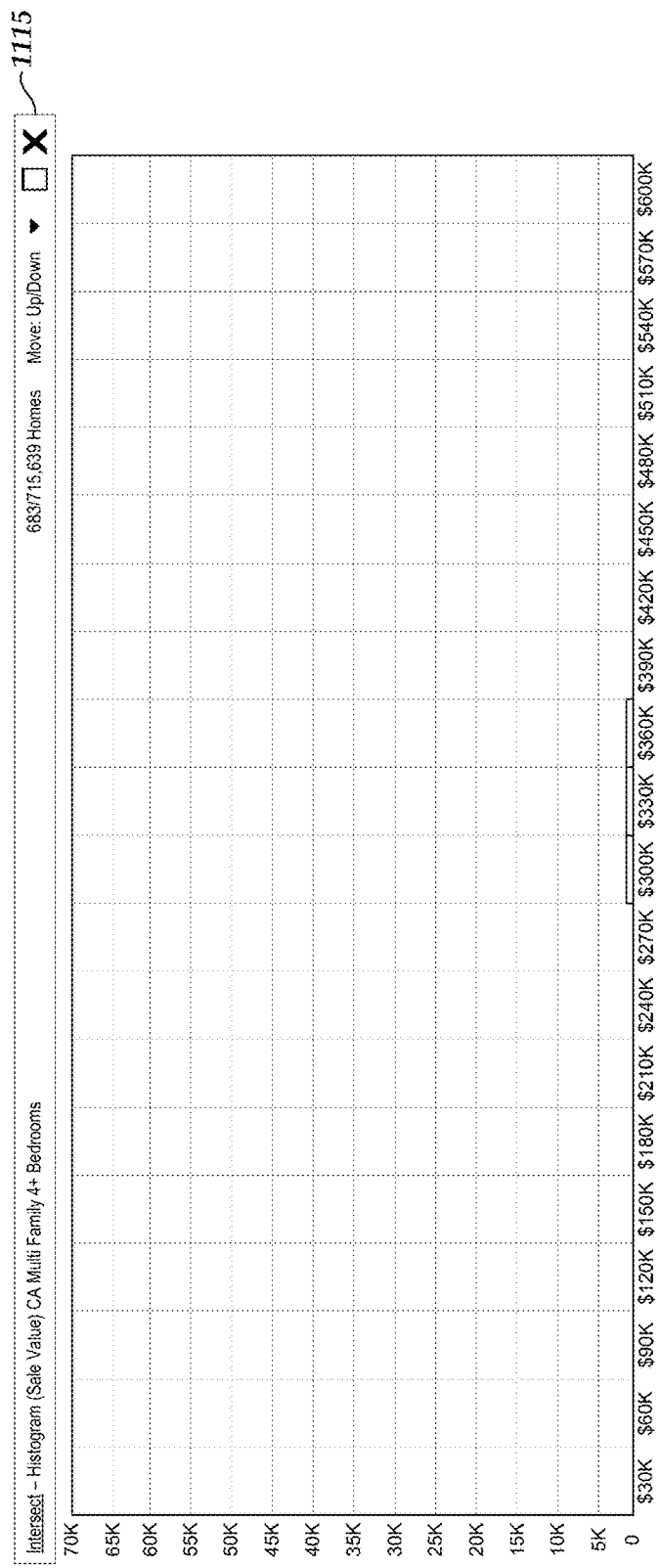
Figures 2A, 11:
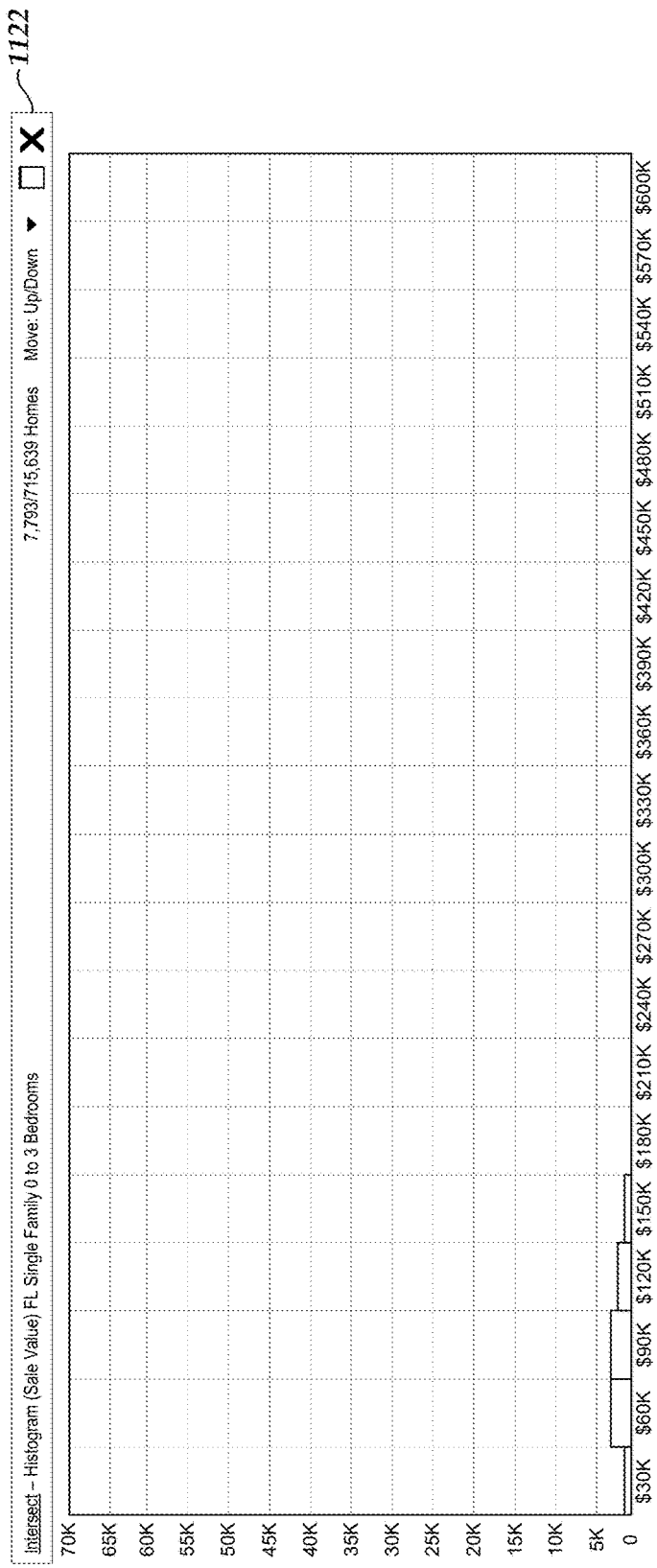
Figures 2B, 11:
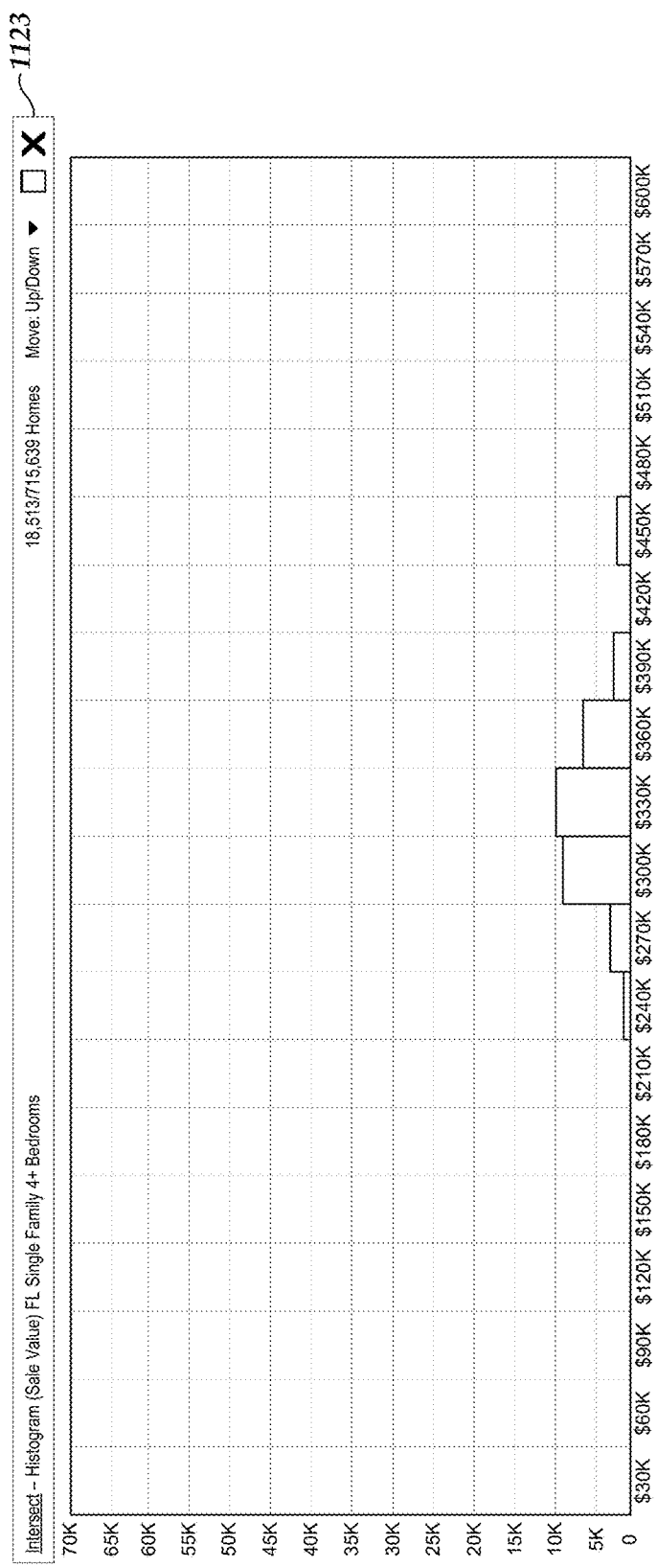
Figures 2C, 11:
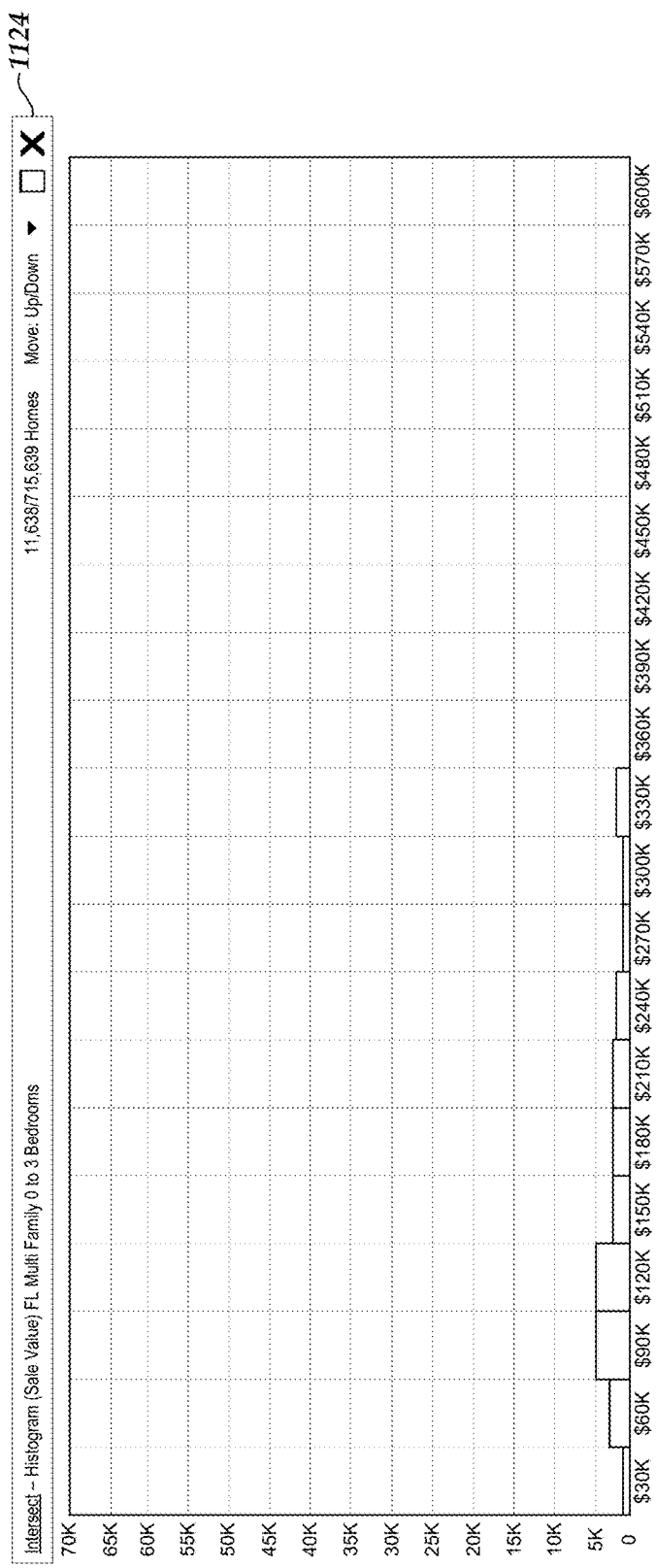

FIG. 11-1D illustrates another content pane 1115 included in the GUI 1100 of FIG. 11. In an embodiment, the content pane 1215 includes a filter that is applied to the data in content pane 1102 such that 683 out of 715,639 homes are identified as not satisfying the membership criteria embodied by the filter. For example, the membership criteria may specify that the data is to be displayed in a histogram and that the homes must not be single family homes in California and must not include zero to three bedrooms (e.g., must be multi family homes with four or more bedrooms in California). Thus, content pane 1115 displays data that satisfies the membership criteria originally specified in content pane 902 and does not satisfy the membership criteria originally specified in content pane 1002 and content pane 1102.

FIG. 11-2A illustrates another content pane 1122 included in the GUI 1100 of FIG. 11. In an embodiment, the content pane 1122 includes a filter that is applied to the data in content pane 1102 such that 7,793 out of 715,639 homes satisfy the membership criteria embodied by the filter. For example, the membership criteria may specify that the data is to be displayed in a histogram and that the homes must be single family homes with zero to three bedrooms in Florida. Thus, content pane 1122 displays data that satisfies the membership criteria originally specified in content pane 902, content pane 1002, and content pane 1102.

FIG. 11-2B illustrates another content pane 1123 included in the GUI 1100 of FIG. 11. In an embodiment, the content pane 1123 includes a filter that is applied to the data in content pane 1102 such that 18,513 out of 715,639 homes are identified as not satisfying the membership criteria embodied by the filter. For example, the membership criteria may specify that the data is to be displayed in a histogram and that the homes must be single family homes not with zero to three bedrooms in Florida (e.g., must be single family homes with four or more bedrooms in Florida). Thus, content pane 1123 displays data that satisfies the membership criteria originally specified in content pane 902 and content pane 1002 and that does not satisfy the membership criteria originally specified in content pane 1102.

FIG. 11-2C illustrates another content pane 1124 included in the GUI 1100 of FIG. 11. In an embodiment, the content pane 1124 includes a filter that is applied to the data in content pane 1102 such that 11,638 out of 715,639 homes are identified as not satisfying the membership criteria embodied by the filter. For example, the membership criteria may specify that the data is to be displayed in a histogram and that the homes must not be single family homes with zero to three bedrooms in Florida (e.g., must be multi family homes with zero to three bedrooms in Florida). Thus, content pane 1124 displays data that satisfies the membership criteria originally specified in content pane 902 and content pane 1102 and that does not satisfy the membership criteria originally specified in content pane 1002.

Figures 2D, 11:
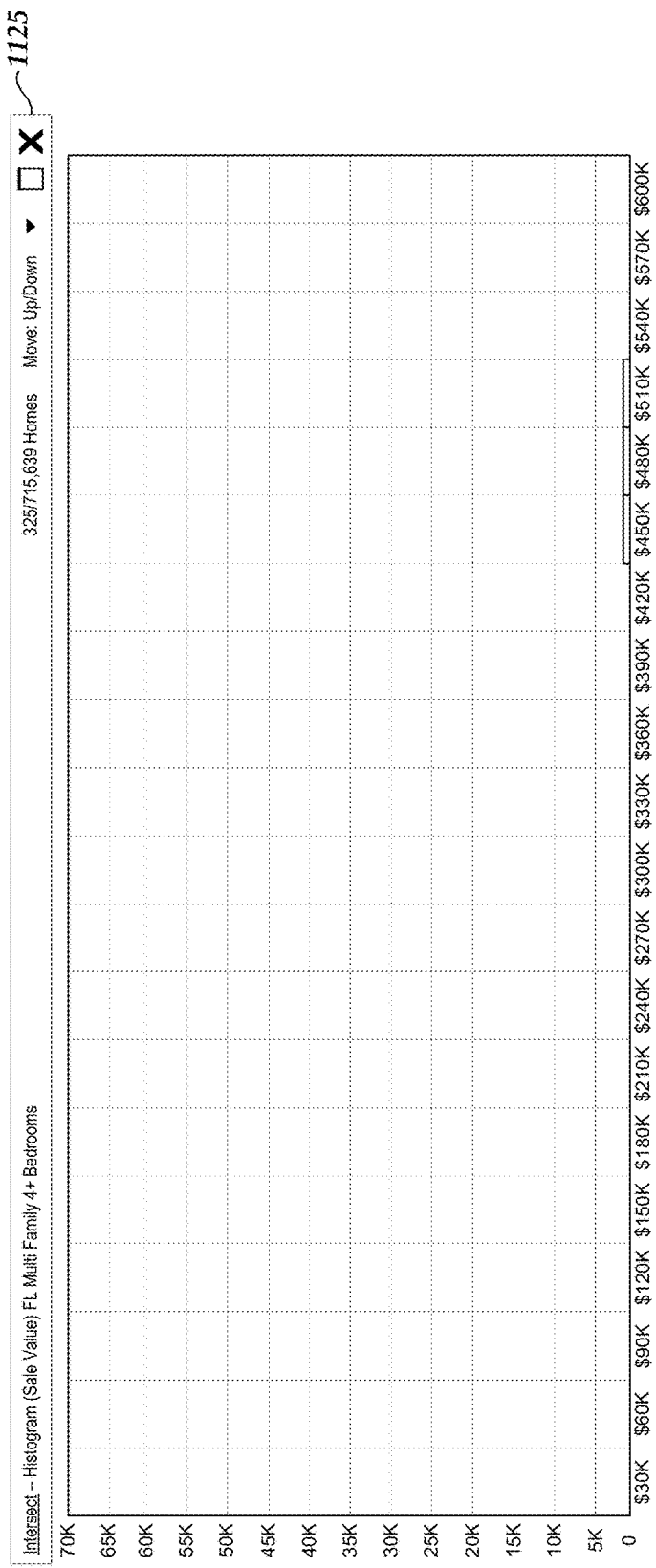
Figures 3A, 11:
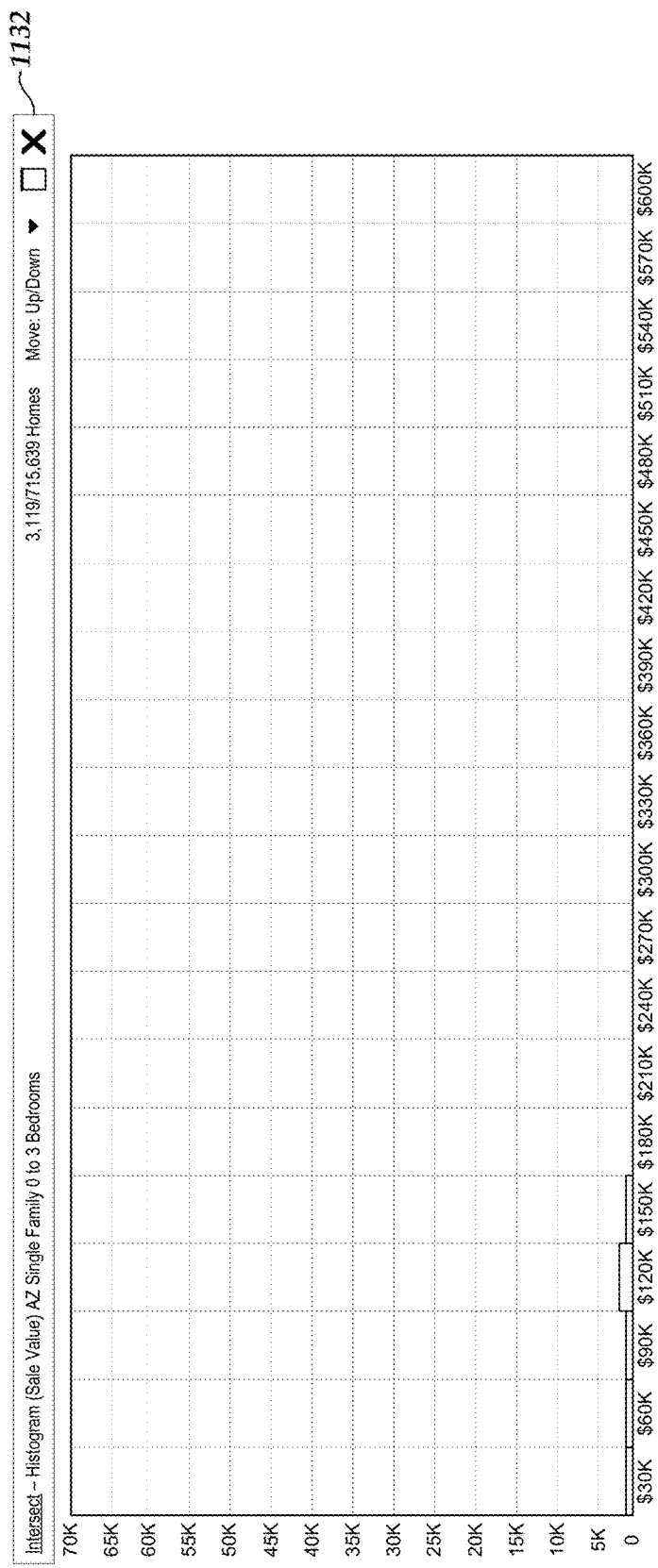
Figures 3B, 11:
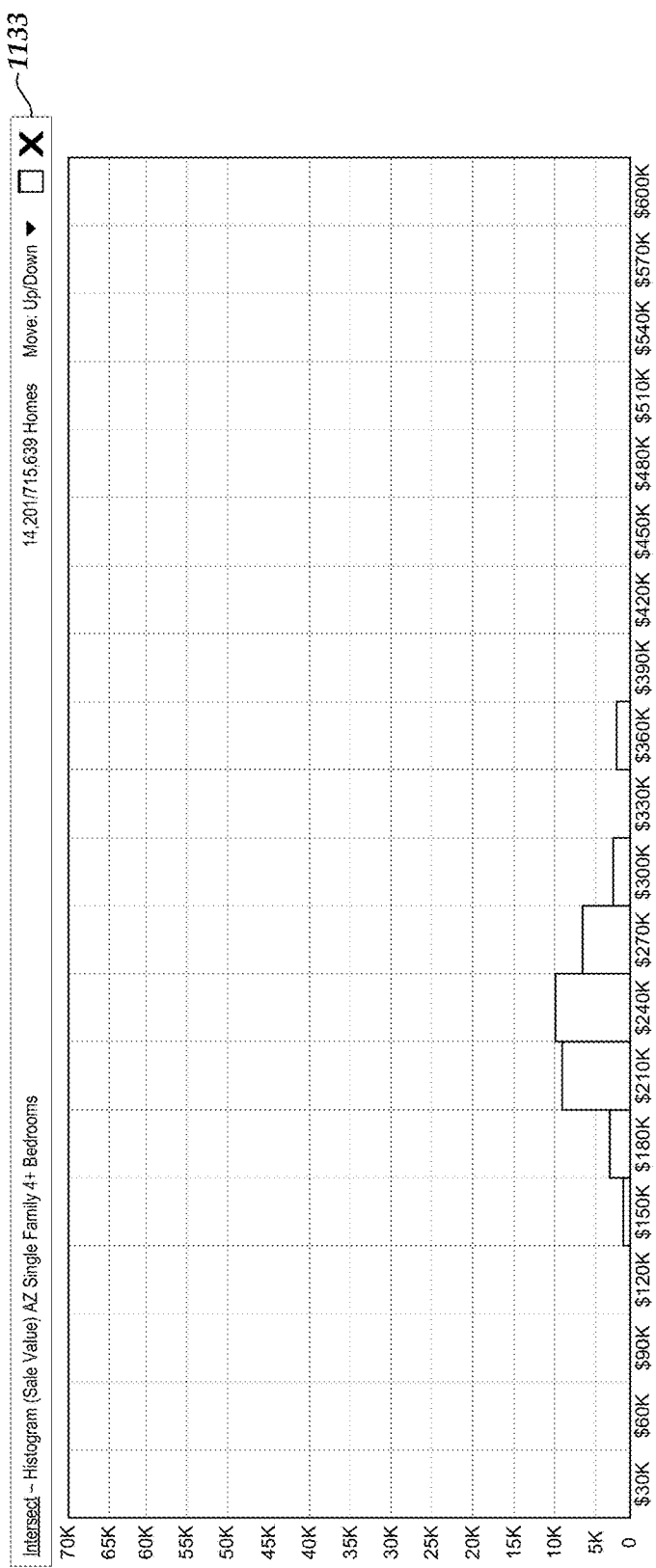

FIG. 11-2D illustrates another content pane 1125 included in the GUI 1100 of FIG. 11. In an embodiment, the content pane 1125 includes a filter that is applied to the data in content pane 1102 such that 325 out of 715,639 homes are identified as not satisfying the membership criteria embodied by the filter. For example, the membership criteria may specify that the data is to be displayed in a histogram and that the homes must not be single family homes in Florida and must not include zero to three bedrooms (e.g., must be multi family homes with four or more bedrooms in Florida). Thus, content pane 1125 displays data that satisfies the membership criteria originally specified in content pane 902 and does not satisfy the membership criteria originally specified in content pane 1102 and content pane 1102.

FIG. 11-3A illustrates another content pane 1132 included in the GUI 1100 of FIG. 11. In an embodiment, the content pane 1132 includes a filter that is applied to the data in content pane 1102 such that 3,119 out of 715,639 homes satisfy the membership criteria embodied by the filter. For example, the membership criteria may specify that the data is to be displayed in a histogram and that the homes must be single family homes with zero to three bedrooms in Arizona. Thus, content pane 1132 displays data that satisfies the membership criteria originally specified in content pane 902, content pane 1002, and content pane 1102.

FIG. 11-3B illustrates another content pane 1133 included in the GUI 1100 of FIG. 11. In an embodiment, the content pane 1133 includes a filter that is applied to the data in content pane 1102 such that 14,201 out of 715,639 homes are identified as not satisfying the membership criteria embodied by the filter. For example, the membership criteria may specify that the data is to be displayed in a histogram and that the homes must be single family homes not with zero to three bedrooms in Arizona (e.g., must be single family homes with four or more bedrooms in Arizona). Thus, content pane 1133 displays data that satisfies the membership criteria originally specified in content pane 902 and content pane 1002 and that does not satisfy the membership criteria originally specified in content pane 1102.

Figures 3C, 11:
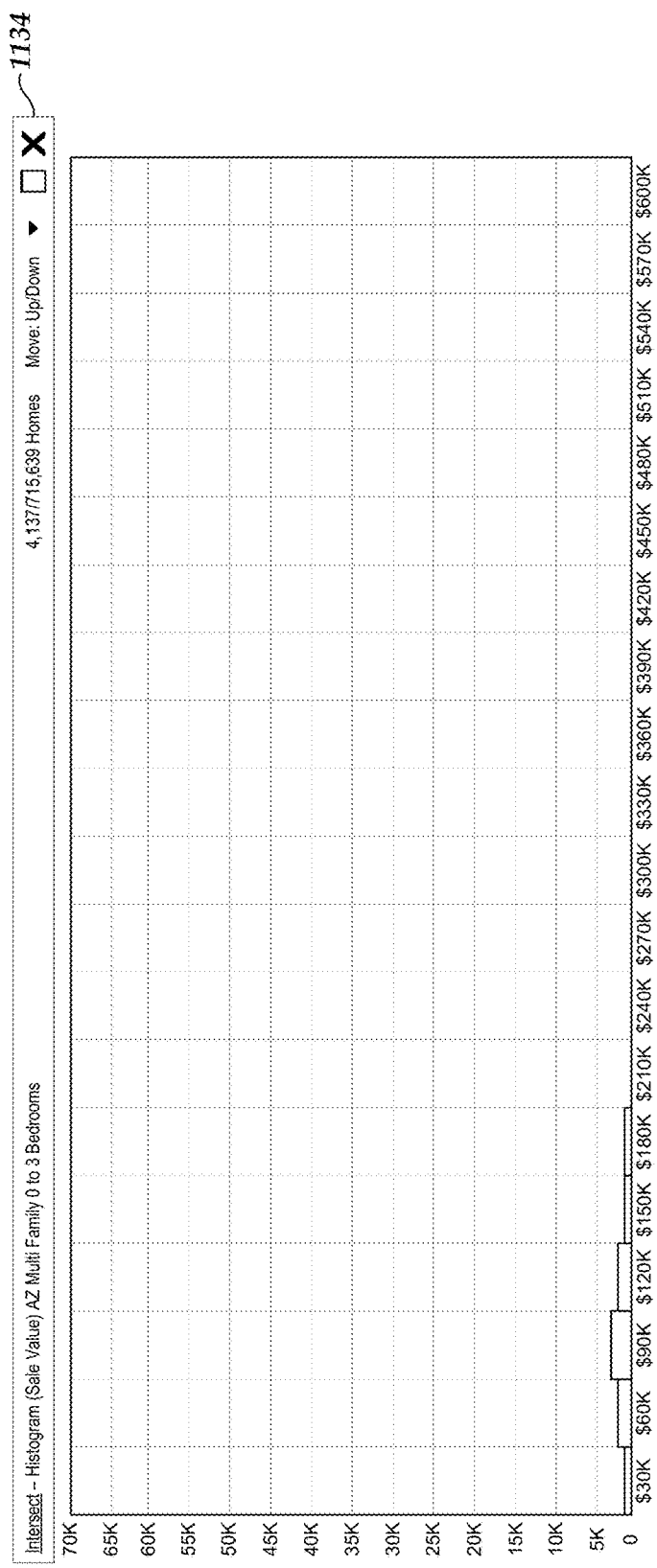

FIG. 11-3C illustrates another content pane 1134 included in the GUI 1100 of FIG. 11. In an embodiment, the content pane 1134 includes a filter that is applied to the data in content pane 1102 such that 4,137 out of 715,639 homes are identified as not satisfying the membership criteria embodied by the filter. For example, the membership criteria may specify that the data is to be displayed in a histogram and that the homes must not be single family homes with zero to three bedrooms in Arizona (e.g., must be multi family homes with zero to three bedrooms in Arizona). Thus, content pane 1134 displays data that satisfies the membership criteria originally specified in content pane 1002 and content pane 1102 and that does not satisfy the membership criteria originally specified in content pane 1002.

Figures 3D, 11:
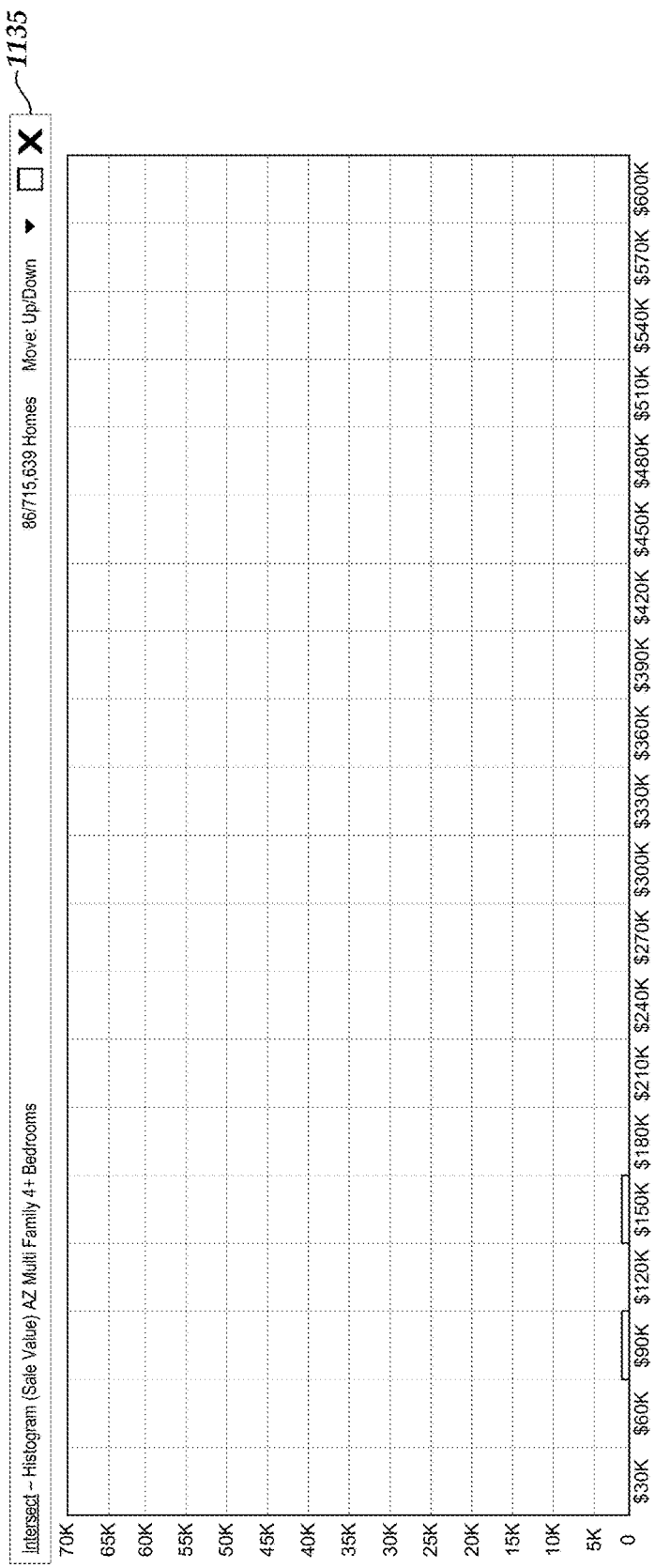
Figures 4A, 11:
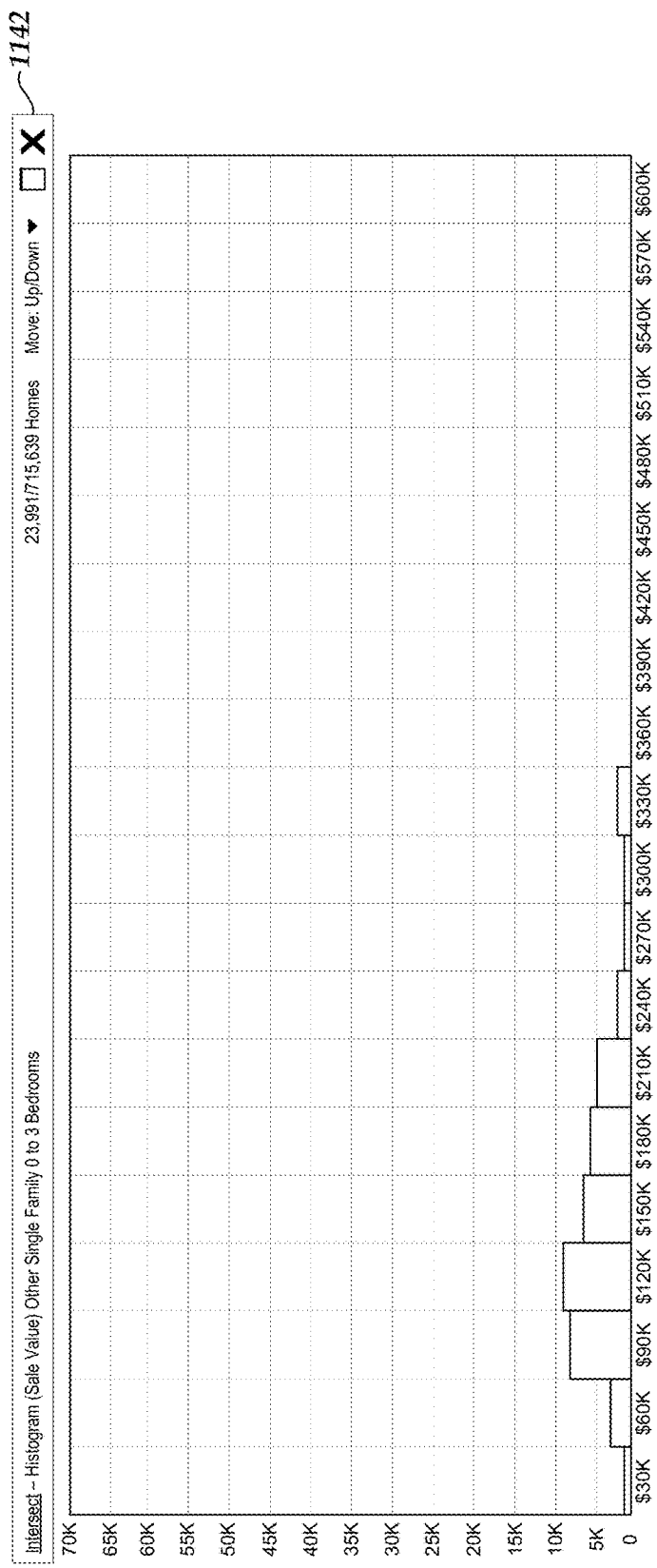
Figures 4B, 11:
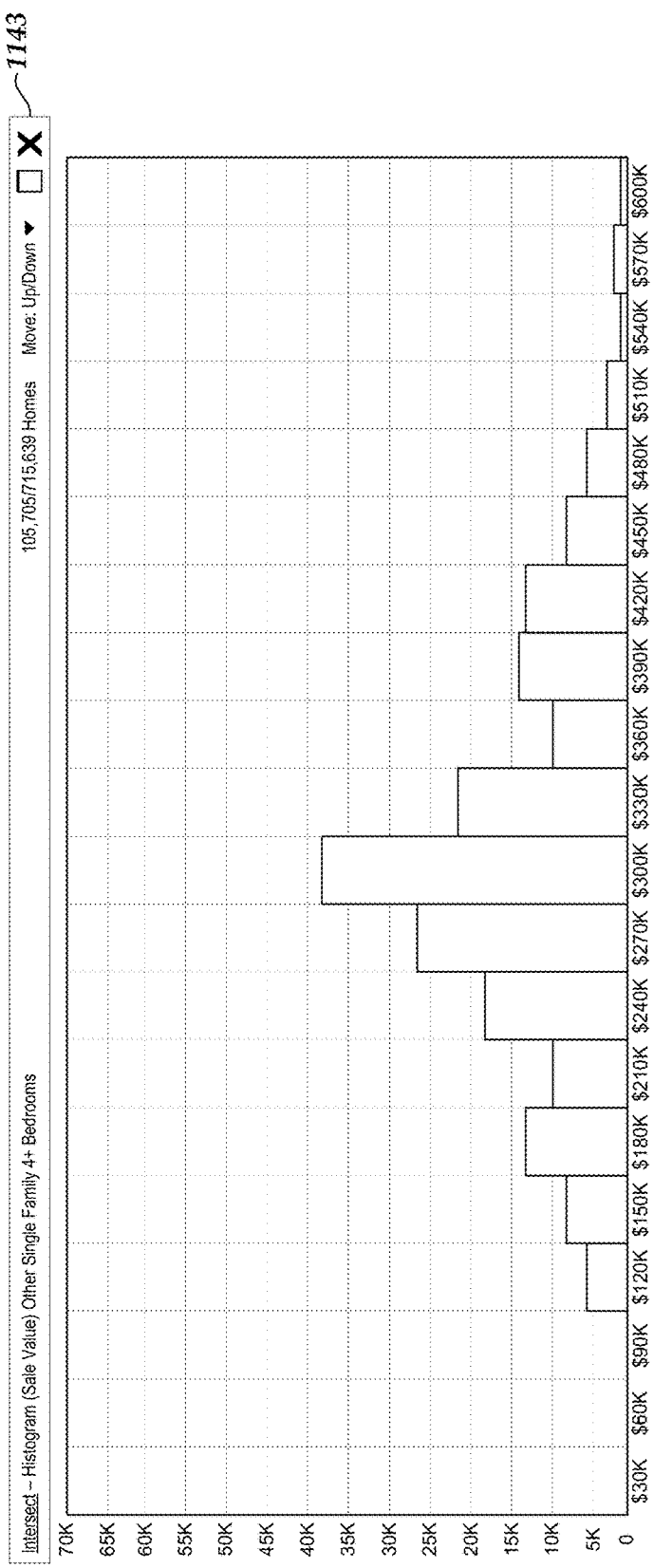

FIG. 11-3D illustrates another content pane 1135 included in the GUI 1100 of FIG. 11. In an embodiment, the content pane 1135 includes a filter that is applied to the data in content pane 1102 such that 86 out of 715,639 homes are identified as not satisfying the membership criteria embodied by the filter. For example, the membership criteria may specify that the data is to be displayed in a histogram and that the homes must not be single family homes in Arizona and must not include zero to three bedrooms (e.g., must be multi family homes with four or more bedrooms in Arizona). Thus, content pane 1135 displays data that satisfies the membership criteria originally specified in content pane 902 and does not satisfy the membership criteria originally specified in content pane 1102 and content pane 1102.

FIG. 11-4A illustrates another content pane 1142 included in the GUI 1100 of FIG. 11. In an embodiment, the content pane 1142 includes a filter that is applied to the data in content pane 1102 such that 23,991 out of 715,639 homes are identified as not satisfying the membership criteria embodied by the filter. For example, the membership criteria may specify that the data is to be displayed in a histogram and that the homes must be single family homes with zero to three bedrooms not in California, Florida, or Arizona. Thus, content pane 1142 displays data that satisfies the membership criteria originally specified in content pane 1002 and content pane 1102 and that does not satisfy the membership criteria originally specified in content pane 902.

FIG. 11-4B illustrates another content pane 1143 included in the GUI 1100 of FIG. 11. In an embodiment, the content pane 1143 includes a filter that is applied to the data in content pane 1102 such that 105,705 out of 715,639 homes are identified as not satisfying the membership criteria embodied by the filter. For example, the membership criteria may specify that the data is to be displayed in a histogram and that the homes must be single family homes not with zero to three bedrooms and not in California, Florida, or Arizona (e.g., must be single family homes with four or more bedrooms in locations other than California, Florida, or Arizona). Thus, content pane 1143 displays data that satisfies the membership criteria originally specified in content pane 1002 and that does not satisfy the membership criteria originally specified in content pane 902 and content pane 1102.

Figures 4C, 11:
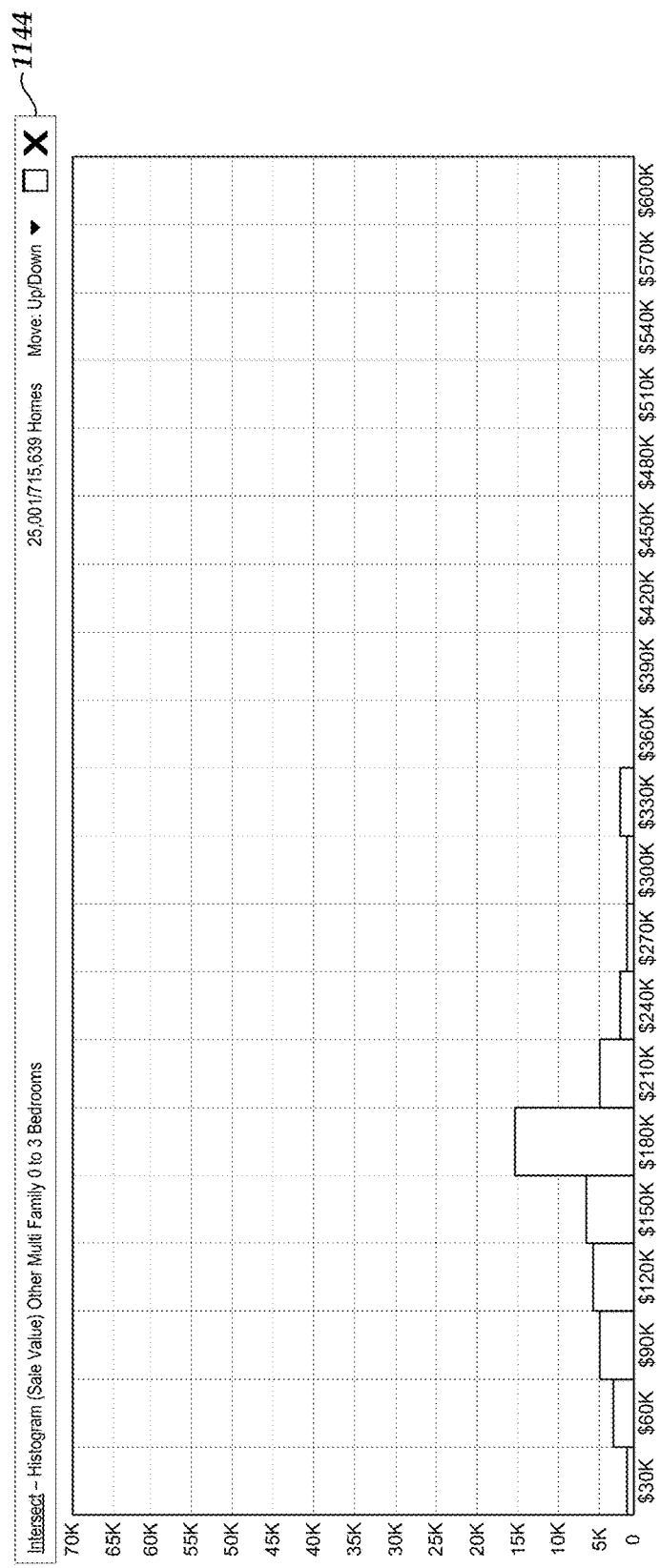

FIG. 11-4C illustrates another content pane 1144 included in the GUI 1100 of FIG. 11. In an embodiment, the content pane 1144 includes a filter that is applied to the data in content pane 1102 such that 25,001 out of 715,639 homes are identified as not satisfying the membership criteria embodied by the filter. For example, the membership criteria may specify that the data is to be displayed in a histogram and that the homes must not be single family homes with zero to three bedrooms and must not be in California, Florida, or Arizona (e.g., must be multi family homes with zero to three bedrooms in locations other than California, Florida, or Arizona). Thus, content pane 1144 displays data that satisfies the membership criteria originally specified in content pane 1102 and that does not satisfy the membership criteria originally specified in content pane 902 and content pane 1002.

Figures 4D, 11:
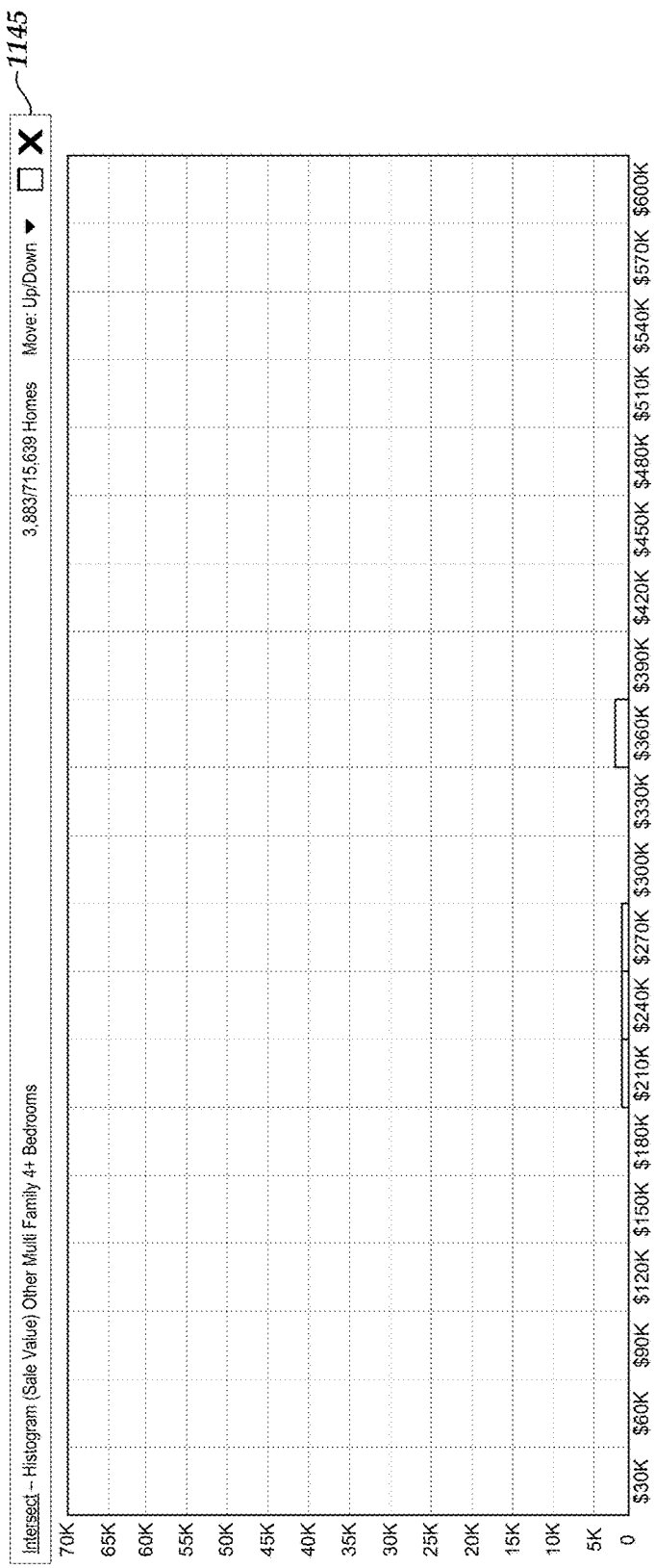

FIG. 11-4D illustrates another content pane 1145 included in the GUI 1100 of FIG. 11. In an embodiment, the content pane 1145 includes a filter that is applied to the data in content pane 1102 such that 3,883 out of 715,639 homes are identified as not satisfying the membership criteria embodied by the filter. For example, the membership criteria may specify that the data is to be displayed in a histogram and that the homes must not be single family homes in California, Florida, or Arizona and must not include zero to three bedrooms (e.g., must be multi family homes with four or more bedrooms in locations other than California, Florida, or Arizona). Thus, content pane 1145 displays data that does not satisfy the membership criteria originally specified in content pane 902, content pane 1002, and content pane 1102.

Figure 12:
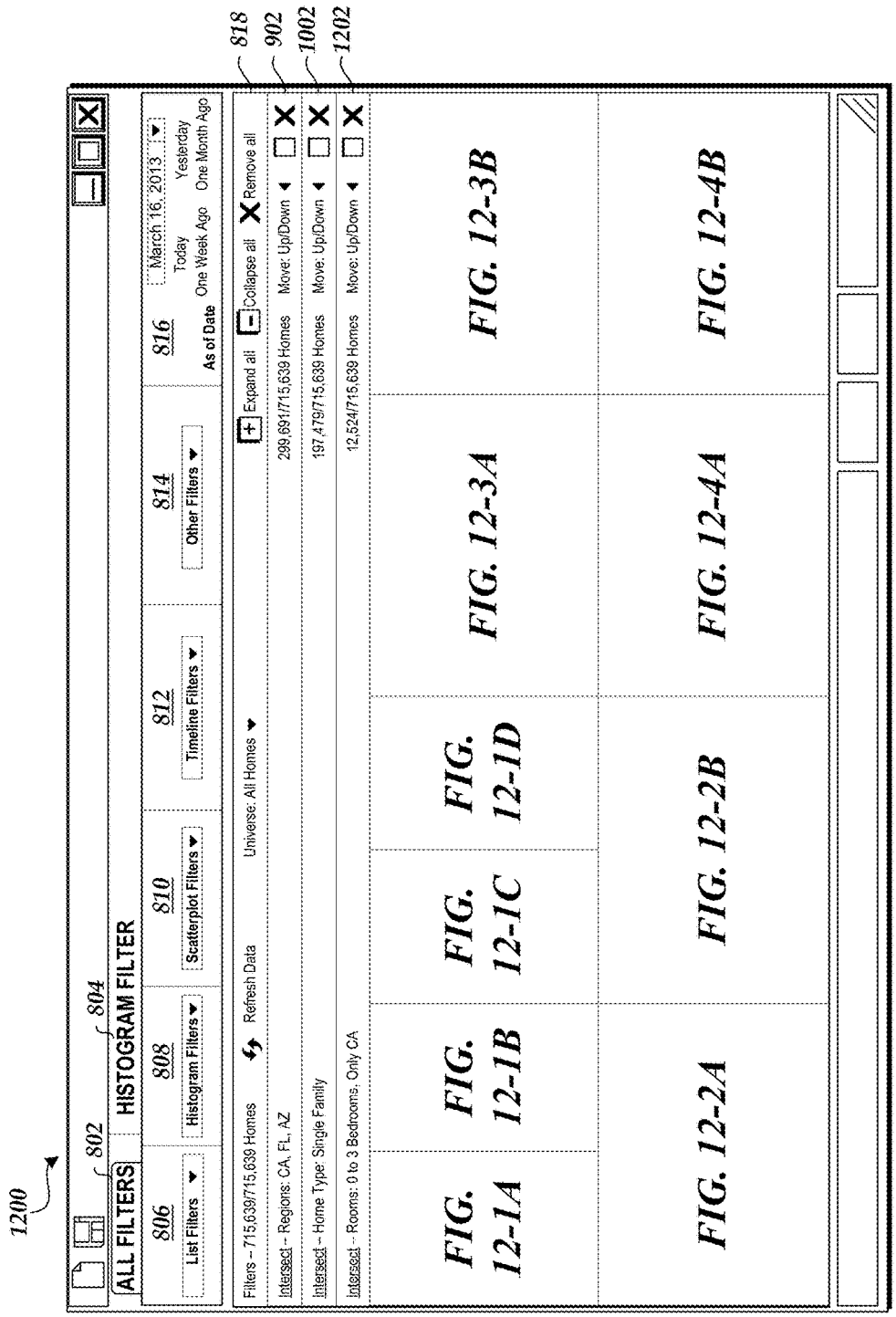
FIG. 12 illustrates another example GUI for a multipath explorer.
Figures 1A, 12:
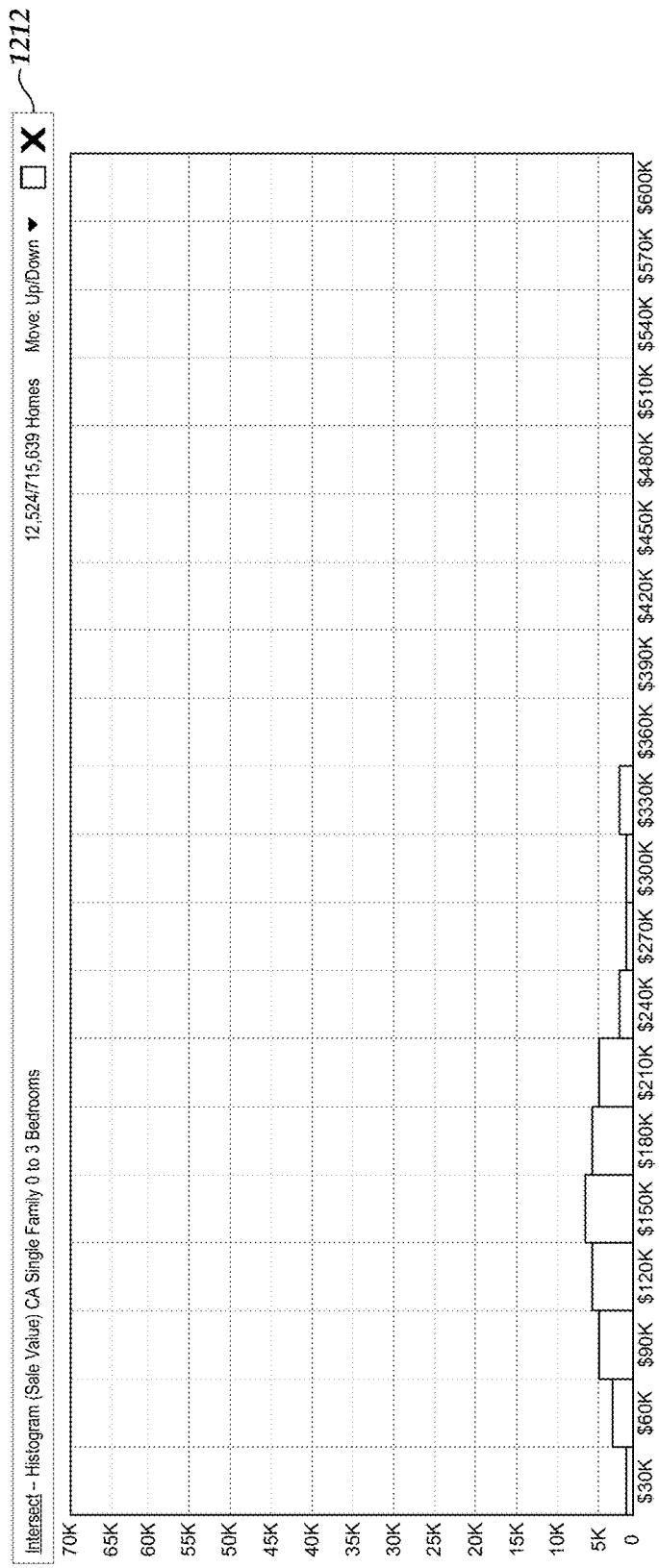
Figures 1B, 12:
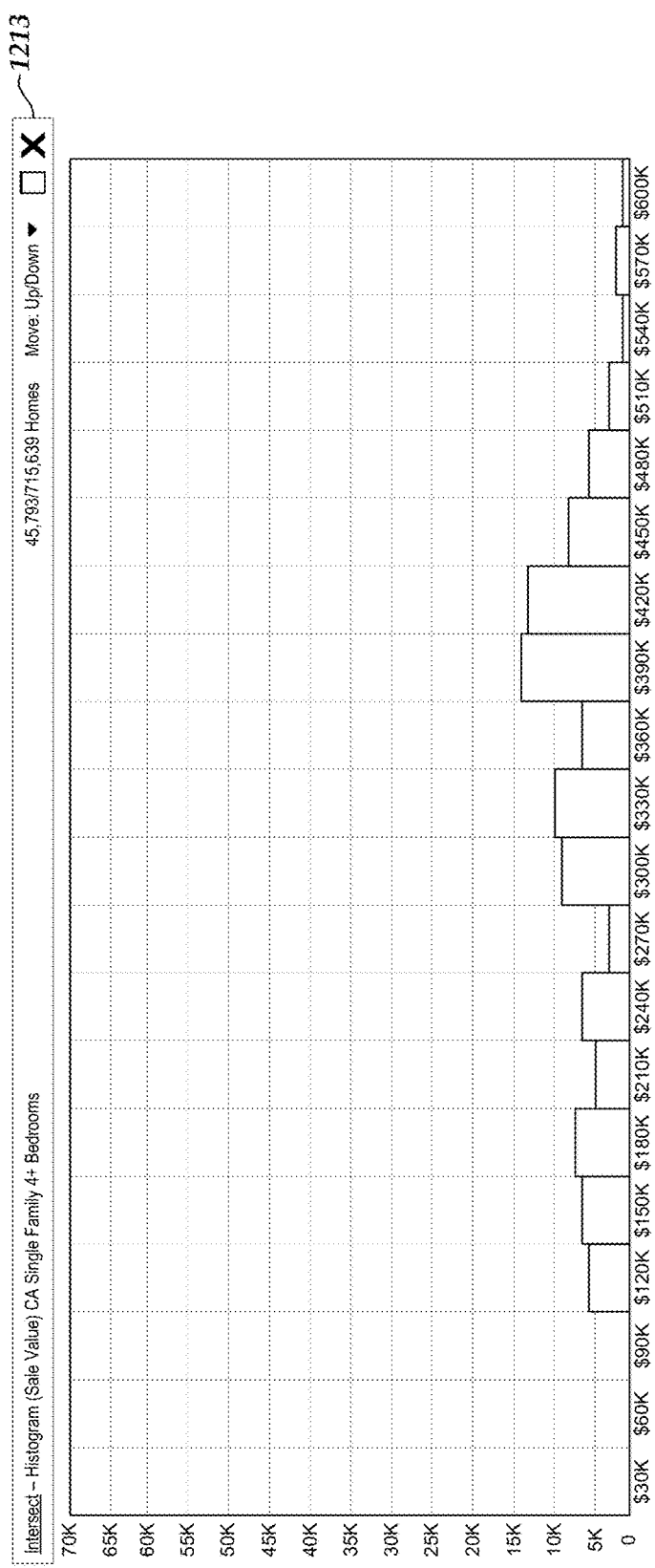
Figures 1C, 12:
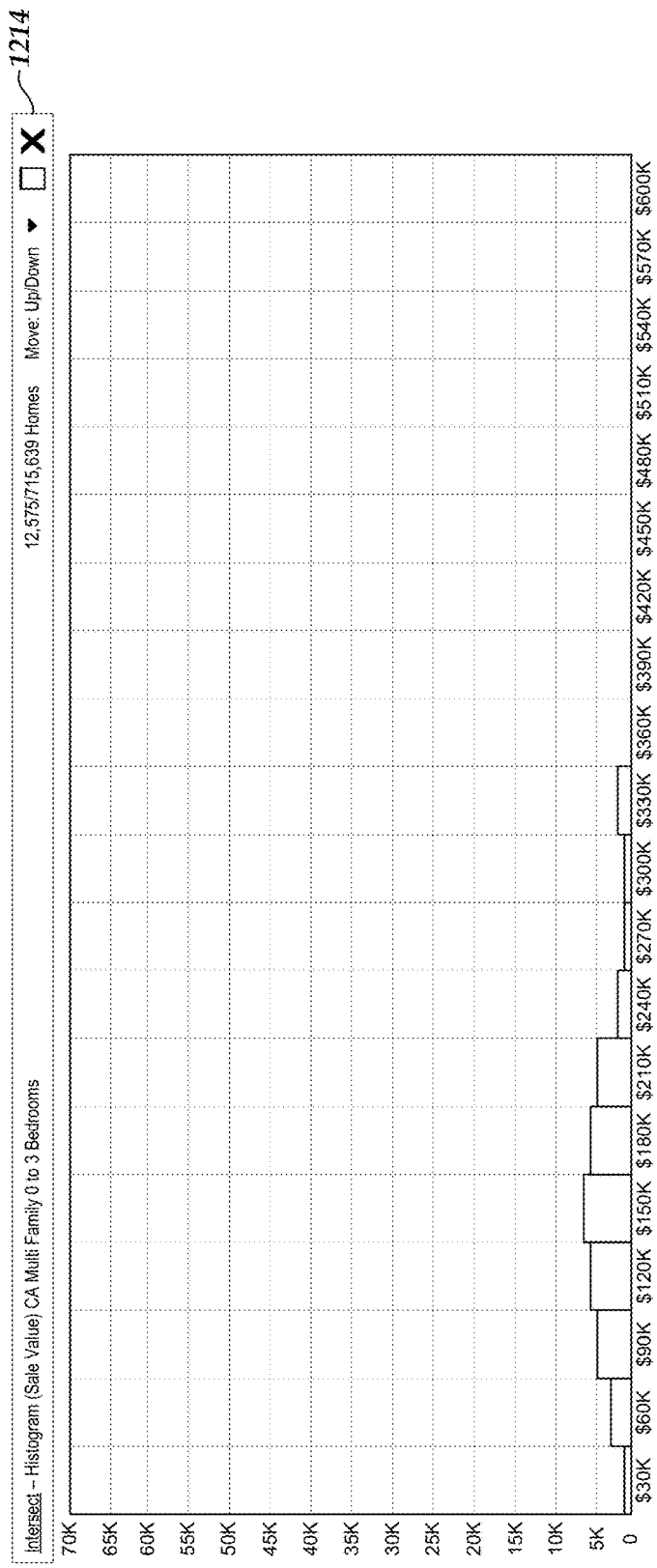
Figures 1D, 12:
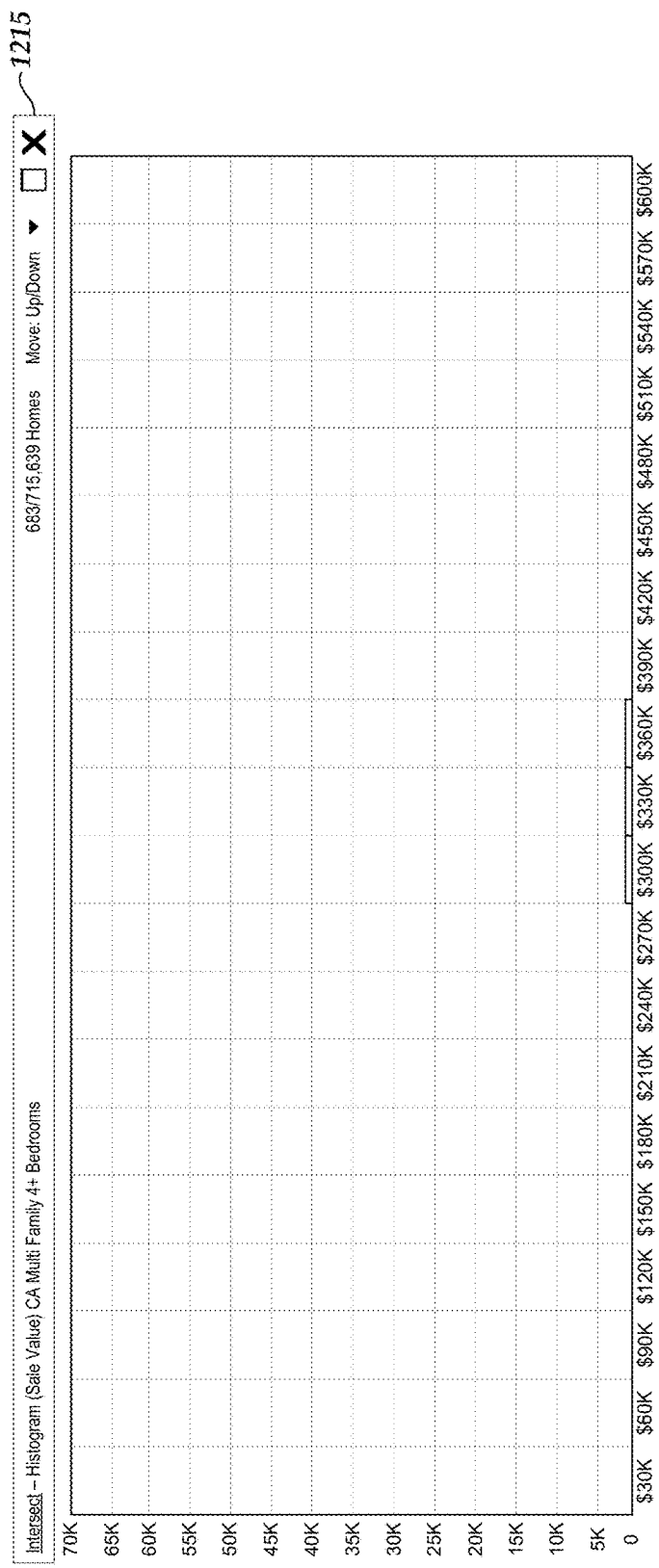
Figures 2A, 12:
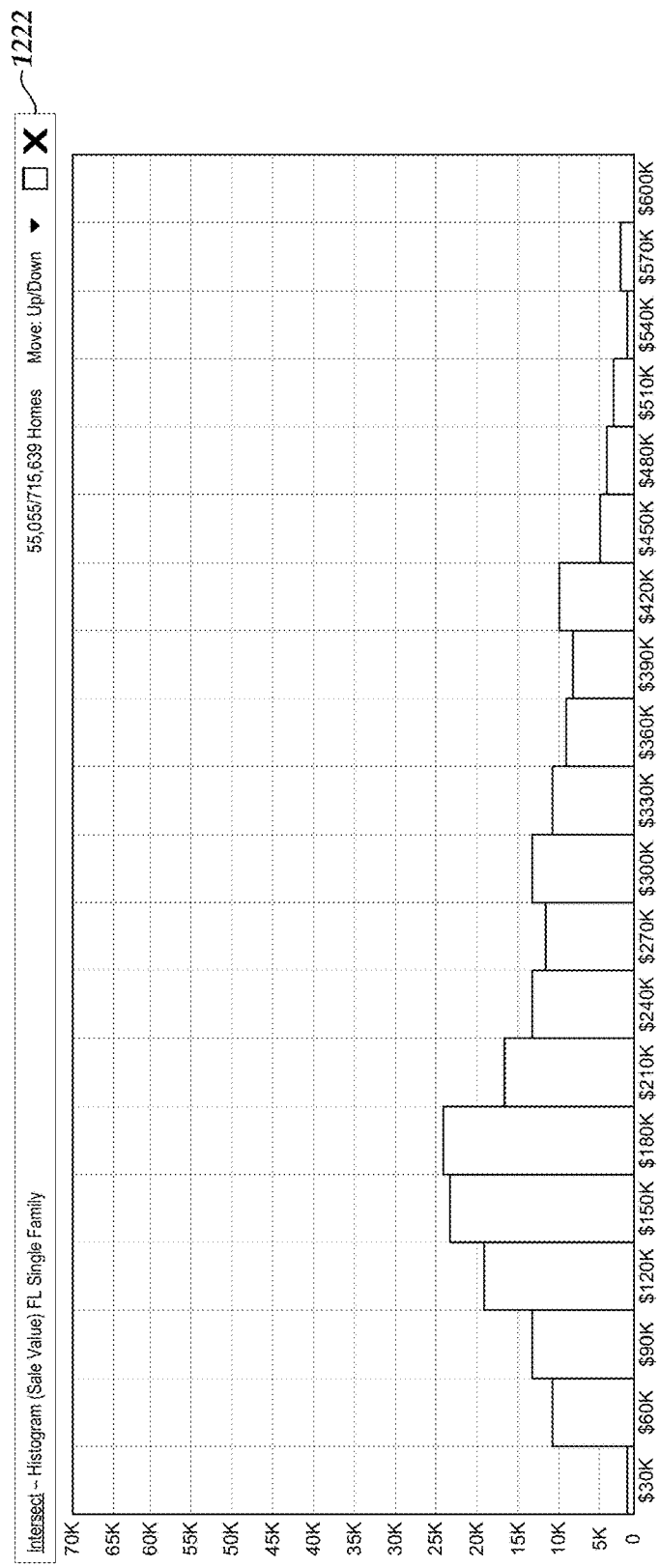
Figures 2B, 12:
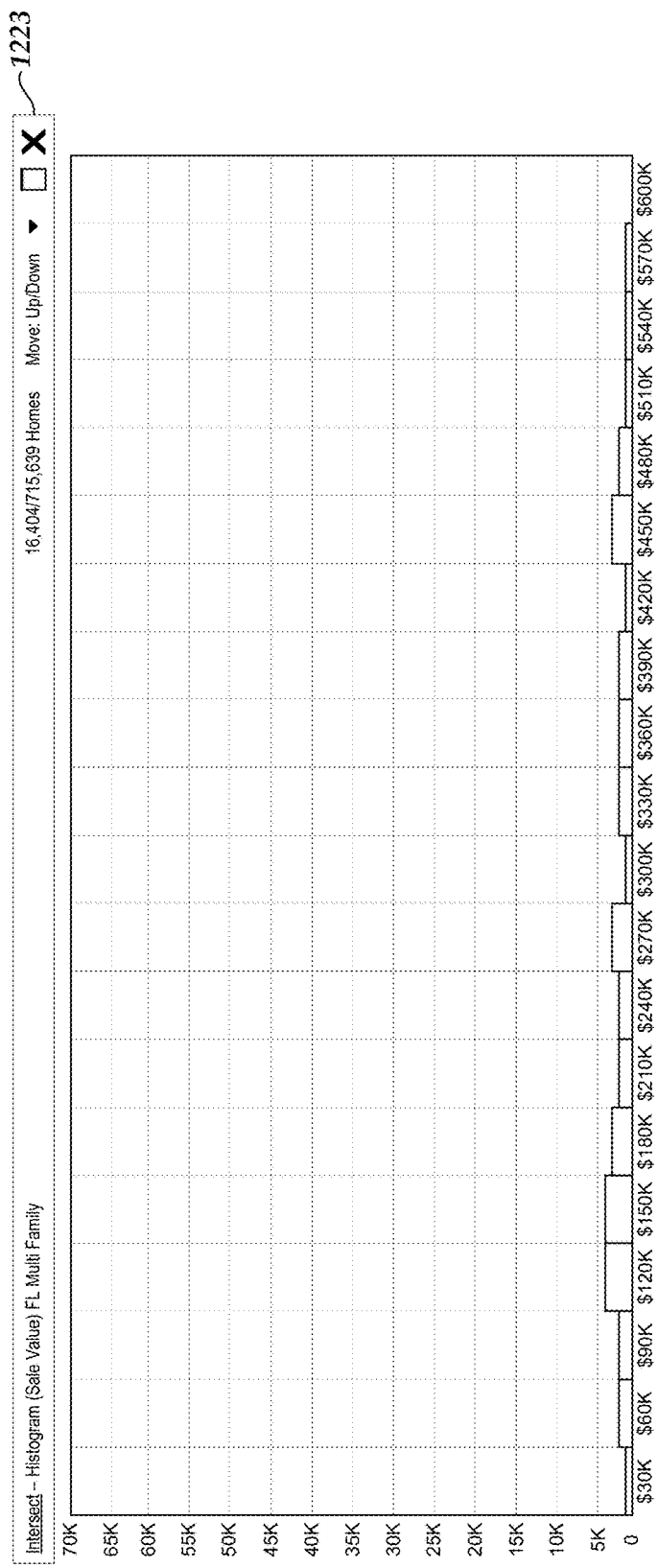
Figures 3A, 12:
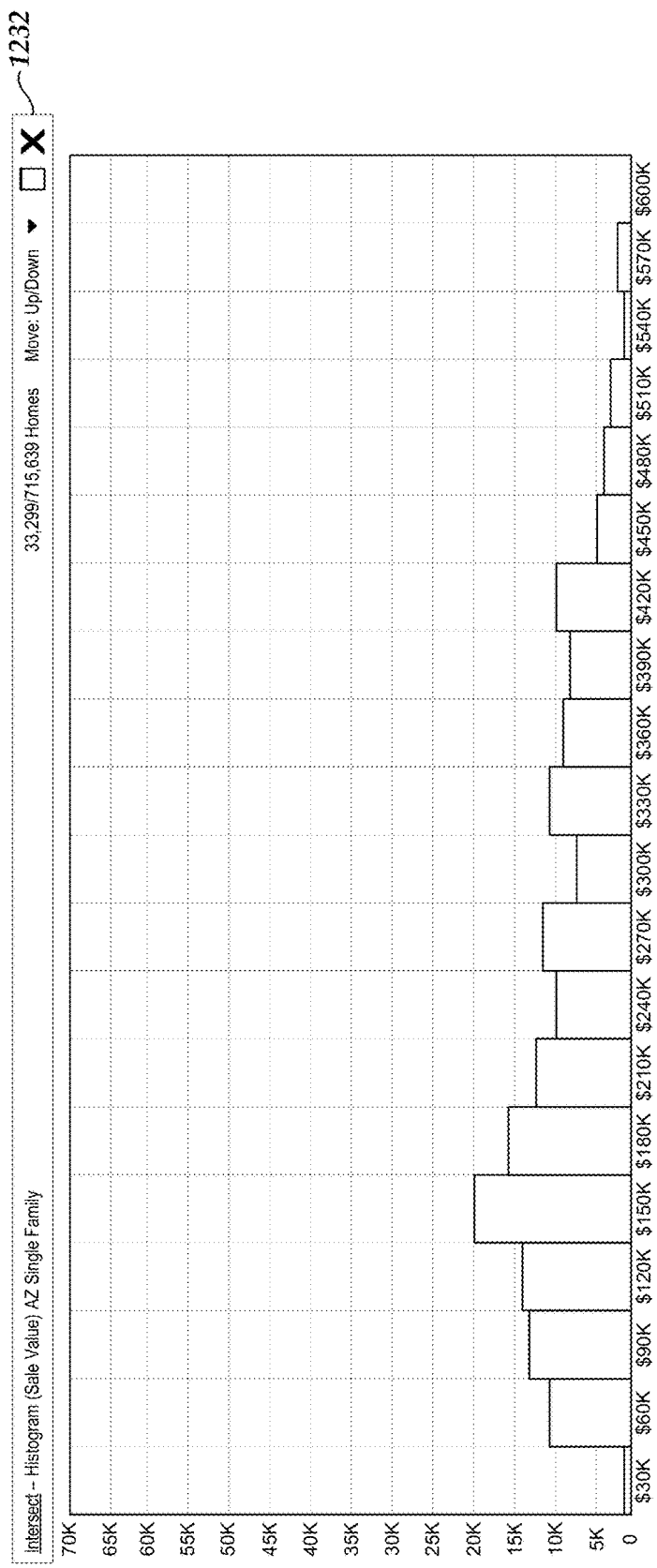
Figures 3B, 12:
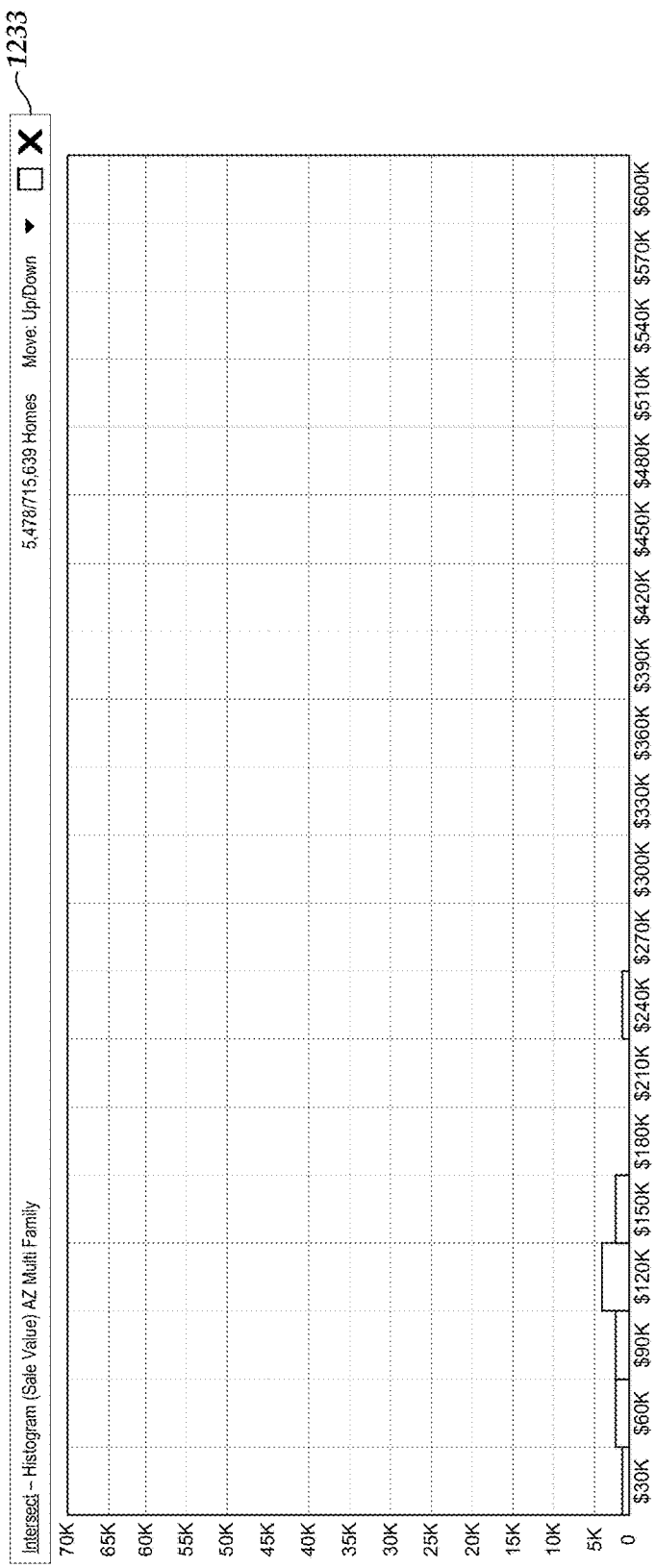
Figures 4A, 12:
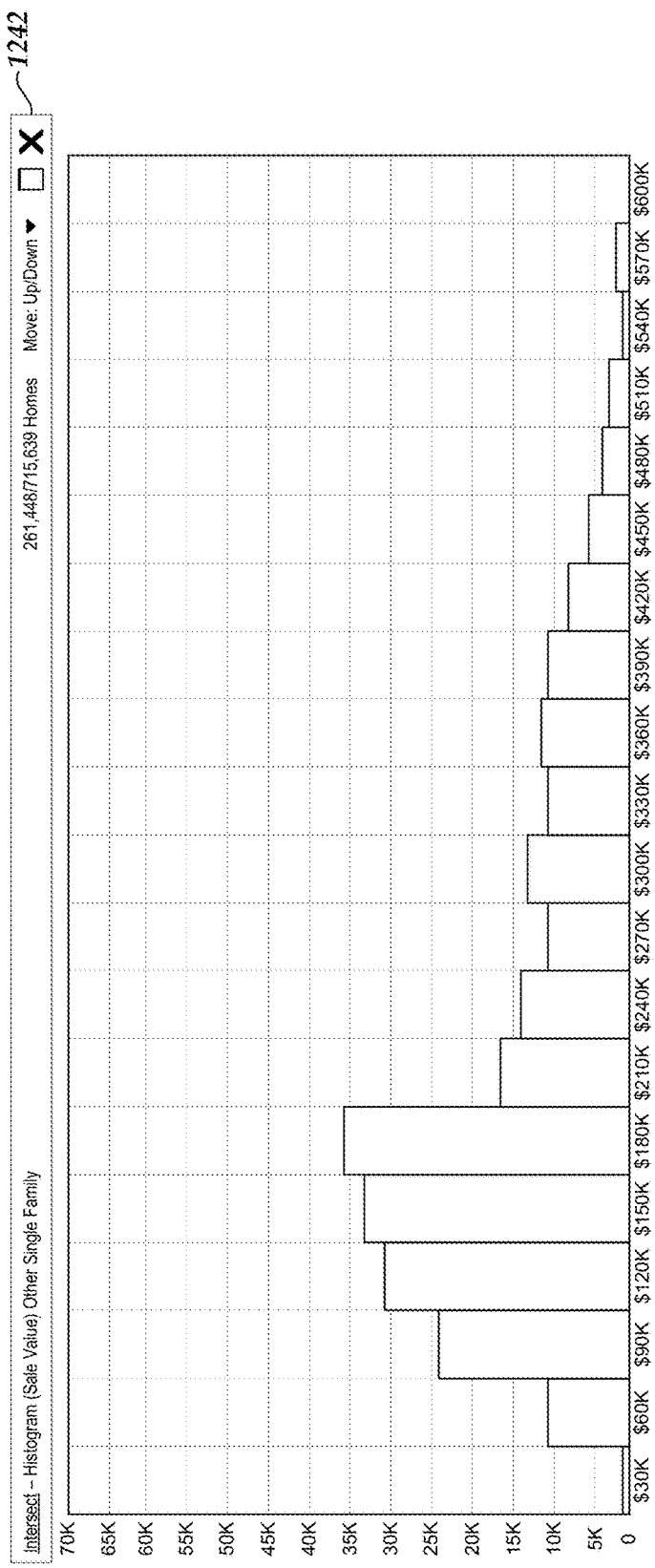
Figures 4B, 12:
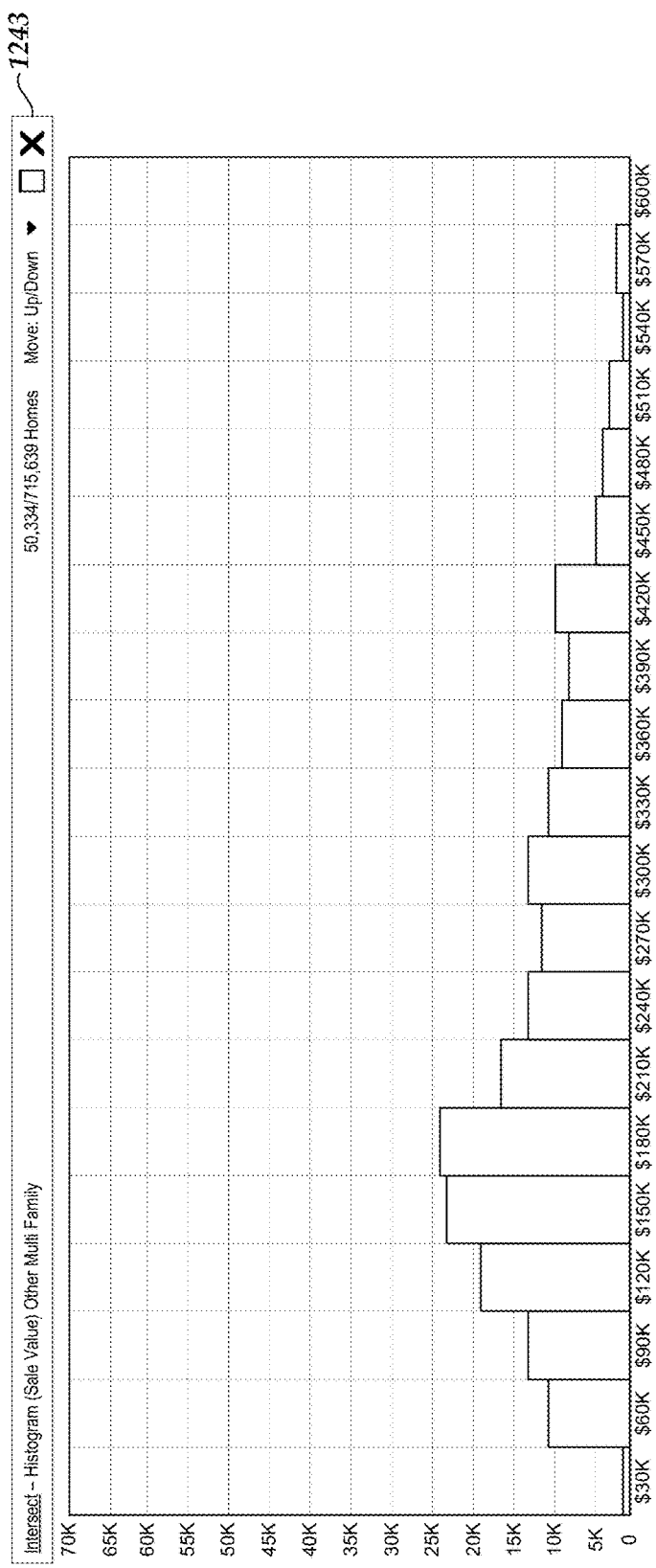

FIG. 12 illustrates another example graphical user interface (GUI) 1200 for a multipath explorer. As illustrated in FIG. 12, the GUI 1200 includes the all filters tab 802 and the histogram filter tab 804. While the GUI 1200 includes the all filters tab 802 and the histogram filter tab 804, this is not meant to be limiting as the GUI 1200 may include fewer or additional tabs, such as tabs associated with each of the filters discussed below.

As illustrated in FIG. 12, the GUI 1200 includes the content pane 818, the content pane 902, the content pane 1002, and a content pane 1202. In an embodiment, the content pane 1202 is similar to the content pane 1102 of FIG. 11. However, unlike the content pane 1102, which includes a filter that is applied to the inventory in content pane 1002, the content pane 1202 includes a filter that is only applied to a portion of the inventory in content pane 1002 such that 12,524 out of 715,639 homes satisfy the membership criteria embodied by the filter. For example, the membership criteria may apply only to homes in California (e.g., one of the three regions specified in the filter of content pane 902) and may specify that the homes must include a certain number of bedrooms (e.g., zero to three bedrooms).

As described above, the filter in content pane 902 creates four paths (e.g., four additional content panes). The filter in content pane 1002 creates two additional paths for each of the four paths created by the filter in content pane 902, resulting in eight total paths. The filter in content pane 1102 created two more paths for each of the eight paths created by the filter in content pane 1002, resulting in sixteen total paths. However, as described below, the filter in content pane 1202 is applied only to two of the eight paths created by the filter in content pane 1002, resulting in ten total paths.

Based on this membership criteria, ten additional content panes may be included in the GUI 1200. The first additional content pane is illustrated in FIG. 12-1A, the second in FIG. 12-1B, the third in FIG. 12-1C, the fourth in FIG. 12-1D, the fifth in FIG. 12-2A, the sixth in FIG. 12-2B, the seventh in FIG. 12-3A, the eight in FIG. 12-3B, the ninth in FIG. 12-4A, and the tenth in FIG. 12-4B. The additional content panes may display data that satisfies the membership criteria, data that satisfies some of the membership criteria, and data that does not satisfy the membership criteria.

FIG. 12-1A illustrates a content pane 1212 included in the GUI 1200 of FIG. 12. In an embodiment, the content pane 1212 includes a filter that is applied to the data in content pane 1202 such that 12,524 out of 715,639 homes satisfy the membership criteria embodied by the filter. For example, the membership criteria may specify that the data is to be displayed in a histogram and that the homes must be single family homes with zero to three bedrooms in California. Thus, content pane 1212 displays data that satisfies the membership criteria originally specified in content pane 902, content pane 1002, and content pane 1202.

FIG. 12-1B illustrates another content pane 1213 included in the GUI 1200 of FIG. 12. In an embodiment, the content pane 1213 includes a filter that is applied to the data in content pane 1202 such that 45,793 out of 715,639 homes are identified as not satisfying the membership criteria embodied by the filter. For example, the membership criteria may specify that the data is to be displayed in a histogram and that the homes must be single family homes not with zero to three bedrooms in California (e.g., must be single family homes with four or more bedrooms in California). Thus, content pane 1213 displays data that satisfies the membership criteria originally specified in content pane 902 and content pane 1002 and that does not satisfy the membership criteria originally specified in content pane 1202.

FIG. 12-1C illustrates another content pane 1214 included in the GUI 1200 of FIG. 12. In an embodiment, the content pane 1214 includes a filter that is applied to the data in content pane 1202 such that 12,575 out of 715,639 homes are identified as not satisfying the membership criteria embodied by the filter. For example, the membership criteria may specify that the data is to be displayed in a histogram and that the homes must not be single family homes with zero to three bedrooms in California (e.g., must be multi family homes with zero to three bedrooms in California). Thus, content pane 1214 displays data that satisfies the membership criteria originally specified in content pane 902 and content pane 1202 and that does not satisfy the membership criteria originally specified in content pane 1002.

FIG. 12-1D illustrates another content pane 1215 included in the GUI 1200 of FIG. 12. In an embodiment, the content pane 1215 includes a filter that is applied to the data in content pane 1202 such that 683 out of 715,639 homes are identified as not satisfying the membership criteria embodied by the filter. For example, the membership criteria may specify that the data is to be displayed in a histogram and that the homes must not be single family homes in California and must not include zero to three bedrooms (e.g., must be multi family homes with four or more bedrooms in California). Thus, content pane 1215 displays data that satisfies the membership criteria originally specified in content pane 902 and does not satisfy the membership criteria originally specified in content pane 1002 and content pane 1202.

FIG. 12-2A illustrates another content pane 1222 included in the GUI 1200 of FIG. 12. In an embodiment, the content pane 1222 includes a filter that is applied to the data in content pane 1002 such that 55,055 out of 715,639 homes satisfy the membership criteria embodied by the filter. For example, the membership criteria may specify that the data is to be displayed in a histogram and that the homes must be single family homes in Florida. Thus, content pane 1222 displays data that satisfies the membership criteria originally specified in content pane 902 and content pane 1002.

FIG. 12-2B illustrates another content pane 1223 included in the GUI 1200 of FIG. 12. In an embodiment, the content pane 1223 includes a filter that is applied to the data in content pane 1002 such that 16,404 out of 715,639 homes are identified as not satisfying the membership criteria embodied by the filter. For example, the membership criteria may specify that the data is to be displayed in a histogram and that the homes must not be single family homes in Florida (e.g., must be multi family homes in Florida). Thus, content pane 1223 displays data that satisfies the membership criteria originally specified in content pane 902 and that does not satisfy the membership criteria originally specified in content pane 1002.

FIG. 12-3A illustrates another content pane 1232 included in the GUI 1000 of FIG. 10. In an embodiment, the content pane 1232 includes a filter that is applied to the data in content pane 1002 such that 33,299 out of 715,639 homes satisfy the membership criteria embodied by the filter. For example, the membership criteria may specify that the data is to be displayed in a histogram and that the homes must be single family homes in Arizona. Thus, content pane 1232 displays data that satisfies the membership criteria originally specified in content pane 902 and content pane 1002.

FIG. 12-3B illustrates another content pane 1233 included in the GUI 1200 of FIG. 12. In an embodiment, the content pane 1333 includes a filter that is applied to the data in content pane 1002 such that 5,478 out of 715,639 homes are identified as not satisfying the membership criteria embodied by the filter. For example, the membership criteria may specify that the data is to be displayed in a histogram and that the homes must not be single family homes in Arizona (e.g., must be multi family homes in Arizona). Thus, content pane 1233 displays data that satisfies the membership criteria originally specified in content pane 902 and that does not satisfy the membership criteria originally specified in content pane 1002.

FIG. 12-4A illustrates another content pane 1242 included in the GUI 1200 of FIG. 12. In an embodiment, the content pane 1242 includes a filter that is applied to the data in content pane 1002 such that 261,448 out of 715,639 homes are identified as not satisfying the membership criteria embodied by the filter. For example, the membership criteria may specify that the data is to be displayed in a histogram and that the homes must be single family homes not in California, Florida, or Arizona. Thus, content pane 1242 displays data that does not satisfy the membership criteria originally specified in content pane 902 and that does satisfy the membership criteria originally specified in content pane 1002.

FIG. 12-4B illustrates another content pane 1243 included in the GUI 1200 of FIG. 12. In an embodiment, the content pane 1243 includes a filter that is applied to the data in content pane 1002 such that 50,334 out of 715,639 homes are identified as not satisfying the membership criteria embodied by the filter. For example, the membership criteria may specify that the data is to be displayed in a histogram, that the homes must not be single family homes, and that the homes must not be in California, Florida, or Arizona (e.g., must be multi family homes locations other than California, Florida, or Arizona). Thus, content pane 1243 displays data that does not satisfy the membership criteria originally specified in content pane 902 and content pane 1002.

In an embodiment, the data displayed in the various content panes described herein is updated dynamically as new data is entered, updated, deleted, and/or otherwise changed. In a further embodiment, the data displayed in the various content panes described herein is updated if the user selects the refresh data button illustrated in content pane 818.

As described above, one or more child nodes can be combined to form a parent node. For example, the GUI 800, 900, 1000, 1100, and/or 1200 may include functionality to allow a user to combine one or more child content panes to form a master content pane. The data displayed in the master content pane may be based on one or more common attributes of the data displayed in the child content panes. The master content pane may be positioned as a parent of the one or more child content panes in the content pane hierarchy or may be positioned as a child of the one or more child content panes in the content pane hierarchy. The data displayed in the child content panes may or may not be derived from a common data set. For example, the data displayed in the child content panes may be subsets of a data set that includes loan values for homes. As another example, the data displayed in a first child content pane may be a subset of a data set that includes loan values for homes and the data displayed in a second child content pane may be a subset of a data set that includes sales prices for homes.

In a further embodiment, not shown, the GUI 800, 900, 1000, 1100, and/or 1200 includes functionality to allow a user to transform a data set from a first object type to a second object type. For example, a data set may include homes having a default mortgage and the content panes may display documents (e.g., the mortgages) according to one of the views described herein. The data set may be transformed into new objects, such as real estate agents associated with those homes, so that the content panes then display persons (e.g., the real estate agents) according to one of the views described herein. Additional content panes may then be generated based on the real estate agent data set (e.g., a new membership criteria may require that the names of real estate agents must appear three or more times).

In a further embodiment, the GUI 800, 900, 1000, 1100, and/or 1200 includes functionality to allow a user to save a filtered or defiltered data set as a new object series (e.g., one or more of the membership criteria and the order in which they are used in determining how to display data in the content panes). The user may be able to title the new object series. The new object series may be shared with other users, or restricted from other users viewing. The new object series may also be used in later analysis or filtering. For example, the new object series may be applied to the same data set at a later time (e.g., after the data set has been updated). As another example, the new object series may be applied to a different data set. When applying the new object series to the different data set, the content panes may be created and displayed in the same or similar hierarchy as the content panes of the saved data set.

In a further embodiment, not shown, one or more reports can be generated based on the data displayed in one or more content panes. The reports may be generated in any suitable format (e.g., .doc, .xls, .pdf, etc.). For example, a report may include text based on the data displayed in one or more content panes. As another example, a report may include a visual representation of the data in the data set, such as in a manner similar to or the same as the manner in which data is displayed in one or more content panes (e.g., the report may look similar to the view provided by GUI 800, 900, 1000, 1100, and/or 1200).

In a further embodiment, not shown, the various content panes in the GUI 800, 900, 1000, 1100, and/or 1200 are color coded. The content panes may be color coded based on a metric or attribute (e.g., magnitude, name, value, etc.) determined by the user. For example, if the output of a content pane are numbers (e.g., home loan values), then content panes with loan values in a high range may appear red and content panes with loan values in a low range may appear blue.

Example Node Combination and Object Transformation

Figure 13A:
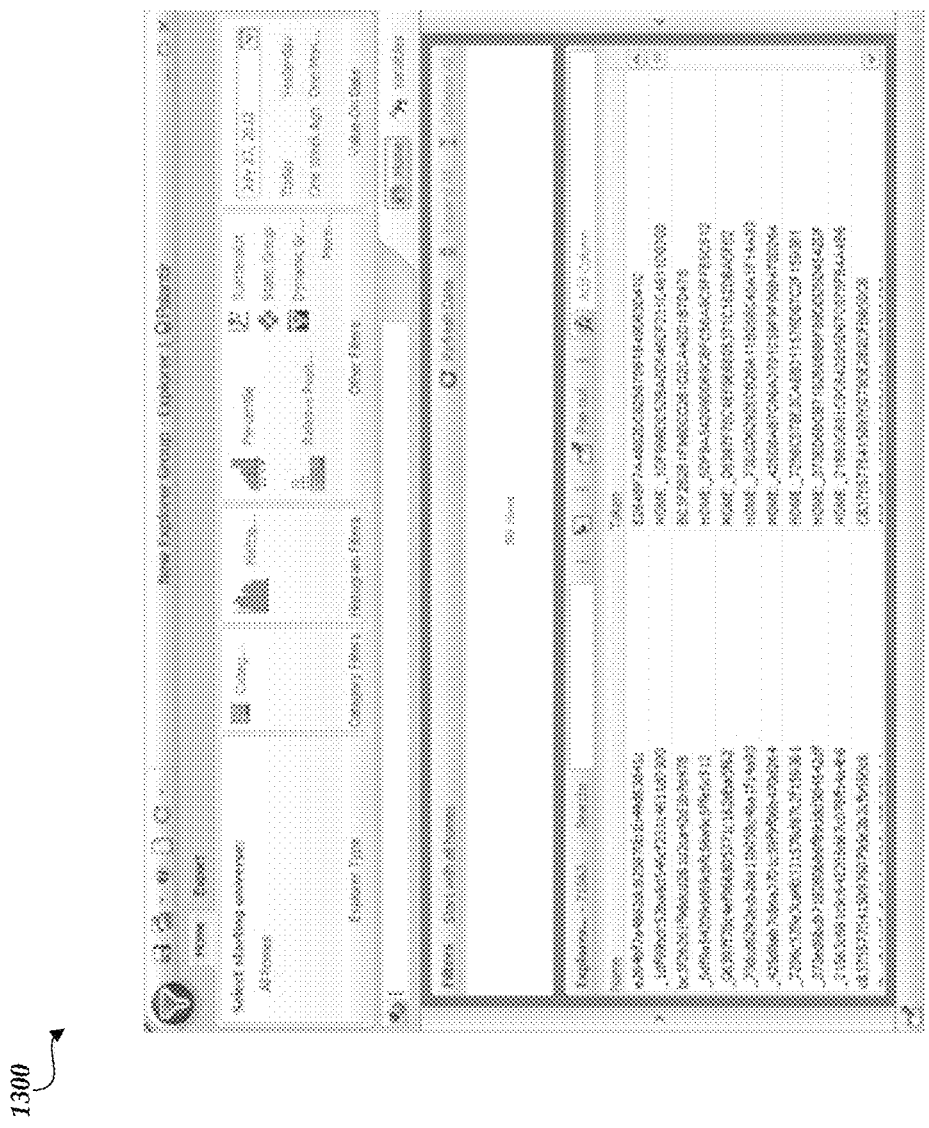
FIG. 13A illustrates an example GUI for selecting a starting set of inventory.

FIG. 13A illustrates an example graphical user interface (GUI) 1300 for selecting a starting set of inventory. As illustrated in FIG. 13A, a starting set of inventory is selected (e.g., indicated by the word "all" followed by an object type). For example, the starting set of inventory may include all homes.

Figure 13B:
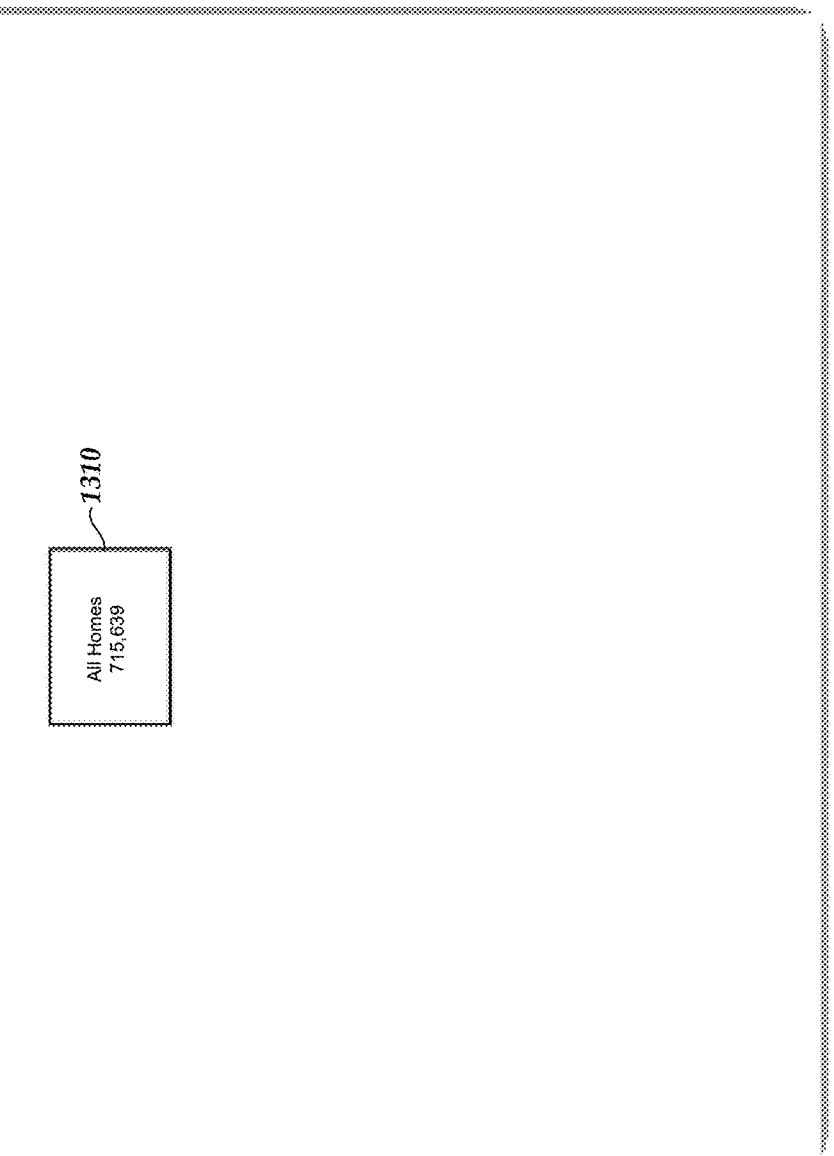
FIG. 13B illustrates a box that represents the starting set of inventory

FIG. 13B illustrates a box 1310 that represents the starting set of inventory. In some embodiments, the size of the box 1310 is determined by the content (e.g., the font becomes smaller to fit more content if needed). In other embodiments, the size of the box 1410 is fixed at a default starting size. As described above, the box 1310 may be copied, dragged (e.g., to change order or location), resized, and/or rotated by the user. The content of the box 1310 may likewise be copied, dragged, resized, and/or rotated by the user. In addition, the contents of the box 1310 may be enlarged or shrunken (e.g., zoom in, zoom out) by the user and the box 1310 may be deleted by the user.

Figure 13C:
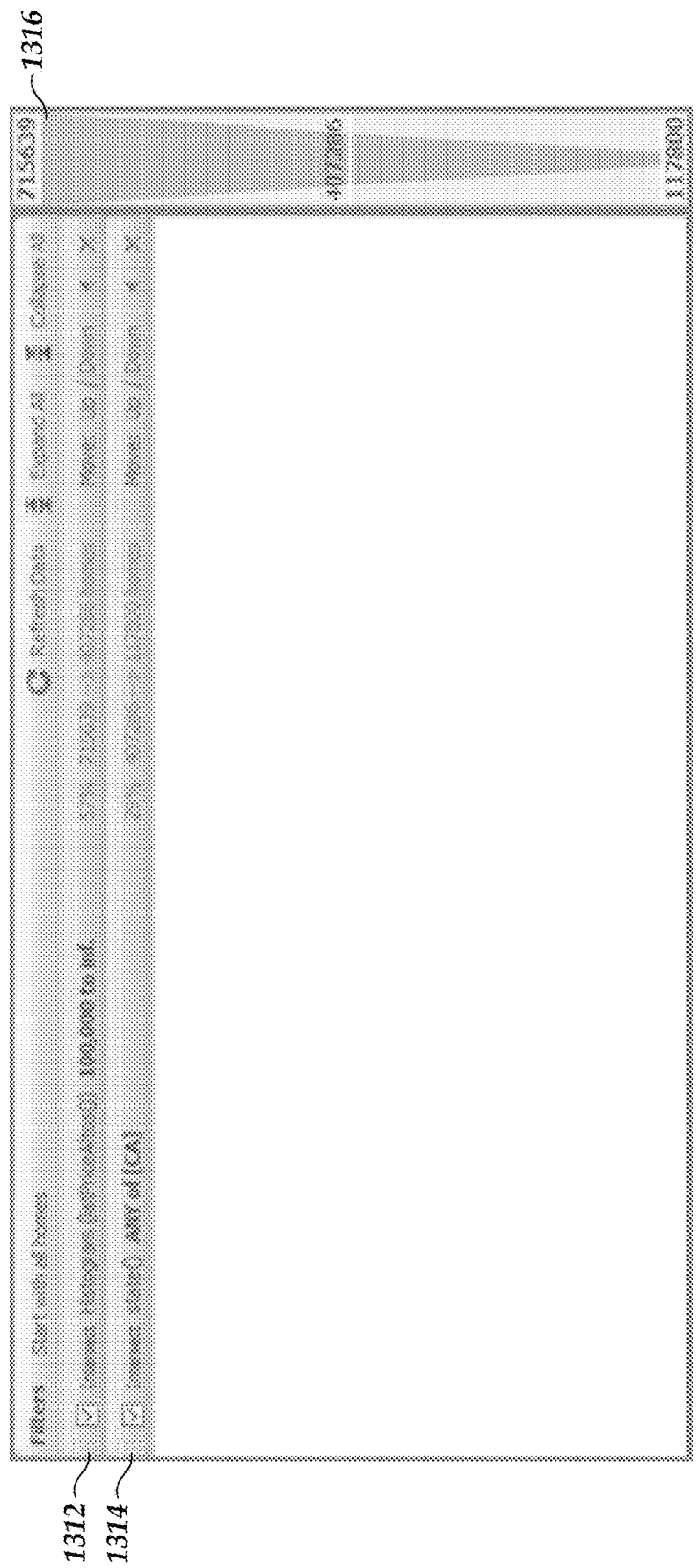
FIG. 13C illustrates a first filter and a second filter that are applied to the starting set of inventory.

FIG. 13C illustrates a first filter 1312 and a second filter 1314 that are applied to the starting set of inventory. In an embodiment, the first filter 1312 specifies that the homes must have a first list price greater than or equal to 100,000 and be displayed in a histogram. In an embodiment, the second filter 1314 specifies that the homes must be in California. As illustrated in FIG. 13C, the first filter 1312, when applied to the starting set of inventory, identifies 407,286 out of 715,639 homes that satisfy the first filter 1312 membership criteria. As illustrated in FIG. 13C, the second filter 1314, when applied to the 407,286 homes, identifies 117,800 out of 715,639 homes that satisfy the first filter 1312 membership criteria and the second filter 1314 membership criteria. The pairing of the starting set of inventory from 715,639 homes to 407,286 homes to 117,800 homes may be graphically represented via diagram 1316.

Figure 13D:
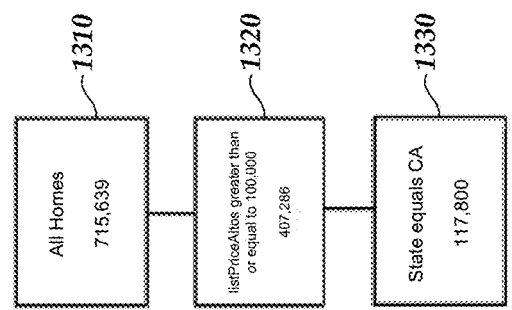
FIG. 13D illustrates the box of FIG. 13B, a second box, which represents a subset of the starting set of inventory based on the first filter membership criteria, and a third box, which represents a subset of the starting set of inventory based on the first filter membership criteria and the second filter membership criteria.
Figure 13E:
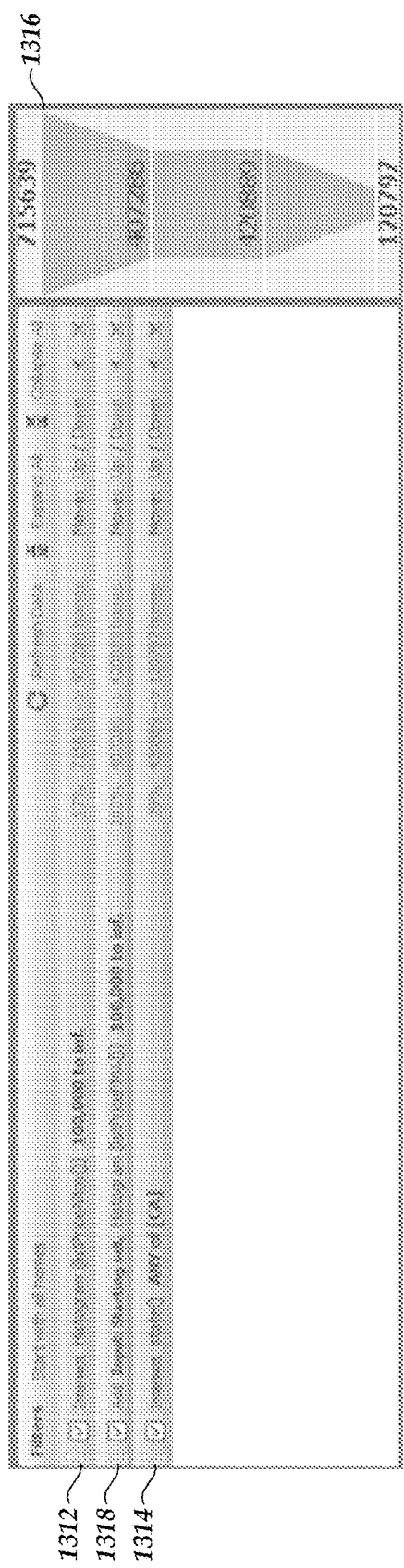
FIG. 13E illustrates an add filter that is applied to the starting set of inventory.
Figure 13F:
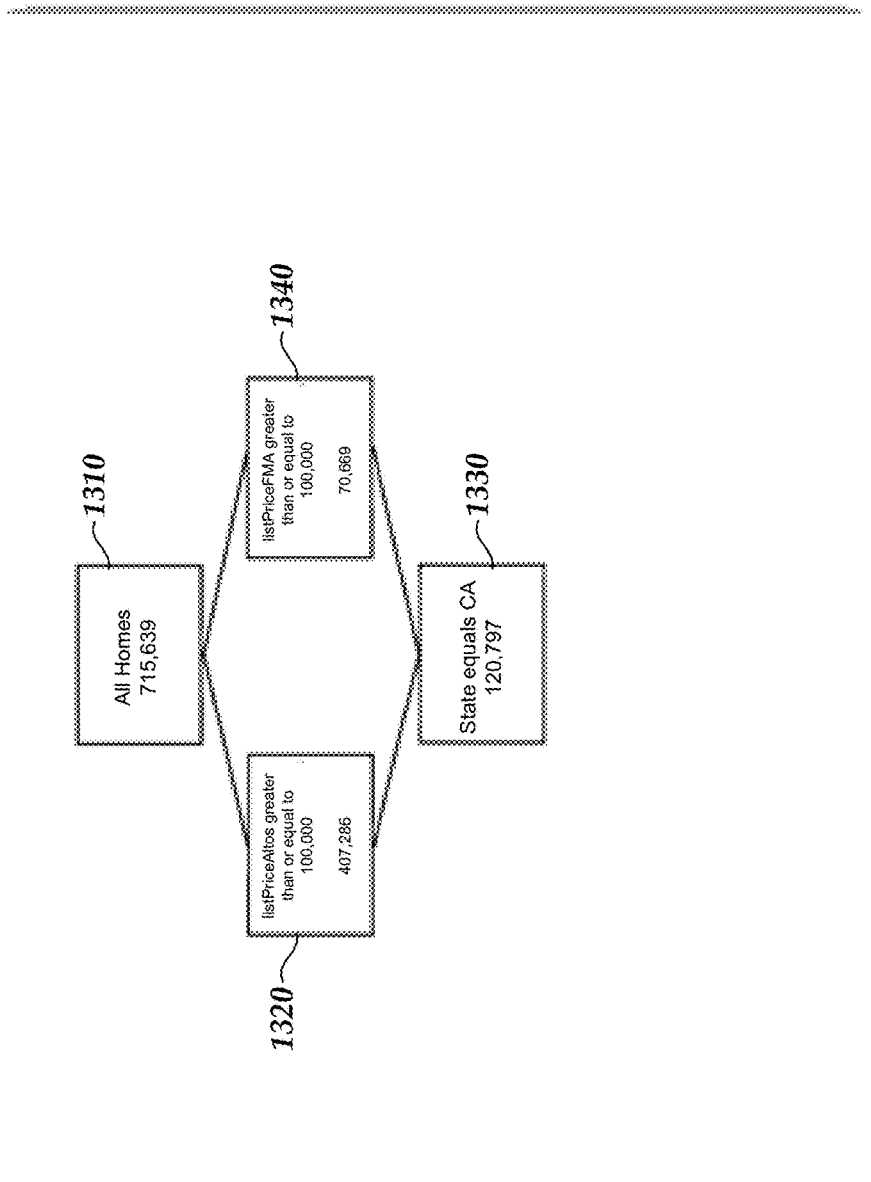
FIG. 13F illustrates the box of FIG. 13B, the boxes of FIG. 13D, and a fourth box, which represents a subset of the starting set of inventory based on the add filter membership criteria.
Figure 13G:
FIG. 13G illustrates a transform filter that is applied to the subset of data that results from applying the second filter of FIG. 13C.
Figure 13H:
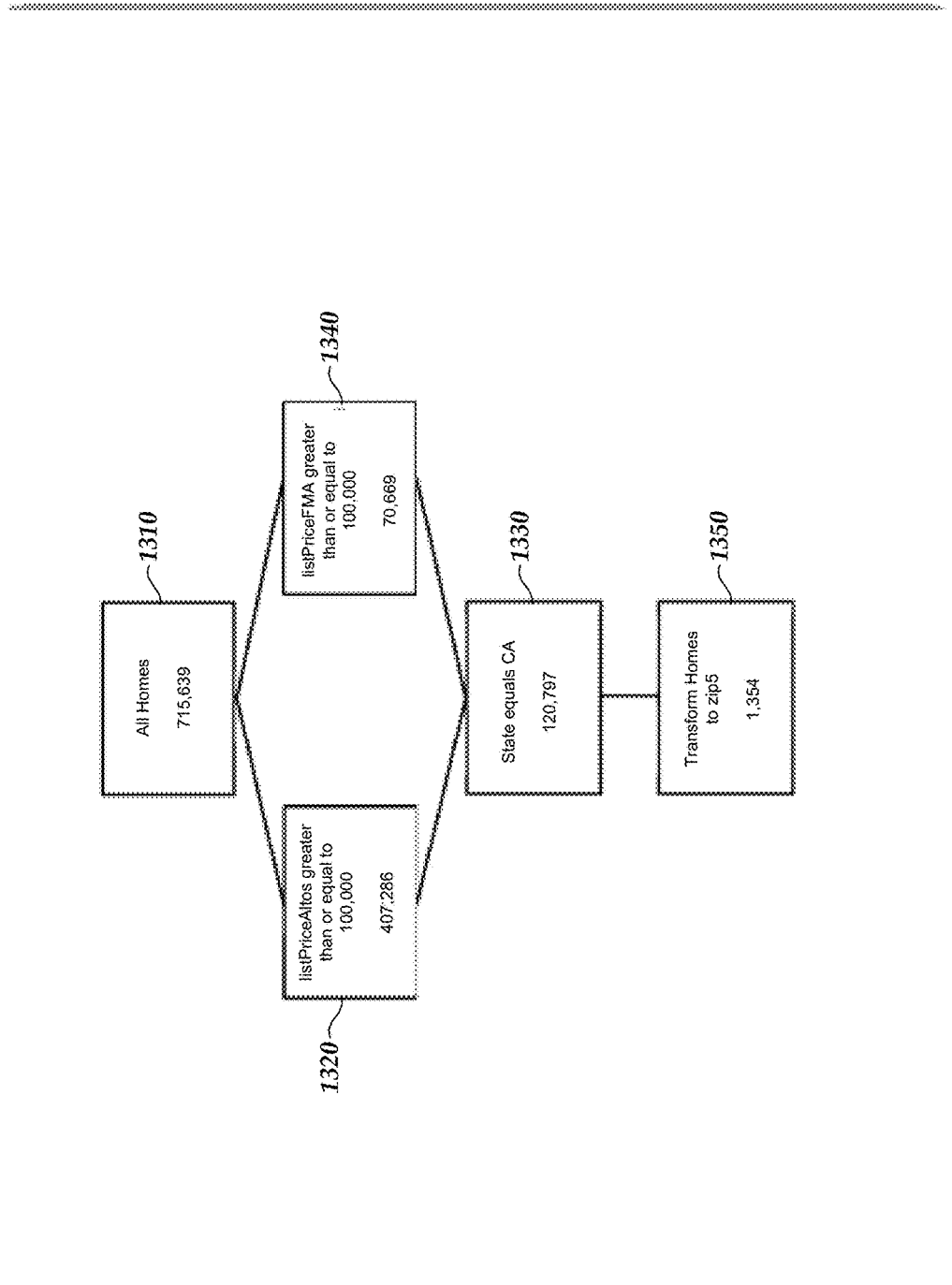
FIG. 13H illustrates the box of FIG. 13B, the boxes of FIG. 13D, the box of FIG. 13F, and a fifth box, which represents a subset of the starting set of inventory based on the first filter membership criteria, the add filter membership criteria, the second filter membership criteria, and the transform filter membership criteria.

FIG. 13D illustrates the box 1310, which represents the starting set of inventory, a box 1320, which represents a subset of the starting set of inventory based on the first filter 1312 membership criteria, and a box 1330, which represents a subset of the starting set of inventory based on the first filter 1312 membership criteria and the second filter 1314 membership criteria. The boxes 1320, and/or 1330 may have the same properties as the properties of box 1310 described above.

FIG. 13E illustrates an add filter 1318 that is applied to the starting set of inventory. In an embodiment, the add filter 1318 specifies that the homes must have a second list price greater than or equal to 100,000 and be displayed in a histogram. As illustrated in FIG. 13E, the add filter 1318, when applied to the starting set of inventory, identifies 420,889 out of 715,639 homes that satisfy the add filter 1318 membership criteria. As illustrated in FIG. 13E, the second filter 1314 is then applied to the subset of data that results from applying the first filter 1312 and to the subset of data that results from applying the add filter 1318. In other words, as described above, the second filter 1314 is used to identify common attributes within the subset of data that results from applying the first filter 1312 and the subset of data that results from applying the add filter 1318 (e.g., the common attributes being that the homes are in California). The add filter 1318, when applied to the 407,286 homes and the 420,889 homes, identifies 120,797 out of 715,639 homes that satisfy the first filter 1312 membership criteria and the second filter 1314 membership criteria and the add filter 1318 membership criteria and the second filter 1314 membership criteria. The pairing of the starting set of inventory from 715,639 homes to 407,286 homes to 420,889 homes to 120,797 homes may be graphically represented via the diagram 1316.

FIG. 13F illustrates the box 1310, which represents the starting set of inventory, the box 1320, which represents a subset of the starting set of inventory based on the first filter 1312 membership criteria, the box 1330, which represents a subset of the starting set of inventory based on the first filter 1312 membership criteria, the add filter 1318 membership criteria, and the second filter 1314 membership criteria, and a box 1340, which represents a subset of the starting set of inventory based on the add filter 1318 membership criteria.

The box 1340 may have the same properties as the properties of box 1310 described above.

FIG. 13G illustrates a transform filter 1322 that is applied to the subset of data that results from applying the second filter 1314. In an embodiment, the transform filter 1322 transforms the subset of data that results from applying the second filter 1314 from a first object type into a second object type. The second object type may be specified by the user via an entry in text field box 1324 (e.g., the user may specify a transform metric in the text field box 1324). As an example, the transform filter 1322, when applied to the 120,797 homes, identifies 1,354 out of 715,639 homes that satisfy the first filter 1312 membership criteria, the second filter 1314 membership criteria, and the transform filter 1322 membership criteria and the add filter 1318 membership criteria, the second filter 1314 membership criteria, and the transform filter 1322 membership criteria. The pairing of the starting set of inventory from 715,639 homes to 407,286 homes to 420,889 homes to 120,797 homes to 1,354 home may be graphically represented via the diagram 1316.

FIG. 13H illustrates the box 1310, which represents the starting set of inventory, the box 1320, which represents a subset of the starting set of inventory based on the first filter 1312 membership criteria, the box 1330, which represents a subset of the starting set of inventory based on the first filter 1312 membership criteria, the add filter 1318 membership criteria, and the second filter 1314 membership criteria, the box 1340, which represents a subset of the starting set of inventory based on the add filter 1318 membership criteria, and a box 1350, which represents a subset of the starting set of inventory based on the first filter 1312 membership criteria, the add filter 1318 membership criteria, the second filter 1314 membership criteria, and the transform filter 1322 membership criteria. The box 1350 may have the same properties as the properties of box 1310 described above.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 14 is a block diagram that illustrates a computer system 1400 upon which an embodiment may be implemented. Computer system 1400 includes a bus 1402 or other communication mechanism for communicating information, and a hardware processor, or multiple processors, 1404 coupled with bus 1402 for processing information. Hardware processor(s) 1404 may be, for example, one or more general purpose microprocessors.

Computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

Computer system 1400 may be coupled via bus 1402 to a display 1412, such as a cathode ray tube (CRT) or LCD display (or touch screen), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor(s) 1404 executing one or more sequences of one or more instructions contained in main memory 1406. Such instructions may be read into main memory 1406 from another storage medium, such as storage device 1410. Execution of the sequences of instructions contained in main memory 1406 causes processor(s) 1404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1410. Volatile media includes dynamic memory, such as main memory 1406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN (or WAN component to communicated with a WAN). Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
    non-transitory computer storage storing a plurality of data objects, each data object of the plurality of data objects associated with a first object type; and
    one or more computing devices programmed, via executable code instructions, to:
        access a first filter to apply to the plurality of data objects, the first filter comprising a first membership criterion;
        apply the first filter to the plurality of data objects to determine:
            a first set of data objects that satisfy the first membership criterion, and
            a second set of data objects that do not satisfy the first membership criterion;
        apply a second membership criterion associated with a second filter to the first set of data objects to determine (i) a first matching subset and (ii) a first non-matching subset of the first set of data objects, wherein the first non-matching subset satisfies the first membership criterion but does not satisfy the second membership criterion;
        apply the second membership criterion to the second set of data objects that do not satisfy the first membership criterion to determine (i) a second matching subset and a (ii) second non-matching subset of the second set of data objects, wherein the second non-matching subset does not satisfy either of the first membership criterion or the second membership criterion,
        wherein the second non-matching subset and the first non-matching subset comprise a mutually exclusive set of data objects;
        generate or update a single user interface to include concurrent graphical representations of:
            first summary information indicating at least a first quantity of objects in the first set of data objects, wherein the first summary information is selectable to retrieve additional information regarding the first set of data objects,
            second summary information indicating at least a second quantity of objects in the second set of data objects, and
            summary information regarding the first non-matching subset and the second non-matching subset; and
        cause the user interface to be presented to the user, wherein another user interface is configured to restrict from view data objects associated with the second non-matching subset.

2. The computing system of claim 1, wherein the first object type comprises a home object type.

3. The computing system of claim 1, wherein at least one data object of the plurality of data objects corresponds to at least one of a buyer, seller, entity, or real estate agent.

4. The computing system of claim 1, wherein the first membership criterion comprises at least one of a status, category, numeric range, geographic location, or mortgage status.

5. The computing system of claim 1, wherein the application of the first filter is in response to a user selection.

6. The computing system of claim 1, wherein a data type of the second set of data objects is selected by a user.

7. The computing system of claim 1, wherein the first membership criterion of the first filter is selected by a first user, and wherein the one or more computing devices are further programmed, via executable code instructions, to:
    create an object series from the first matching subset of data objects and at least one data object from the first non-matching subset of data objects or the second non-matching subset of data objects; and
    share the object series with a second user, the object series presentable in a second user interface corresponding to the second user.

8. The computing system of claim 1, wherein the one or more computing devices are further programmed, via executable code instructions, to:
    generate a report based at least on data from the first set of data objects and the second set of data objects, wherein a format of the report comprises at least one of a text format, a word processing format, a spreadsheet format, or a portable document format.

9. Non-transitory computer storage comprising instructions for causing one or more computing devices to perform operations comprising:
   accessing a first filter to apply to a plurality of data objects, the first filter comprising a first membership criterion, wherein each data object of the plurality of data objects is associated with a first object type;
   applying the first filter to the plurality of data objects to determine:
      a first set of data objects that satisfy the first membership criterion, and
      a second set of data objects that do not satisfy the first membership criterion;
   applying a second membership criterion of a second filter to the first set of data objects to determine (i) a first matching subset and (ii) first non-matching subset of the first set of data objects;
   applying the second membership criterion to the second set of data objects that do not satisfy the first membership criterion to determine (i) a second matching subset and (ii) a second non-matching subset of the second set of data objects,
   wherein the second non-matching subset and the first non-matching subset comprise a mutually exclusive set of data objects;
   generating or updating a single user interface to include concurrent graphical representations of at least first summary information indicating at least a quantity of objects in the first set of data objects, second summary information indicating at least a second quantity of objects in the second set of data objects, and summary information regarding the first non-matching subset and the second non-matching subset; and
   causing the user interface to be presented to the user, wherein another user interface is configured to restrict from view data objects associated with the second non-matching subset.

10. The non-transitory computer storage of claim 9, wherein the first object type comprises a home object type.

11. The non-transitory computer storage of claim 9, wherein at least one data object of the plurality of data objects corresponds to at least one of a buyer, seller, entity, or real estate agent.

12. The non-transitory computer storage of claim 9, wherein the first membership criterion comprises at least one of a status, category, numeric range, geographic location, or mortgage status.

13. The non-transitory computer storage of claim 9, wherein the application of the first filter is in response to a user selection.

14. The non-transitory computer storage of claim 9, wherein an object type of the second matching subset was selected by a user.

15. The non-transitory computer storage of claim 9, wherein the membership criterion of the first filter was selected by a first user, and the non-transitory computer storage further comprising instructions for causing one or more computing devices to perform operations comprising:
   creating an object series comprising data objects from the second set of data objects and at least one data object from the first set of data objects; and
   sharing the object series with a second user, the object series presentable in a second user interface corresponding to the second user.

16. The non-transitory computer storage of claim 9, further comprising instructions for causing one or more computing devices to perform operations comprising:
   generating a report based at least on data from the first set of data objects and the second set of data objects, wherein a format of the report comprises at least one of a text format, a word processing format, a spreadsheet format, or a portable document format.

17. A computing system comprising:
   non-transitory computer storage storing a plurality of data objects, each data object of the plurality of data objects associated with a first object type; and
   one or more computing devices programmed, via executable code instructions, to:
      access a filter to apply to the plurality of data objects, the filter comprising a first membership criterion;
      apply the first filter to the plurality of data objects to determine:
         a first set of data objects that satisfy the first membership criterion, and
         a second set of data objects that do not satisfy the first membership criterion;
      apply a second membership criterion to the first set of data objects and the second set of data objects to determine a child node, comprising:
         a first matching subset and a first non-matching subset of the first set of data objects; and
         a second matching subset and a second non-matching subset of the second set of data objects;
      generate or update a user interface to include concurrent graphical representations of:
         first summary information indicating at least a first quantity of objects in the first set of data objects, wherein the first summary information is selectable to retrieve additional information regarding the first set of data objects,
         second summary information indicating at least a second quantity of objects in the second set of data objects, and
         summary information regarding the first non-matching subset and the second non-matching subset; and
      restrict from view, in another user interface, data objects associated with the second non-matching subset.

* * * * *